(12) United States Patent
Hemminghaus et al.

(10) Patent No.: US 12,342,817 B2
(45) Date of Patent: Jul. 1, 2025

(54) HERBICIDAL COMPOSITIONS

(71) Applicant: Monsanto Technology LLC, St. Louis, MO (US)

(72) Inventors: John Hemminghaus, St. Louis, MO (US); Ashoke K. Sengupta, St. Louis, MO (US)

(73) Assignee: MONSANTO TECHNOLOGY LLC, St. Louis, MO (US)

( * ) Notice: Subject to any disclaimer, the term of this patent is extended or adjusted under 35 U.S.C. 154(b) by 894 days.

(21) Appl. No.: 16/972,315

(22) PCT Filed: Jun. 5, 2019

(86) PCT No.: PCT/US2019/035612
§ 371 (c)(1),
(2) Date: Dec. 4, 2020

(87) PCT Pub. No.: WO2019/236723
PCT Pub. Date: Dec. 12, 2019

(65) Prior Publication Data
US 2021/0244024 A1    Aug. 12, 2021

Related U.S. Application Data

(60) Provisional application No. 62/680,910, filed on Jun. 5, 2018.

(51) Int. Cl.
*A01N 25/32* (2006.01)
*A01N 25/04* (2006.01)
*A01N 33/12* (2006.01)
*A01N 37/40* (2006.01)

(52) U.S. Cl.
CPC ............. *A01N 25/32* (2013.01); *A01N 25/04* (2013.01); *A01N 33/12* (2013.01); *A01N 37/40* (2013.01)

(58) Field of Classification Search
CPC ........ A01N 25/32; A01N 25/04; A01N 33/12; A01N 37/40
See application file for complete search history.

(56) References Cited

U.S. PATENT DOCUMENTS

| | | |
|---|---|---|
| 5,268,352 A | 12/1993 | Dexter |
| 6,093,680 A | 7/2000 | Gillespie et al. |
| 6,177,071 B1 | 1/2001 | Lin et al. |
| 6,238,657 B1 | 5/2001 | Lin et al. |
| 6,451,731 B1 | 9/2002 | Agbaje et al. |
| 2002/0193256 A1 | 12/2002 | Harris, Jr. |
| 2007/0142228 A1 | 6/2007 | Haas |
| 2008/0027453 A1 | 1/2008 | Johnson et al. |
| 2010/0105556 A1 | 4/2010 | Haesslin et al. |
| 2010/0144527 A1 | 6/2010 | Patel et al. |
| 2012/0184434 A1 | 7/2012 | Xu et al. |
| 2012/0283098 A1 | 11/2012 | Zhang et al. |
| 2013/0029847 A1 | 1/2013 | Findley et al. |
| 2013/0252812 A1 | 9/2013 | Shao et al. |
| 2013/0252817 A1 | 9/2013 | Shao et al. |
| 2014/0128264 A1 | 5/2014 | Hemminghaus et al. |
| 2014/0243200 A1* | 8/2014 | Mann ............. A01N 43/90 504/136 |
| 2014/0249026 A1* | 9/2014 | Hemminghaus ....... A01N 37/40 504/206 |
| 2015/0264924 A1 | 9/2015 | Hemminghaus et al. |
| 2017/0065952 A1 | 3/2017 | Spyropoulos et al. |
| 2018/0155610 A1 | 6/2018 | Goual et al. |

FOREIGN PATENT DOCUMENTS

| | | | |
|---|---|---|---|
| CN | 1241114 A | 1/2000 | |
| CN | 101448776 | 6/2009 | |
| CN | 101534639 A | 9/2009 | |
| CN | 101621924 A | 1/2010 | |
| CN | 101795559 A | 8/2010 | |
| CN | 102007915 A | 4/2011 | |
| CN | 102111995 A | 6/2011 | |
| CN | 102893997 A | 1/2013 | |
| CN | 103371174 A | 10/2013 | |
| CN | 104244719 A * | 12/2014 | ............. A01N 25/00 |
| CN | 105410040 | 3/2016 | |
| CN | 106165682 A | 11/2016 | |
| CN | 106577668 A | 4/2017 | |
| CN | 107361062 A | 11/2017 | |
| CN | 107660544 A | 2/2018 | |
| CN | 109452306 A * | 3/2019 | |
| EP | 0243872 A1 | 11/1987 | |
| EP | 0433577 A1 | 6/1991 | |
| EP | 1069150 A2 | 1/2001 | |
| EP | 1209970 B1 | 11/2003 | |
| EP | 2880978 | 6/2015 | |
| WO | WO2008/069826 | 6/2008 | |
| WO | WO2008/076807 | 6/2008 | |
| WO | WO-2008135854 A2 | 11/2008 | |
| WO | WO-20090152827 A2 | 12/2009 | |
| WO | WO-2012154732 A1 | 11/2012 | |
| WO | WO2013/098220 | 7/2013 | |
| WO | WO-2013142262 A1 | 9/2013 | |
| WO | WO-2013142263 A1 | 9/2013 | |

(Continued)

OTHER PUBLICATIONS

Binks Bernard P. et al: "Oil-in-oil emulsions stabilized solely by solid particles", Soft Matter, vol. 12, No. 3, Jan. 1, 2016; pp. 876-887.
ShellSol T Technical Datasheet, Shell Chemicals, pp. 1-3 (2016).
Genapol X 080 Product Fact Sheet, Clafiant International Ltd., Switzerland (2015).
Armel, G.R. et al., "Mesotrione combinations in no-till com (*Zea mays*)," Weed Technology, vol. 17(i), pp. 111-116 (2003).

*Primary Examiner* — Snigdha Maewall
(74) *Attorney, Agent, or Firm* — Harness, Dickey & Pierce, P.L.C.

(57) ABSTRACT

The present invention relates to various pesticidal compositions including non-water-continuous herbicidal dispersion compositions and processes for preparing these compositions. The present invention further relates to herbicidal application mixtures including water continuous dispersion compositions, processes for preparing these application mixtures, and various methods of use. Further, the present invention relates to various herbicidal compositions having improved application properties.

25 Claims, No Drawings

(56) References Cited

FOREIGN PATENT DOCUMENTS

| WO | WO-2015/059580 A1 | 4/2015 |
| WO | WO-2016/176740 A1 | 11/2016 |
| WO | WO-2018/013721 A1 | 1/2018 |
| WO | WO-2018024143 A1 | 2/2018 |
| WO | WO-2019236738 A1 | 12/2019 |

\* cited by examiner

HERBICIDAL COMPOSITIONS

CROSS-REFERENCE TO RELATED APPLICATIONS

This application is a U.S. national stage filing under 35 U.S.C. § 371 of International Application No. PCT/US2019/035612, filed on Jun. 5, 2019, which claims the benefit of and priority to U.S. Provisional Application No. 62/680,910, filed on Jun. 5, 2018. The entire disclosure of each of the above applications is incorporated herein by reference.

FIELD

The present invention relates to various pesticidal compositions including non-water-continuous herbicidal dispersion compositions and processes for preparing these compositions. The present invention further relates to herbicidal application mixtures including water continuous dispersion compositions, processes for preparing these application mixtures, and various methods of use. Further, the present invention relates to various herbicidal compositions having improved application properties.

BACKGROUND

To enhance the efficiency of applying herbicidal active ingredients, it is highly desirable to combine two or more active ingredients in a single formulation. Applying a combination of active ingredients with different modes of action can provide for greater pest control. Also, concentrate compositions containing high loadings of active ingredients are more economical to transport and store. Concentrate compositions containing high loadings of multiple active ingredients (i.e., pre-mix concentrates) are also beneficial in avoiding or reducing mixing errors when preparing an application mixture in the field.

Formulating chemically stable mixtures of active ingredients that may be chemically unstable and/or are mutually reactive with one another can be challenging. Further, agricultural actives can range from water-soluble, ionic compounds, and oils or oil-soluble substances to water- or oil-insoluble solids. Because of their disparate solubility, combining these different types of active ingredients in mixtures can require formulating multi-phase mixtures such as dispersions, namely, emulsions or suspensions. However, dispersions are not inherently physically stable unlike single-phase mixtures such as true solutions.

In general, dispersions are multi-phase mixtures of two or more immiscible constituents including a liquid constituent, having a continuous liquid phase and one or more dispersed phases, which are also referred to as internal phases. The continuous liquid phase comprises a liquid constituent which is partially or fully immiscible with other constituents, which can be a solid and/or a liquid present as dispersed phases such as solid and/or liquid particles dispersed in the continuous liquid phase. Dispersions are typically classified as water-continuous dispersions when dispersed phases are dispersed in water as being the continuous phase, and as oil dispersions or oil-continuous dispersions (i.e., non-water-continuous dispersions) when the continuous phase is an oily liquid and not water.

In water-continuous dispersions, high levels of ionic compounds dissolved in the water phase, tend to render the dispersion stabilizing ingredients, namely, dispersing/emulsifying/suspending agents ineffective. Therefore, attaining good physical stability through stability against agglomeration of emulsified oil droplets or suspended solid particles, coalescence of oil droplets leading to gross separation of the emulsified oil phase, and sedimentation of dispersed particles/droplets, can be challenging with water-based dispersions having high loadings of ionic actives dissolved in their water phase. Nonetheless, the ionic nature of ionic substances manifest only when they dissociate into their constituent ions, once dissolved in suitable polar liquids.

Solubility and ionic dissociation of polar ionic compounds are typically very low in non-polar liquids such as oils, for which the physical stability of oil-based dispersions may not be adversely affected by the presence of polar ionic actives contained therein. However, efficacy of agricultural active ingredients relies on their bio-availability in soluble or molecular form. Accordingly, developing biologically-efficacious, agricultural formulations as oil dispersions (non-water-continuous dispersions) of polar, ionic herbicidal actives such as glyphosate, dicamba, and 2,4-D can be challenging.

Also, because of their typical use in bulk quantities, herbicidal compositions must be highly stable against sedimentation (since redispersion of any settled mass is difficult for any bulk quantity of a formulation), while having a low apparent viscosity (i.e., high-shear-rate viscosity) so that they can be easily dispensed. Obtaining contrasting rheological properties such as having a high low-shear-rate viscosity (for high stability) along with a low high-shear-rate-viscosity (for high flowability) is challenging, and attaining a formulation having sub-optimal properties invariably leads to compromised levels of stability and flowability.

In view of these problems, there remains a need for effective strategies of formulating stable herbicidal compositions having high loadings of various lipophilic, oil-dissolvable, herbicides, and/or insoluble solid herbicides.

SUMMARY

Various herbicidal dispersion compositions of the present invention comprise an oil continuous phase comprising an acetamide herbicide and a nonaqueous liquid, wherein the weight ratio of the nonaqueous liquid to acetamide herbicide is at least about 1:1, at least about 1.1:1, at least about 1.2:1, at least about 1.3:1, at least about 1.4:1, or at least about 1.5:1; and a dispersed phase in the oil continuous phase and comprising a solid phase herbicide. These compositions can be classified as solid-in-oil suspension.

Other herbicidal dispersion compositions of the present invention comprise an oil continuous phase comprising a nonaqueous liquid; a first bulk dispersed phase in the oil continuous phase, wherein the first bulk dispersed phase comprises an auxin herbicide that is at least partially dissolved in the acetamide herbicide and/or an affinity solvent for the auxin herbicide; and a second bulk dispersed phase in the oil continuous phase and comprising a solid phase herbicide. Accordingly, these compositions can be classified as oil-in-oil emulsion-co-solid-in-oil suspension. In some of these compositions, the second bulk dispersed phase further comprises a second bulk dispersed phase oil and wherein the solid phase herbicide is dispersed in the second bulk dispersed phase oil. These compositions can be classified as oil-in-oil emulsion-co-solid-in-oil-in-oil emulsion.

The present invention is also directed to various methods of preparing these herbicidal dispersion compositions. Some methods comprise mixing a nonaqueous liquid, a solid phase herbicide, and an acetamide herbicide to form the herbicidal dispersion composition comprising an oil continuous phase comprising the nonaqueous liquid and the acetamide herbicide, and a dispersed phase in the oil continuous phase and comprising the solid phase herbicide, wherein the weight ratio of the nonaqueous liquid to acetamide herbicide is at least about 1:1, at least about 1.1:1, at least about 1.2:1, at least about 1.3:1, at least about 1.4:1, or at least about 1.5:1. Other methods comprise mixing an acetamide herbicide and an auxin herbicide to form a first mixture, wherein the auxin herbicide is at least partially dissolved in the acetamide herbicide; mixing a nonaqueous liquid and a solid phase herbicide to form a second mixture; and mixing the first mixture with the second mixture to form the herbicidal dispersion composition comprising an oil continuous phase comprising the nonaqueous liquid, a first bulk dispersed phase comprising the acetamide herbicide and the auxin herbicide that is at least partially dissolved in the acetamide herbicide and a second bulk dispersed phase comprising a solid phase herbicide.

Embodiments of the present invention are also directed to various pesticidal dispersion compositions comprising: (a) an oil continuous phase comprising a nonaqueous liquid having a dielectric constant of about 10 or less and an insignificant solvency for the ionic pesticidal active ingredient; (b) a dispersed phase comprising an ionic pesticidal active ingredient suspended in the oil continuous phase; (c) a rheology modifier; and (d) a dispersing agent.

Some embodiments of the present invention are also directed to various co-emulsions include oil-in-oil co-emulsion pesticidal compositions comprising: (a) an oil continuous phase comprising a first nonaqueous liquid; (b) a first dispersed phase emulsified in the oil continuous phase, wherein the first dispersed phase comprises a second nonaqueous liquid and pesticidal active ingredient dissolved in the second nonaqueous liquid; (c) a second dispersed phase emulsified in the oil continuous phase, wherein the second dispersed phase comprises a third nonaqueous liquid and a solid phase pesticidal active ingredient is dispersed in the third nonaqueous liquid; (d) a rheology modifier; (e) an emulsifying agent; and (f) a dispersing agent, wherein the dispersing agent is insoluble in the first nonaqueous liquid, and wherein the first nonaqueous liquid, second nonaqueous liquid, and third nonaqueous liquid are different and are substantially immiscible with one another.

Other embodiments of the present invention are directed to polar liquid-in-oil and oil-in-oil co-emulsion pesticidal compositions comprising: (a) an oil continuous phase comprising a first liquid comprising a nonaqueous liquid substantially immiscible with water; (b) a first dispersed phase emulsified in the oil continuous phase, wherein the first dispersed phase comprises a second liquid and pesticidal active ingredient dissolved in the second liquid; (c) a second dispersed phase emulsified in the oil continuous phase, wherein the second dispersed phase comprises a third liquid and a solid phase pesticidal active ingredient dispersed in the third liquid; (d) a rheology modifier; (e) an emulsifying agent; and (f) a dispersing agent, wherein the dispersing agent is insoluble in the first liquid, and wherein the first liquid, second liquid, and third liquid are different and are substantially immiscible with one another.

Still other embodiments of the present invention are directed to various wax-in-oil and oil-in-oil co-emulsion pesticidal compositions comprising: (a) an oil continuous phase comprising a first liquid comprising a nonaqueous liquid substantially immiscible with water; (b) a first dispersed phase emulsified in the oil continuous phase, wherein the first dispersed phase comprises (i) a second liquid which is substantially immiscible with the first liquid, and (ii) a waxy solid, and optionally a pesticidal active ingredient soluble in the second liquid and/or in the molten form of the waxy solid; (c) a second dispersed phase emulsified in the oil continuous phase, wherein the second dispersed phase comprises (i) a third liquid which is substantially immiscible with the first liquid and a (ii) pesticidal active ingredient dispersed in the third liquid; (d) a third dispersed phase emulsified in the oil continuous phase, wherein the third dispersed phase comprises a fourth liquid and a solid phase pesticidal active ingredient dispersed in the fourth liquid; (e) a rheology modifier; (f) an emulsifying agent; and (g) a dispersing agent, wherein the dispersing agent is insoluble in the first liquid.

Further embodiments of the present invention include wax-in-oil emulsion pesticidal compositions. In some embodiments, the pesticidal dispersion composition is a herbicidal dispersion composition comprising an oil continuous phase comprising a nonaqueous liquid (as described herein); and a dispersed phase comprising particulates of a solid matrix comprising an acetamide herbicide and a waxy solid. In other embodiments, these herbicidal compositions comprise a particulate of a solid matrix comprising an acetamide herbicide and a waxy solid, wherein the particulates are dispersed in water (e.g., an application mixture).

The present invention also relates to processes for preparing herbicidal application mixtures. Various processes comprise mixing water with an herbicidal dispersion composition as described herein to form the herbicidal application mixture, wherein the herbicidal application mixture is a water-continuous dispersion.

The present invention relates to methods for controlling weeds in a field of crop plants comprising mixing water with a composition as described herein and applying the herbicidal application mixture to the field in an herbicidally effective amount.

The present invention further relates to various herbicidal compositions comprising an auxin herbicide acid, a quaternary amine compound, and/or a reaction product of the auxin herbicide and the quaternary amine compound, wherein the quaternary amine compound has a structure of formula (I):

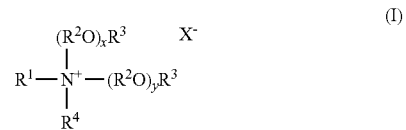

wherein $R^1$ is hydrocarbyl or substituted hydrocarbyl having from 1 to about 30 carbon atoms; each $R^2$ in each of the $(R^2O)_x$ and $(R^2O)_y$ groups is independently a linear or branched $C_2$-$C_4$ alkylene; each $R^3$ is independently hydrogen, or a linear or branched alkyl group having from 1 to about 4 carbon atoms; $R^4$ is hydrocarbyl or substituted hydrocarbyl having from 1 to about 30 carbon atoms; x and y are independently a number from 0 to about 10; and $X^-$ is an agriculturally acceptable anion, with the proviso that $X^-$ is not a hydroxide anion when x and y are each 0 and at least one of $R^1$, $R^2$, $R^3$, and $R^4$ is an alkyl with 2 to 4 carbon atoms or an arylalkyl, and/or (ii) an affinity solvent for the auxin herbicide acid, wherein the solvent satisfies at least one of the following:

(1) a molecular weight of at least about 300 grams per mole, at least about 600 grams per mole, or at least about 900 grams per mole,
(2) at least one double bond groups per molecule of the solvent, and/or
(3) at least four hydrogen bonding groups per molecule of the solvent.

The present invention includes various methods for controlling weeds in a field of crop plants comprising applying any one of the herbicidal compositions described herein or a dilution thereof to the field in an herbicidally effective amount.

Other objects and features will be in part apparent and in part pointed out hereinafter.

DETAILED DESCRIPTION

The present invention relates to various non-water-continuous (i.e., oil-continuous) herbicidal dispersion compositions and processes for preparing these herbicidal dispersion compositions. The present invention further relates to herbicidal application mixtures that are water continuous dispersion compositions, processes for preparing these application mixtures, and various methods of using the application mixtures.

In various aspects, the present invention provides for non-water-continuous or oil-continuous dispersion compositions for mixtures of herbicidal active ingredients, having improved chemical and physical stability. It has been discovered that i) certain chemically unstable herbicidal active ingredients exhibit increased chemical stability when formulated as oil-continuous dispersions, wherein the oil continuous phase of these dispersions comprises substantial amounts of oily liquids having relatively low dielectric constants; ii) certain chemically reactive herbicidal active ingredients exhibit increased chemical stability in oil-continuous dispersion compositions, wherein the active ingredients are physically separated from one another by one or more oily liquid phases having relatively low dielectric constants; and iii) high loadings of certain ionic herbicidal active ingredients can be incorporated into herbicidal formulations in the form of oil-continuous dispersion compositions, wherein the oil continuous phase of these dispersions comprises substantial amounts of oily liquids having relatively low dielectric constants. Methods of incorporating high loadings of highly polar surfactants into oil-continuous herbicidal dispersion compositions, without the addition of any polar solvent have also been discovered. The herbicidal dispersion compositions described herein can be in various forms including solid-in-oil suspension compositions, oil-in-oil emulsion compositions, solid-in-oil-in-oil emulsion compositions, and combinations thereof, wherein the net hydrophilic-lipophilic balance (HLB) values for the surfactant mixtures contained therein are suitable for having physically-stable oil-continuous dispersion compositions.

Various aspects of the present invention are directed to formulation strategies that can enable biologically-efficacious, stable mixtures of chemically unstable and/or ionic agricultural active ingredients. Further aspects of the present invention are directed to strategies to overcome deficiencies of oil dispersion compositions for agricultural formulations, including inadequacies of oil dispersions in stabilizing unstable active ingredients and/or mutually reactive active ingredient mixtures, high surfactant demand, and need of a polar diluent for incorporating hydrophilic surfactants into the compositions.

Applicants have found that the herbicidal active ingredients can be combined in biologically-efficacious, surfactant-lean, physically and chemically stable mixtures by formulating the active ingredients into various types of strongly non-polar non-water-continuous dispersion compositions. These strongly non-polar non-water-continuous dispersion compositions comprise a strongly non-polar oil, which means that a significant portion of the oil continuous phase is a hydrocarbon, a silicone oil, an ester (i.e. with a carbon atom content of at least 12), and mixtures thereof. In various embodiments, the strongly non-polar oil comprises a silicone oil having a viscosity of from about 5 cst to about 100,000 cst, from about 5 cst to about 10,000 cst, from about 5 cst to about 1,000 cst, from about 5 cst to about 500 cst, from about 10 cst to about 100,000 cst, from about 10 cst to about 10,000 cst, from about 10 cst to about 1,000 cst, from about 10 cst to about 500 cst, from about 20 cst to about 100,000 cst, from about 20 cst to about 10,000 cst, from about 20 cst to about 1,000 cst, or from about 20 cst to about 500 cst.

Other aspects of the present invention include providing herbicidal dispersion compositions that are stable against compositional changes due to chemical degradation of ingredients such as the herbicidal active ingredients and surfactants. Providing a chemically stable herbicidal composition advantageously enables maintaining the efficacy of the composition over prolonged storage and varying temperature conditions. For example, the present invention provides herbicidal dispersion compositions of improved chemical stability that can be maintained over an extended period of time and broad temperature range. Herbicidal compositions can be exposed to elevated and/or below-freezing temperatures during storage and transportation. Therefore, providing herbicidal compositions that are stable over a wide range of temperatures, such as high as 40° C. to 54° C. or as low as −5° C. to −20° C., is highly advantageous.

The end-use application of concentrated herbicidal dispersion compositions generally requires dilution of the composition with water prior to application. Accordingly, further aspects of the present invention are directed to providing herbicidal dispersion compositions containing relatively high loadings of herbicides that can be diluted with water to readily form water-continuous dispersions. Non-water-continuous herbicidal dispersion compositions that readily form water-continuous dispersions upon sufficient dilution do not require high-shear mixing for emulsification.

Other aspects of the present invention provide for biologically-efficacious premix formulations as oil-dispersions with high loadings of ionic active ingredients. Further aspects of the present invention provide for the dispersion of multiple active ingredients (in solid and/or in liquid forms) using a single dispersing and/or an emulsifying polymer (rather than multiple polymers), which avoids potential problems with thermodynamic incompatibility often faced with mixtures of polymers. Still other aspects of the present invention provide for non-water-continuous dispersion compositions that readily emulsify in dilution-water for end-application, by incorporating high-HLB surfactants into the non-water-continuous dispersion compositions, while ensuring that these added surfactants do not adversely affect the physical and chemical stability of the dispersion compositions.

As noted, various herbicidal dispersion compositions of the present invention are non-water-continuous dispersion compositions (i.e., oil dispersions) comprising an oil continuous phase, and a dispersed phase that can be a solid phase which is substantially insoluble in the oil continuous phase and/or an oil phase which is completely or partially immiscible with the oil continuous phase. Accordingly, the non-water-continuous dispersion compositions can be solid-in-oil dispersion compositions, oil-in-oil dispersion compositions, solid-in-oil-in-oil emulsion compositions, and combinations thereof.

Generally, the various non-water-continuous herbicidal dispersion compositions of the present invention contain a relatively high total herbicide concentration such that in various embodiments these compositions can be considered as herbicidal concentrates. For example, in various embodiments, the dispersion compositions have a total herbicide loading of at least about 10 wt. %, at least about 20 wt. %, at least about 30 wt. %, at least about 40 wt. %, at least about 50 wt. %, or at least about 60 wt. %. In some embodiments, the compositions have a total herbicide loading of from about 10 wt. % to about 80 wt. %, from about 20 wt. % to about 80 wt. %, from about 30 wt. % to about 80 wt. %, from about 40 wt. % to about 80 wt. %, from about 50 wt. % to about 80 wt. %, from about 60 wt. % to about 80 wt. %, from about 10 wt. % to about 70 wt. %, from about 20 wt. % to about 70 wt. %, from about 30 wt. % to about 70 wt. %, from about 40 wt. % to about 70 wt. %, from about 50 wt. % to about 70 wt. %, from about 60 wt. % to about 70 wt. %, from about 10 wt. % to about 60 wt. %, from about 20 wt. % to about 60 wt. %, from about 30 wt. % to about 60 wt. %, from about 40 wt. % to about 60 wt. %, or from about 50 wt. % to about 60 wt. %. Where applicable, herbicide concentrations are calculated on an acid equivalent basis.

Further, the oil continuous phase can constitute a majority of the total volume of the non-water-continuous herbicidal dispersion compositions. In various embodiments, the volume fraction of the oil continuous phase based on the total volume of the dispersion composition is greater than about 0.6, greater than about 0.7, or greater than about 0.8. In some embodiments, the volume fraction of the oil continuous phase based on the total volume of the composition is from 0.5 to about 0.9, from 0.5 to about 0.8, from 0.5 to about 0.7, from 0.6 to about 0.9, from 0.6 to about 0.8, or from 0.6 to about 0.7.

Pesticidal Dispersion Compositions

Various non-water-continuous pesticidal dispersion compositions of the present invention include compositions comprising: (a) an oil continuous phase comprising a nonaqueous liquid having a dielectric constant of about 10 or less and an insignificant solvency for the ionic pesticidal active ingredient (e.g., a solubility of less than about 1 wt. %, less than about 0.1 wt. %, or even less than about 0.01 wt. %); (b) a dispersed phase comprising an ionic pesticidal active ingredient suspended in the oil continuous phase; (c) a rheology modifier; and (d) a dispersing agent.

In various embodiments, the ionic pesticidal active ingredient is a solid phase pesticidal active ingredient. For example, the ionic pesticidal active ingredient comprises a solid phase ionic herbicide (e.g., as described herein), and the dispersion is a solid-in-oil suspension. In some embodiments, the ionic pesticidal active ingredient is dissolved in a polar liquid that is immiscible with the nonaqueous liquid of the continuous phase, and the resulting solution is emulsified in the continuous phase to form a polar liquid-in-oil emulsion. In certain embodiments, the polar liquid is selected from the group consisting of water, alcohol, polyol, ether, polar ester, polar amide, and mixtures thereof.

In various embodiments, the nonaqueous liquid comprises a strongly non-polar nonaqueous liquid as defined herein. For example, in some embodiments, the nonaqueous liquid can be selected from the group consisting of oily pesticidal active ingredient (e.g., an oil phase herbicide as described herein), hydrocarbon-based liquids, vegetable oils, ester oils, amide oils, aromatic oils, silicone oils, and mixtures thereof (all described in greater detail herein).

Various non-water-continuous herbicidal dispersion compositions of the present invention include solid-in-oil herbicidal dispersion compositions. In general, these compositions comprise an oil continuous phase comprising an oil phase herbicide and a dispersed phase comprising a solid phase herbicide. In these compositions, the dispersed phase is completely or partially immiscible in the oil continuous phase. The term "partially immiscible" means that no more than about 10 wt. %, no more than about 5 wt. %, no more than about 1 wt. %, no more than about 0.1 wt. %, or no more than about 0.01 wt. % of the component is miscible in the respective solvent (e.g., oil continuous phase).

Examples of oil phase herbicides include acetamide herbicides. In general acetamide herbicides are relatively polar, oily herbicides. Acetamide herbicides include, for example, acetochlor, alachlor, butachlor, butenachlor, carbetamide, delachlor, dethatyl, dimethachlor, dimethenamid, dimethenamid-P, mefenacet, metazochlor, metolachlor, S-metolachlor, napropamide, pretilachlor, pronamide, propachlor, propisochlor, prynachlor, terbuchlor, thenylchlor and xylachlor, esters thereof, and mixtures thereof. In some embodiments, the acetamide herbicide is selected from the group consisting of acetochlor, alachlor, metolachlor, S-metolachlor, and mixtures thereof. In certain embodiments, the acetamide herbicide comprises acetochlor. Accordingly, various herbicidal dispersion compositions of the present invention comprise an oil continuous phase comprising an acetamide herbicide and a dispersed phase comprising a solid phase herbicide.

These compositions can comprise a relatively high concentration of the acetamide herbicide. In various embodiments, the concentration of the acetamide herbicide can be at least about 10 wt. %, at least about 15 wt. %, at least about 20 wt. %, at least about 25 wt. %, at least about 30 wt. %, at least about 35 wt. %, or at least about 40 wt. %. For example, the concentration of the acetamide herbicide can be from about 10 wt. % to about 65 wt. %, from about 20 wt. % to about 65 wt. %, from about 30 wt. % to about 65 wt. %, from about 40 wt. % to about 65 wt. %, from about 50 wt. % to about 65 wt. %, from about 10 wt. % to about 60 wt. %, from about 20 wt. % to about 60 wt. %, from about 30 wt. % to about 60 wt. %, from about 40 wt. % to about 60 wt. %, from about 50 wt. % to about 60 wt. %, from about 10 wt. % to about 55 wt. %, from about 20 wt. % to about 55 wt. %, from about 30 wt. % to about 55 wt. %, from about 40 wt. % to about 55 wt. %, from about 50 wt. % to about 55 wt. %, or from about 40 wt. % to about 50 wt. %.

Solid phase herbicides include herbicides that are completely or partially immiscible in the oil continuous phase. Examples of solid phase herbicides include hydroxyphenylpyruvate dioxygenase (HPPD) inhibitors such as aclonifen, amitrole, beflubutamid, benzofenap, clomazone, diflufenican, fluridone, flurochloridone, flurtamone, isoxachlortole, isoxaflutole, mesotrione, norflurazon, picolinafen, pyrazolynate, pyrazoxyfen, sulcotrione, tembotrione, topramezone, tolpyralate, tefuryltrione, salts and esters thereof, and mixtures thereof. In some embodiments, the solid phase herbicide comprises mesotrione. Other solid phase herbicides include solid phase ionic herbicides such as glyphosate, glufosinate, and salts thereof. Other solid phase ionic herbicides auxin herbicides and salts thereof as described herein. Still other solid herbicides include various protoporphyrinogen oxidase (PPO) inhibitors include, for example, acifluorfen, azafenidin, bifenox, butafenacil, carfentrazone-ethyl, flufenpyr-ethyl, flumiclorac, flumicloracpentyl, flumioxazin, fluoroglycofen, fluthiacet-methyl, fomesafen, lactofen, oxadiargyl, oxadiazon, oxyfluorfen, pyraflufen-ethyl, saflufenacil and sulfentrazone, ethyl [3-[2-chloro-4-fluoro-5-(1-m-ethyl-6-trifluoromethyl-2,4-dioxo-1,2,3,4-tetrahydropyrimidin-3-yl)phenoxy]-2-pyridyloxy] acetate, salts and esters thereof, and mixtures thereof. In some embodiments, the solid phase herbicide comprises ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate.

These compositions can comprise a relatively high concentration of the solid phase herbicide. In various embodiments, the concentration of the solid phase herbicide can be at least about 1 wt. %, at least about 2 wt. %, at least about 5 wt. %, at least about 10 wt. %, at least about 15 wt. %, at least about 20 wt. %, at least about 25 wt. %, or at least about 30 wt. %. For example, the concentration of the solid phase herbicide can be from about 1 wt. % to about 40 wt. %, from about 1 wt. % to about 30 wt. %, from about 1 wt. % to about 20 wt. %, from about 1 wt. % to about 10 wt. %, from about 1 wt. % to about 5 wt. %, from about 2 wt. % to about 40 wt. %, from about 2 wt. % to about 30 wt. %, from about 2 wt. % to about 20 wt. %, from about 2 wt. % to about 10 wt. %, from about 2 wt. % to about 5 wt. %, from about 5 wt. % to about 40 wt. %, from about 5 wt. % to about 30 wt. %, from about 5 wt. % to about 20 wt. %, from about 5 wt. % to about 10 wt. %, from about 10 wt. % to about 40 wt. %, from about 10 wt. % to about 30 wt. %, from about 10 wt. % to about 20 wt. %, from about 15 wt. % to about 40 wt. %, from about 15 wt. % to about 30 wt. %, or from about 15 wt. % to about 20 wt. %.

It has been found that acetamide herbicides such as acetochlor and solid phase herbicides such as mesotrione are prone to react with each other or degrade when mixed, particularly at relatively high concentrations. Applicants have discovered that improved chemical stability can achieved by incorporating in the oil continuous phase a relatively high concentration of a nonaqueous liquid (particularly, a strongly non-polar nonaqueous liquid) relative to the concentration of the acetamide herbicide. In various embodiments, the weight ratio of nonaqueous liquid to acetamide herbicide is at least about 1:1, at least about 1.1:1, at least about 1.2:1, at least about 1.3:1, at least about 1.4:1, or at least about 1.5:1. For example, the weight ratio of nonaqueous liquid to acetamide herbicide can be from about 1:1 to about 10:1, from about 1:1 to about 5:1, from about 1:1 to about 3:1, from about 1:1 to about 2:1, from about 1:1 to about 1.5:1, from about 1.1:1 to about 10:1, from about 1.1:1 to about 5:1, from about 1.1:1 to about 3:1, from about 1.1:1 to about 2:1, from about 1.1:1 to about 1.5:1, from about 1.2:1 to about 10:1, from about 1.2:1 to about 5:1, from about 1.2:1 to about 3:1, from about 1.2:1 to about 2:1, or from about 1.2:1 to about 1.5:1.

In various embodiments, the nonaqueous liquid constitutes a significant portion of the composition. For example, the nonaqueous liquid concentration can be at least about 10 wt. %, at least about 15 wt. %, at least about 20 wt. %, at least about 25 wt. %, at least about 30 wt. %, at least about 35 wt. %, at least about 40 wt. %, or at least about 50 wt. %. In certain embodiments, the concentration of the nonaqueous liquid is from about 10 wt. % to about 75 wt. %, from about 20 wt. % to about 75 wt. %, from about 30 wt. % to about 75 wt. %, from about 40 wt. % to about 75 wt. %, from about 50 wt. % to about 75 wt. %, from about 10 wt. % to about 65 wt. %, from about 20 wt. % to about 65 wt. %, from about 30 wt. % to about 65 wt. %, from about 40 wt. % to about 65 wt. %, from about 50 wt. % to about 65 wt. %, from about 10 wt. % to about 60 wt. %, from about 20 wt. % to about 60 wt. %, from about 30 wt. % to about 60 wt. %, from about 40 wt. % to about 60 wt. %, from about 50 wt. % to about 60 wt. %, from about 10 wt. % to about 55 wt. %, from about 20 wt. % to about 55 wt. %, from about 30 wt. % to about 55 wt. %, from about 40 wt. % to about 55 wt. %, from about 50 wt. % to about 55 wt. %, or from about 40 wt. % to about 50 wt. %.

It has been found that a strongly non-polar nonaqueous liquid can provide for enhanced chemical stability. Chemical stability is evaluated by determining the weight % recovery of the acetamide herbicide and/or solid phase herbicide (e.g., mesotrione) after storage for a period of time at a fixed temperature. For example, in one stability test, the composition is stored at 40° C. for 8 weeks. In another stability test, the composition is stored at 54° C. for 8 weeks, 4 weeks, 2 weeks, or 1 week. The herbicide concentrations are measured at the beginning of the storage period and at the end of the storage period. The weight % recovery of the acetamide herbicide and/or solid phase herbicide is calculated by dividing the final concentration (e.g., weight % after storage period) of the acetamide herbicide and/or solid phase herbicide by the initial concentration (e.g., weight % at start of storage period) of the respective herbicide and multiplying by 100%. The greater the weight % recovery of the herbicide, the greater the chemical stability of the composition. Enhanced chemical stability can be, for example, recovery of at least 95% by weight of the solid phase herbicide (e.g., mesotrione) after the composition is stored at 54° C. for 2 weeks.

In various embodiments, the strongly non-polar nonaqueous liquid that can provide for enhanced chemical stability have a dielectric constant measured at 25° C. that is about 10 or less, about 5 or less, about 4 or less, about 3.5 or less, about 3 or less, about 2.5 or less, or about 2 or less. Examples of nonaqueous liquids include various hydrocarbon-based liquids such as paraffinic and aliphatic hydrocarbon solvents (e.g., solvents comprising $C_5$-$C_{25}$ branched and/or linear alkanes or $C_{10}$-$C_{20}$ branched alkanes). Paraffinic and aliphatic hydrocarbon liquids include normal paraffin oil (e.g., NORPAR 15, available from ExxonMobil); isoparaffin oils (e.g., ISOPAR V, ISOPAR L, and ISOPAR M, also available from ExxonMobil); mineral oils; and aliphatic fluids or oils (e.g., EXXSOL D110 and EXXSOL D130, available from ExxonMobil). Other non-polar nonaqueous liquids include ester oils with a carbon atom-content of at least 12 (e.g., isopropyl myristate), triglycerides (e.g., vegetable oils), and silicone oils (e.g., oils of relatively high molecular weight dimethicone). In various embodiments, the silicone oil has a viscosity of from about 5 cst to about 100,000 cst, from about 5 cst to about 10,000 cst, from about 5 cst to about 1,000 cst, from about 5 cst to about 500 cst, from about 10 cst to about 100,000 cst, from about 10 cst to about 10,000 cst, from about 10 cst to about 1,000 cst, from about 10 cst to about 500 cst, from about 20 cst to about 100,000 cst, from about 20 cst to about 10,000 cst, from about 20 cst to about 1,000 cst, or from about 20 cst to about 500 cst.

Complex Pesticidal Dispersion Compositions

Other non-water-continuous pesticidal dispersion compositions of the present invention include various complex pesticidal oil dispersion compositions. Various compositions are co-emulsions which refers to an emulsions comprising multiple dispersed phases, with each dispersed phase individually comprising a liquid phase immiscible with the respective liquid phases of the other dispersed phases, with each of the different liquid phases of the multiple dispersed phases dispersed separately in the oil continuous phase.

For example, various co-emulsions include oil-in-oil co-emulsion pesticidal compositions. In some embodiments, these compositions comprise: (a) an oil continuous phase comprising a first nonaqueous liquid; (b) a first dispersed phase emulsified in the oil continuous phase, wherein the first dispersed phase comprises a second nonaqueous liquid and pesticidal active ingredient dissolved in the second nonaqueous liquid; (c) a second dispersed phase emulsified in the oil continuous phase, wherein the second dispersed phase comprises a third nonaqueous liquid and a solid phase pesticidal active ingredient is dispersed in the third nonaqueous liquid; (d) a rheology modifier; (e) an emulsifying agent; and (f) a dispersing agent, wherein the dispersing agent is insoluble in the first nonaqueous liquid, and wherein the first nonaqueous liquid, second nonaqueous liquid, and third nonaqueous liquid are different and are substantially immiscible with one another. As used herein, the phrase "substantially immiscible" or "substantially insoluble" refers to the miscibility of one component in another measured at room temperature (20° C.) that is less than 10 wt. %, less than 5 wt. %, less than 1 wt. %, less than 0.1 wt. %, or even less than 0.01 wt. %.

In various embodiments of these oil-in-oil co-emulsion pesticidal compositions, the first nonaqueous liquid has a dielectric constant measured at 25° C. that is about 10 or less, about 5 or less, about 4 or less, about 3.5 or less, about 3 or less, about 2.5 or less, or about 2 or less. In some embodiments, the first nonaqueous liquid is selected from the group consisting of hydrocarbon-based liquids, vegetable oils, silicone oils, and mixtures thereof (as described herein). Also, in certain embodiments, the second nonaqueous liquid is selected from the group consisting of oily pesticidal active ingredients, vegetable oils, ester oils, amide oils, aromatic oils, and mixtures thereof (as described herein). In various embodiments, the third nonaqueous liquid is selected from the group consisting of silicone oils, hydrocarbon-based liquids, vegetable oils, and mixtures thereof (as described herein). In some embodiments, the third nonaqueous liquid comprises a silicone oil (as described herein). In particular embodiments, the second dispersed phase comprises a dispersing agent comprising a copolymer of acrylate/ethylhexyl acrylate/dimethicone methacrylate.

Other complex pesticidal oil dispersion compositions include polar liquid-in-oil and oil-in-oil co-emulsion pesticidal compositions. In various embodiments, these compositions comprise: (a) an oil continuous phase comprising a first liquid comprising a nonaqueous liquid substantially immiscible with water; (b) a first dispersed phase emulsified in the oil continuous phase, wherein the first dispersed phase comprises a second liquid and pesticidal active ingredient dissolved in the second liquid; (c) a second dispersed phase emulsified in the oil continuous phase, wherein the second dispersed phase comprises a third liquid and a solid phase pesticidal active ingredient dispersed in the third liquid; (d) a rheology modifier; (e) an emulsifying agent; and (f) a dispersing agent, wherein the dispersing agent is insoluble in the first liquid, and wherein the first liquid, second liquid, and third liquid are different and are substantially immiscible with one another.

In various embodiments of these polar liquid-in-oil and oil-in-oil co-emulsion pesticidal compositions, the first liquid has a dielectric constant measured at 25° C. that is about 10 or less, about 5 or less, about 4 or less, about 3.5 or less, about 3 or less, about 2.5 or less, or about 2 or less. In some embodiments, the first liquid is selected from the group consisting of hydrocarbon-based liquids, vegetable oils, silicone oils, and mixtures thereof (as described herein). Also, in certain embodiments, the second liquid is selected from the group consisting of polar liquids, vegetable oils, ester oils, amide oils, aromatic oils, and mixtures thereof (as described herein). For example, the polar liquid can be selected from the group consisting of water, alcohols, polyols, ethers, polar esters, polar amides, and mixtures thereof. In various embodiments, the third liquid is selected from the group consisting of hydrocarbon-based liquids, vegetable oils, silicone oils, and mixtures thereof (as described herein). In some embodiments, the third liquid comprises a silicone oil (as described herein). In particular embodiments, the second dispersed phase comprises a dispersing agent comprising a copolymer of acrylate/ethylhexyl acrylate/dimethicone methacrylate.

Still other complex pesticidal oil dispersion compositions include various wax-in-oil and oil-in-oil co-emulsion pesticidal compositions. In various embodiments, these compositions comprise: (a) an oil continuous phase comprising a first liquid comprising a nonaqueous liquid substantially immiscible with water; (b) a first dispersed phase emulsified in the oil continuous phase, wherein the first dispersed phase comprises (i) a second liquid which is substantially immiscible with the first liquid, and (ii) a waxy solid, and optionally a pesticidal active ingredient soluble in the second liquid and/or in the molten form of the waxy solid; (c) a second dispersed phase emulsified in the oil continuous phase, wherein the second dispersed phase comprises (i) a third liquid which is substantially immiscible with the first liquid and a (ii) pesticidal active ingredient dispersed in the third liquid; (d) a third dispersed phase emulsified in the oil continuous phase, wherein the third dispersed phase comprises a fourth liquid and a solid phase pesticidal active ingredient dispersed in the fourth liquid; (e) a rheology modifier; (f) an emulsifying agent; and (g) a dispersing agent, wherein the dispersing agent is insoluble in the first liquid.

In various embodiments of these wax-in-oil and oil-in-oil co-emulsion pesticidal compositions, the first liquid has a dielectric constant measured at 25° C. that is about 10 or less, about 5 or less, about 4 or less, about 3.5 or less, about 3 or less, about 2.5 or less, or about 2 or less. In some embodiments, the first liquid is selected from the group consisting of hydrocarbon-based liquids, vegetable oils, silicone oils, and mixtures thereof (as described herein). Also, in certain embodiments, the second liquid is selected from the group consisting of polar liquids, vegetable oils, ester oils, amide oils, aromatic oils, and mixtures thereof (as described herein). For example, the polar liquid can be selected from the group consisting of water, alcohols, polyols, ethers, polar esters, polar amides, and mixtures thereof. In some embodiments, the amount of second liquid in the first dispersed phase is no greater than about 95 wt. % of the first dispersed phase. In various embodiments, the second liquid and the third liquid are the same. In certain embodiments, the fourth liquid is selected from the group consisting of hydrocarbon-based liquids, vegetable oils, silicone oils, and mixtures thereof. In some embodiments, the fourth liquid comprises a silicone oil (as described herein). In particular embodiments, the third dispersed phase comprises a dispersing agent comprising a copolymer of acrylate/ethylhexyl acrylate/dimethicone methacrylate.

In various embodiments, the waxy solid noted above can be miscible with the second liquid when a mixture of the waxy solid and the second liquid is heated to above the melting point of the waxy solid. In some embodiments, the mixture of the waxy solid and the second liquid is prepared by melting the waxy solid and mixing the melted waxy solid with the second liquid. In further embodiments, the first dispersed phase comprises solid particles at temperatures below the melting point of the waxy solid. In various embodiments, the second liquid is present within a solid matrix comprising the waxy solid.

In various embodiments, the waxy solid as referred to herein can be selected from the group consisting of a high molecular weight polymer wax (e.g., polyethylene glycol, polyethylene), hydrocarbon wax (paraffin wax, microcrystalline wax), a natural wax (carnauba wax, beeswax), triglyceride wax (hydrogenated castor oil wax), silicone wax, an ester wax, and mixtures thereof. In some embodiments, the high molecular weight polymer wax comprises polyethylene glycol wax. For example, the polyethylene glycol wax can have an average molecular weight of about 1000 Da or more or from about 1000 Da to about 9000 Da. In various embodiments, n the waxy solid (e.g., the polyethylene glycol wax) has a melting point of from about 35° C. to about 95° C., from about 40° C. to about 95° C., from about 50° C. to about 95° C., or from about 60° C. to about 95° C.

In various wax-in-oil and oil-in-oil co-emulsion pesticidal compositions, a homogeneous solution comprising a mixture of i) an oily pesticidal active ingredient and/or an oil-soluble pesticidal active ingredient dissolved in an oily solvent, and ii) a wax which is completely miscible with the oily pesticidal active ingredient or the oily solvent can be produced upon heating the mixture to above the melting point of the wax. The heated oil-wax mixture can be emulsified in a strongly nonpolar oil which is necessarily a poor solvent for both the oil and the wax components. Cooling the resulting emulsion to below the melting point of the wax produces a wax-in-oil emulsion, where the emulsion droplets exist as congealed wax droplets (i.e., particulates of solid matrix comprising the pesticidal active ingredient and waxy solid), due to solidification/crystallization of the wax. In effect, the oily pesticidal active ingredient and/or the oil-soluble pesticidal active ingredient is entrapped within a hard, porous, solid matrix of interconnected wax crystals.

These compositions can exhibit a slower rate of diffusion of the active ingredient in and out of the emulsified wax droplets, compared to without the wax. Also, these compositions can exhibit enhanced physical segregation of active ingredients in the composition; improved chemical stability through minimizing inter-mixing of mutually reactive active ingredients; and improved crop safety due to decrease of diffusion/release rate of active ingredients.

Still other complex pesticidal oil dispersion compositions include various wax-in-oil emulsion pesticidal compositions. In some embodiments, the pesticidal dispersion composition is a herbicidal dispersion composition. In various embodiments, these compositions comprise an oil continuous phase comprising a nonaqueous liquid (as described herein); and a dispersed phase comprising particulates of a solid matrix comprising an acetamide herbicide and a waxy solid. In other embodiments, these herbicidal compositions comprise a particulate of a solid matrix comprising an acetamide herbicide and a waxy solid, wherein the particulates are dispersed in water (e.g., an application mixture).

In these and other embodiments, the concentration of the acetamide herbicide is at least about 10 wt. %, at least about 15 wt. %, at least about 20 wt. %, at least about 25 wt. %, at least about 30 wt. %, at least about 35 wt. %, or at least about 40 wt. %. For example, the concentration of the acetamide herbicide can be from about 10 wt. % to about 65 wt. %, from about 20 wt. % to about 65 wt. %, from about 30 wt. % to about 65 wt. %, from about 40 wt. % to about 65 wt. %, from about 50 wt. % to about 65 wt. %, from about 10 wt. % to about 60 wt. %, from about 20 wt. % to about 60 wt. %, from about 30 wt. % to about 60 wt. %, from about 40 wt. % to about 60 wt. %, from about 50 wt. % to about 60 wt. %, from about 10 wt. % to about 55 wt. %, from about 20 wt. % to about 55 wt. %, from about 30 wt. % to about 55 wt. %, from about 40 wt. % to about 55 wt. %, from about 50 wt. % to about 55 wt. %, or from about 40 wt. % to about 50 wt. %.

In some embodiments, the weight ratio of acetamide herbicide to waxy solid is at least about 1:1, at least about 1.5:1, at least about 2:1, or at least about 3:1. For example, the weight ratio of acetamide herbicide to waxy solid is from about 1:1 to about 5:1, from about 1:1 to about 4:1, from about 1:1 to about 3:1, from about 1.5:1 to about 5:1, from about 1.5:1 to about 4:1, from about 1.5:1 to about 3:1, from about 2:1 to about 5:1, from about 2:1 to about 4:1, or from about 2:1 to about 3:1.

As noted herein, acetamide herbicides include, for example, acetochlor, alachlor, butachlor, butenachlor, carbetamide, delachlor, dethatyl, dimethachlor, dimethenamid, dimethenamid-P, mefenacet, metazochlor, metolachlor, S-metolachlor, napropamide, pretilachlor, pronamide, propachlor, propisochlor, prynachlor, terbuchlor, thenylchlor and xylachlor, salts and esters thereof, and mixtures thereof. In some embodiments, the acetamide herbicide is selected from the group consisting of acetochlor, alachlor, metolachlor, S-metolachlor, and mixtures thereof. In certain embodiments, the acetamide herbicide comprises acetochlor.

As described herein, the waxy solid can be selected from the group consisting of a high molecular weight polymer wax (e.g., polyethylene glycol, polyethylene), hydrocarbon wax (paraffin wax, microcrystalline wax), a natural wax (carnauba wax, beeswax), triglyceride wax (hydrogenated castor oil wax), silicone wax, an ester wax, and mixtures thereof. In some embodiments, the high molecular weight polymer wax comprises polyethylene glycol wax. For example, the polyethylene glycol wax can have an average molecular weight of about 1000 Da or more or from about 1000 Da to about 9000 Da. In various embodiments, n the waxy solid (e.g., the polyethylene glycol wax) has a melting point of from about 35° C. to about 95° C., from about 40° C. to about 95° C., from about 50° C. to about 95° C., or from about 60° C. to about 95° C. 40° C. to about 95° C., from about 50° C. to about 95° C., or from about 60° C. to about 95° C.

In some embodiments, these emulsion compositions further comprise a second dispersed phase comprising a solid phase herbicide dispersed, for example, in a silicone oil. The silicone oil can have a viscosity of from about 5 cst to about 100,000 cst, from about 5 cst to about 10,000 cst, from about 5 cst to about 1,000 cst, from about 5 cst to about 500 cst, from about 10 cst to about 100,000 cst, from about 10 cst to about 10,000 cst, from about 10 cst to about 1,000 cst, from about 10 cst to about 500 cst, from about 20 cst to about 100,000 cst, from about 20 cst to about 10,000 cst, from about 20 cst to about 1,000 cst, or from about 20 cst to about 500 cst. The solid phase herbicide can, for example, comprise at least one hydroxyphenylpyruvate dioxygenase (HPPD) inhibitor selected from the group consisting of aclonifen, amitrole, beflubutamid, benzofenap, clomazone, diflufenican, fluridone, flurochloridone, flurtamone, isoxachlortole, isoxaflutole, mesotrione, norflurazon, picolinafen, pyrazolynate, pyrazoxyfen, sulcotrione, tembotrione, topramezone, tolpyralate, tefuryltrione, salts and esters thereof, and mixtures thereof. In some embodiments, the solid phase herbicide comprises isoxaflutole or mesotrione.

Other non-water-continuous herbicidal dispersion compositions of the present invention include various complex herbicidal oil dispersion compositions comprising an acetamide herbicide, an auxin herbicide, and a solid phase herbicide. In general, these compositions comprise a plurality of different bulk dispersed phases in an oil continuous phase. Having a multiplicity of dispersed phase is intended for keeping active ingredients that are mutually reactive, separated from one another, respectively, in discrete or physically-separated phases. Physical separation of dispersed oil phases is accomplished by providing for a repulsive force acting between emulsified droplets of the various dispersed phases, wherein the inter-droplet repulsive force is sufficiently strong to hinder agglomeration or coagulation and subsequent fusion or coalescence of emulsified droplets. This in turn renders the dispersed phases to remain physically separated from one another, while providing for enhanced physical stability for the dispersion compositions.

In various embodiments, the herbicidal dispersion composition comprises an oil continuous phase comprising a nonaqueous liquid; a first bulk dispersed phase in the oil continuous phase, wherein the first bulk dispersed phase comprises an auxin herbicide (e.g., auxin herbicide acid) that is at least partially dissolved in the acetamide herbicide and/or an affinity solvent for the auxin herbicide; and a second bulk dispersed phase in the oil continuous phase and comprising a solid phase herbicide. In these compositions, the bulk dispersed phases are completely or partially immiscible in the oil continuous phase.

In these embodiments, nonaqueous liquids for use in the oil continuous phase typically have no or low solvency or miscibility with acetamide herbicides. For example, silicone oils, mineral oils, and mixtures thereof have been found to have no or low solvency with acetamide herbicides such as acetochlor.

In some embodiments, the nonaqueous liquid constitutes a significant portion of these complex herbicidal dispersion compositions. For example, the nonaqueous liquid concentration in these dispersion compositions can be at least about 10 wt. %, at least about 15 wt. %, at least about 20 wt. %, at least about 25 wt. %, at least about 30 wt. %, at least about 35 wt. %, at least about 40 wt. %, or at least about 50 wt. %. In certain embodiments, the concentration of the nonaqueous liquid is from about 10 wt. % to about 75 wt. %, from about 20 wt. % to about 75 wt. %, from about 30 wt. % to about 75 wt. %, from about 40 wt. % to about 75 wt. %, from about 50 wt. % to about 75 wt. %, from about 10 wt. % to about 65 wt. %, from about 20 wt. % to about 65 wt. %, from about 30 wt. % to about 65 wt. %, from about 40 wt. % to about 65 wt. %, from about 50 wt. % to about 65 wt. %, from about 10 wt. % to about 60 wt. %, from about 20 wt. % to about 60 wt. %, from about 30 wt. % to about 60 wt. %, from about 40 wt. % to about 60 wt. %, from about 50 wt. % to about 60 wt. %, from about 10 wt. % to about 55 wt. %, from about 20 wt. % to about 55 wt. %, from about 30 wt. % to about 55 wt. %, from about 40 wt. % to about 55 wt. %, from about 50 wt. % to about 55 wt. %, or from about 40 wt. % to about 50 wt. %.

In various embodiments, auxin herbicide is dissolved in the affinity solvent.

Chemical reactivity can be hindered when a solution of an auxin herbicide acid in an affinity solvent is mixed into a liquid phase that is immiscible with the auxin herbicide acid solution, containing components that are chemically reactive with auxin herbicide acid and/or an amount of auxin herbicide anion that exists in chemical equilibrium with auxin herbicide acid in the solution. This in turn can lead to a greater chemical stability of the foregoing mixture than what would be otherwise.

In various embodiments, the affinity solvent for the auxin herbicide satisfies at least one of the following:
(1) a molecular weight of at least about 300 grams per mole, at least about 600 grams per mole, or at least about 900 grams per mole (e.g., about 900 to about 1500 grams per mole),
(2) at least one double bond groups per molecule of the solvent, and/or
(3) at least four hydrogen bonding groups per molecule of the solvent.

In some embodiments, the affinity solvent comprises an alkylene glycol as described herein. In certain embodiments, the affinity solvent comprises a triglyceride. In various embodiments, the affinity solvent comprises castor oil.

In some embodiments, the second bulk dispersed phase further comprises a second bulk dispersed phase oil and wherein the solid phase herbicide is dispersed in the second bulk dispersed phase oil. In these embodiments, the nonaqueous liquid and the second bulk dispersed phase oil are not the same. Examples of oils that can be used include silicone oil and mineral oils. In various embodiments, the second bulk dispersed phase comprises a silicone oil having a viscosity of from about 5 cst to about 100,000 cst, from about 5 cst to about 10,000 cst, from about 5 cst to about 1,000 cst, from about 5 cst to about 500 cst, from about 10 cst to about 100,000 cst, from about 10 cst to about 10,000 cst, from about 10 cst to about 1,000 cst, from about 10 cst to about 500 cst, from about 20 cst to about 100,000 cst, from about 20 cst to about 10,000 cst, from about 20 cst to about 1,000 cst, or from about 20 cst to about 500 cst.

The complex herbicidal oil dispersion compositions can comprise any of the acetamide herbicides and solid phase herbicides as described herein. In particular embodiments, the acetamide herbicide comprise acetochlor and the solid phase herbicide comprises mesotrione.

In various embodiments, these dispersion compositions can comprise a relatively high concentration of the acetamide herbicide. The concentration of the acetamide herbicide can be at least about 10 wt. %, at least about 15 wt. %, at least about 20 wt. %, at least about 25 wt. %, at least about 30 wt. %, at least about 35 wt. %, or at least about 40 wt. %. For example, the concentration of the acetamide herbicide can be from about 10 wt. % to about 65 wt. %, from about 20 wt. % to about 65 wt. %, from about 30 wt. % to about 65 wt. %, from about 40 wt. % to about 65 wt. %, from about 50 wt. % to about 65 wt. %, from about 10 wt. % to about 60 wt. %, from about 20 wt. % to about 60 wt. %, from about 30 wt. % to about 60 wt. %, from about 40 wt. % to about 60 wt. %, from about 50 wt. % to about 60 wt. %, from about 10 wt. % to about 55 wt. %, from about 20 wt. % to about 55 wt. %, from about 30 wt. % to about 55 wt. %, from about 40 wt. % to about 55 wt. %, from about 50 wt. % to about 55 wt. %, or from about 40 wt. % to about 50 wt. %.

These compositions can also comprise a relatively high concentration of the solid phase herbicide. In various embodiments, the concentration of the solid phase herbicide can be at least about 1 wt. %, at least about 2 wt. %, at least about 5 wt. %, at least about 10 wt. %, at least about 15 wt.

%, at least about 20 wt. %, at least about 25 wt. %, or at least about 30 wt. %. For example, the concentration of the solid phase herbicide can be from about 1 wt. % to about 40 wt. %, from about 1 wt. % to about 30 wt. %, from about 1 wt. % to about 20 wt. %, from about 1 wt. % to about 10 wt. %, from about 1 wt. % to about 5 wt. %, from about 2 wt. % to about 40 wt. %, from about 2 wt. % to about 30 wt. %, from about 2 wt. % to about 20 wt. %, from about 2 wt. % to about 10 wt. %, from about 2 wt. % to about 5 wt. %, from about 5 wt. % to about 40 wt. %, from about 5 wt. % to about 30 wt. %, from about 5 wt. % to about 20 wt. %, from about 5 wt. % to about 10 wt. %, from about 10 wt. % to about 40 wt. %, from about 10 wt. % to about 30 wt. %, from about 10 wt. % to about 20 wt. %, from about 15 wt. % to about 40 wt. %, from about 15 wt. % to about 30 wt. %, or from about 15 wt. % to about 20 wt. %.

The complex herbicidal oil dispersion compositions comprise one or more auxin herbicides that is at least partially dissolved in the acetamide herbicide and/or an affinity solvent for the auxin herbicide. Auxin herbicides include 3,6-dichloro-2-methoxybenzoic acid (dicamba); 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy) butanoic acid (MCPB); 4-chlorophenoxyacetic acid; 2,4,5-trichlorophenoxyacetic acid (2,4,5-T); aminopyralid; clopyralid; fluroxypyr; triclopyr; mecoprop; picloram; quinclorac; aminocyclopyrachlor; benazolin; halauxifen; fluorpyrauxifen; methyl 4-amino-3-chloro-5-fluoro-6-(7-fluoro-1H-indol-6-yl)pyridine-2-carboxylate; 4-amino-3-chloro-5-fluoro-6-(7-fluoro-1H-indol-6-yl)pyridine-2-carboxylic acid; benzyl 4-amino-3-chloro-5-fluoro-6-(7-fluoro-1H-indol-6-yl)pyridine-2-carboxylate; methyl 4-amino-3-chloro-5-fluoro-6-(7-fluoro-1-isobutyryl-1H-indol-6-yl)pyridine-2-carboxylate; methyl 4-amino-3-chloro-6-[1-(2,2-dimethylpropanoyl)-7-fluoro-1H-indol-6-yl]-5-fluoropyridine-2-carboxylate; methyl 4-amino-3-chloro-5-fluoro-6-[7-fluoro-1-(methoxyacetyl)-1H-indol-6-yl] pyridine-2-carboxylate; methyl 6-(1-acetyl-7-fluoro-1H-indol-6-yl)-4-amino-3-chloro-5-fluoropyridine-2-carboxylate; potassium 4-amino-3-chloro-5-fluoro-6-(7-fluoro-1H-indol-6-yl)pyridine-2-carboxylate; butyl 4-amino-3-chloro-5-fluoro-6-(7-fluoro-1H-indol-6-yl)pyridine-2-carboxylate; salts and esters thereof; and mixtures thereof. In various embodiments, the auxin herbicide comprises an auxin herbicide acid such as dicamba acid and/or 2,4-D acid.

In some embodiments, the auxin herbicide comprises an auxin herbicide salt comprising an auxin herbicide anion and a salt-forming cation. For example, the salt-forming cation can comprise a cation of an amine, an alkali metal, or mixture thereof. In various embodiments, the salt-forming cation comprises a cation of an amine selected from the group consisting of ammonia, monoethanolamine, diethanolamine, triethanolamine, dimethylamine, diglycolamine, isopropylamine, and mixtures thereof. In these and other embodiments, the salt-forming cation comprises a cation of an alkali metal selected from the group consisting of sodium, potassium, and mixtures thereof.

In certain embodiments, the auxin herbicide salt is only partially neutralized with base. For example, the molar ratio of salt-forming cation to auxin herbicide anion can be no greater than about 0.8:1, no greater than about 0.75:1, no greater than about 0.7:1, no greater than about 0.65:1, or no greater than about 0.6:1. In some embodiments, the molar ratio of salt-forming cation to auxin herbicide anion is no greater than about 0.55:1, no greater than about 0.5:1; no greater than about 0.45:1, no greater than about 0.4:1, no greater than about 0.35:1, no greater than about 0.3:1, no greater than about 0.25:1, or no greater than about 0.2:1. In various embodiments, the molar ratio of salt-forming cation to auxin herbicide anion is from about 0.2:1 to about 0.8:1, from about 0.2:1 to about 0.75:1, from about 0.2:1 to about 0.7:1, from about 0.2:1 to about 0.65:1, from about 0.2:1 to about 0.6:1, from about 0.2:1 to about 0.55:1, from about 0.2:1 to about 0.5:1, from about 0.2:1 to about 0.45:1, from about 0.2:1 to about 0.4:1, from about 0.2:1 to about 0.35:1, from about 0.2:1 to about 0.3:1, from about 0.3:1 to about 0.8:1, from about 0.3:1 to about 0.75:1, from about 0.3:1 to about 0.7:1, from about 0.3:1 to about 0.65:1, from about 0.3:1 to about 0.6:1, from about 0.3:1 to about 0.55:1, from about 0.3:1 to about 0.5:1, from about 0.3:1 to about 0.45:1, from about 0.3:1 to about 0.4:1, from about 0.4:1 to about 0.8:1, from about 0.4:1 to about 0.75:1, from about 0.4:1 to about 0.7:1, from about 0.4:1 to about 0.65:1, from about 0.4:1 to about 0.6:1, from about 0.4:1 to about 0.55:1, from about 0.4:1 to about 0.5:1, from about 0.5:1 to about 0.9:1, from about 0.5:1 to about 0.8:1, from about 0.5:1 to about 0.75:1, from about 0.5:1 to about 0.7:1, from about 0.5:1 to about 0.65:1, from about 0.6:1 to about 0.9:1, from about 0.6:1 to about 0.8:1, from about 0.6:1 to about 0.75:1, from about 0.6:1 to about 0.7:1, or from about 0.6:1 to about 0.65:1.

Specific salts of dicamba include sodium dicamba, potassium dicamba, diglycolamine dicamba, monoethanolamine dicamba, diethanolamine dicamba, triethanolamine dicamba, dimethylamine dicamba, and mixtures thereof. In some embodiments, the auxin herbicide is selected from the group consisting of sodium dicamba, diglycolamine dicamba, and monoethanolamine dicamba, and mixtures thereof.

Other agronomically acceptable salts of auxin herbicides include polyamine salts such as those described in U.S. Patent Application Publication No. 2012/0184434, which is incorporated herein by reference. The polyamines described in U.S. 2012/0184434 include those of formula (A)

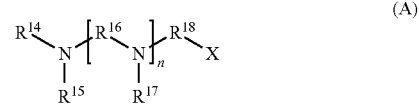

(A)

wherein $R^{14}$, $R^{15}$, $R^{17}$, $R^{19}$ and $R^{20}$ are independently H or $C_1$-$C_6$-alkyl, which is optionally substituted with OH, $R^{16}$ and $R^{18}$ are independently $C_2$-$C_4$-alkylene, X is OH or $NR^{19}R^{20}$, and n is from 1 to 20; and those of formula (B)

(B)

wherein $R^{21}$ and $R^{22}$ are independently H or $C_1$-$C_6$-alkyl, $R^{23}$ is $C_1$-$C_{12}$-alkylene, and $R^{24}$ is an aliphatic $C_5$-$C_8$ ring system, which comprises either nitrogen in the ring or which is substituted with at least one unit $NR^{21}R^{22}$. Specific examples of these polyamines include tetraethylenepentamine, triethylenetetramine, diethylenetriamine, pentamethyldiethylenetriamine, N,N,N',N'',N''-pentamethyl-dipropylenetriamine, N,N-bis(3-dimethylaminopropyl)-N- isopropanolamine, N'-(3-(dimethylamino)propyl)-N,N-dimethyl-1,3-propanediamine, N,N-bis(3-aminopropyl)methylamine, N-(3-dimethylaminopropyl)-N,N-diisopropanolamine, N,N,N'-trimethylaminoethyl-ethanolamine, aminopropylmonomethylethanolamine, and aminoethylethanolamine, and mixtures thereof.

In various compositions described herein, the concentration of the auxin herbicide on acid equivalent basis is at least about 1 wt. %, at least about 2 wt. %, at least about 5 wt. %, at least about 10 wt. %, at least about 15 wt. %, at least about 20 wt. %, at least about 30 wt. %, at least about 40 wt. %, or at least about 45 wt. %. In some embodiments, the concentration of the auxin herbicide on acid equivalent basis is from about 0.5 wt. % to about 10 wt. %, from about 0.5 wt. % to about 5 wt. %, from about 0.5 wt. % to about 3 wt. %, from about 10 wt. % to about 55 wt. %, from about 15 wt. % to about 55 wt. %, from about 20 wt. % to about 55 wt. %, from about 30 wt. % to about 55 wt. %, from about 40 wt. % to about 55 wt. %, from about 45 wt. % to about 55 wt. %, from about 10 wt. % to about 50 wt. %, from about 15 wt. % to about 50 wt. %, from about 20 wt. % to about 50 wt. %, from about 30 wt. % to about 50 wt. %, from about 40 wt. % to about 50 wt. %, from about 45 wt. % to about 50 wt. %, 10 wt. % to about 45 wt. %, from about 15 wt. % to about 45 wt. %, from about 20 wt. % to about 45 wt. %, from about 30 wt. % to about 45 wt. %, from about 40 wt. % to about 45 wt. %, 10 wt. % to about 40 wt. %, from about 15 wt. % to about 40 wt. %, from about 20 wt. % to about 40 wt. %, from about 30 wt. % to about 40 wt. %, 10 wt. % to about 25 wt. %, from about 15 wt. % to about 25 wt. %, or from about 10 wt. % to about 20 wt. %.

Dispersing Agents

In the dispersion compositions described herein the dispersed phases are generally in the form of either suspended solid phase particles or emulsified oil-containing droplets. To maintain stability, these dispersed phases require a strong and long-range repulsive force acting between them. A polymeric dispersing agent is suitable for providing or enhancing such inter-particle repulsive force. Accordingly, in various embodiments, the dispersion compositions of the present invention further comprise a polymeric dispersing agent.

Typically, the dispersing agents have a HLB (hydrophilic-lipophilic balance) value of less than about 7. Polymeric dispersing agents include, for example, block or graft copolymers comprising a co-monomer that is nominally insoluble and a second co-monomer that is highly soluble in the oil continuous phase. In some embodiments, the polymeric dispersing agent comprises a tri-block copolymer having a molecular structure that can be represented as A-B-A block copolymer, wherein "A" represents the soluble co-monomer and "B" represents the nominally insoluble co-monomer.

In certain embodiments, the polymeric dispersing agent comprises at least one polymer selected from the group consisting of PEG-30 dipolyhydroxystearate, polyglyceryl-2 dipolyhydroxystearate, PEG-polyethylene block copolymer, PEG-polystyrene block copolymer, PEG-3 pimethicone, PEG-9 methyl ether dimethicone, PEG-10 dimethicone, PEG-9 polydimethylsiloxyethyl dimethicone, lauryl PEG-9 polydimethylsiloxyethyl dimethicone, polyglyceryl-3 polydimethylsiloxyethyl dimethicone, lauryl polyglyceryl-3 polydimethylsiloxyethyl dimethicone, polyglyceryl-3 polydimethylsiloxyethyl dimethicone, polyglyceryl-3 disiloxane dimethicone, acrylates/ethylhexyl acrylate/dimethicone methacrylate, polyglyceryl-3 lauryl polydimethylsiloxyethyl dimethicone crosspolymer, PEG-15 lauryl polydimethylsiloxyethyl dimethicone crosspolymer, PEG-15/lauryl dimethicone crosspolymer, dimethicone/PEG-10/15 crosspolymer, dimethicone/polyglyceryl-3 crosspolymer, lauryl dimethicone/polyglyceryl-3 crosspolymer, trimethylsiloxysilicate, and mixtures thereof. In some embodiments, the dispersing agent comprises PEG 30-dipolyhydroxystearate (CAS Number: 827596-80-5).

Generally, adsorption of the polymer on the surface of a particulate (e.g., suspended solid phase particles or emulsified oil-containing droplets) is needed for a polymer to function as a dispersing agent. Polymer-to-surface affinity or interaction may drive polymers to adsorb on a particulate surface. Polymers can have affinity for the particulate surface because of specific polymer-surface interactions due to, for example, hydrogen bonding, hydrophobic interaction, and ionic interactions. Given a mixture of particulates, a polymer may or may not have affinity for each of the particulate constituents. Therefore, a single polymer may not be adequate as a dispersing agent for dispersion compositions containing a mixture of particulates with different surface properties. Mixture of multiple polymeric dispersing agents could be effective for mixtures of particulates, but only if the polymers are thermodynamically compatible in their mixtures. However, thermodynamic incompatibility of polymers is a norm, rather than an exception, in mixtures of polymers. Accordingly, in various embodiments, the oil continuous phase comprises a single polymeric dispersing agent. In these embodiments, the dispersing agent is capable of dispersing each of the bulk dispersed phases contained in the composition.

In various embodiments, the concentration of the dispersing agent (e.g., polymeric dispersing agent) is from about 0.1% to about 50%, from about 0.1% to about 40%, from about 0.1% to about 30%, from about 0.1% to about 25%, from about 0.1% to about 20%, from about 0.1% to about 15%, from about 0.1% to about 10%, from about 0.1% to about 5%, from about 1% to about 50%, from about 1% to about 40%, from about 1% to about 30%, from about 1% to about 25%, from about 0.1% to about 20%, from about 1% to about 15%, from about 1% to about 10%, or from about 1% to about 5% by weight of each dispersed phase.

Rheology Modifiers

The dispersion compositions of the present invention can further comprise a rheology modifier. Generally, rheology-modifiers minimize sedimentation of the dispersed phases. Typically, suitable rheology modifiers are effective over a temperature range of from about −20° C. to about 54° C. Rheology modifiers include, for example, particulate rheology modifiers and polymeric rheology modifiers. In some embodiments, particulate rheology modifiers are selected from the group consisting of smectite clays (e.g., organoclays), silica, paraffinic and natural waxes, crystalline cellulose, and mixtures thereof.

Typically, the polymeric rheology modifier should be thermodynamically compatible with the dispersing agent. Polymeric rheology-modifiers, include for example, polyamide polymers, available from Croda Inc. and polyethylene. Other suitable polymeric rheology-modifiers include various oil-soluble, hydrophobic cross-polymers. In some embodiments, the polymeric rheology-modifiers are selected from the group consisting of dimethicone/vinyl dimethicone crosspolymer, dimethicone/phenyl vinyl dimethicone crosspolymer, dimethicone/lauryl dimethicone crosspolymer, and lauryl polydimethylsiloxyethyl dimethicone/bis-vinyl dimethicone crosspolymer, and mixtures thereof. Mixtures of particulate and polymeric rheology-modifiers can also be used.

A particulate rheology-modifier can be in a surface-modified form, wherein the surface-modifier is selected from the group consisting of a $C_{12}$-$C_{18}$ alkyl or aryl quaternary ammonium compound, a polymer, and mixtures thereof. The rheology modifier is preferably capable of providing for high yield stress and highly shear-thinning rheology, wherein even a gelled oil dispersion, upon agitation or shearing, shows thinning or viscosity-reduction to the point where it can be poured or pumped easily and/or diluted for end-application. In various embodiments, the rheology modifier comprises a surface-modified smectite clay. In certain embodiments, the surface-modified smectite clay has a plurality of surface-modifications imparted by a combination of surface-modifying surfactants at least one of which is a polymeric surfactant having a molecular weight of greater than 2,000 Dalton. In some embodiments, the rheology modifier is a surface-modified smectite clay is milled to a smaller particle size for increasing the yield-stress and shear-thinning properties of the said clay.

In various embodiments, the concentration of the rheology modifier is from about from about 0.025 wt. % to about 30 wt. %, from about 0.025 wt. % to about 20 wt. %, from about 0.025 wt. % to about 25 wt. %, from about 0.025 wt. % to about 15 wt. %, from about 0.025 wt. % to about 10 wt. %, from about 0.025 wt. % to about 5 wt. %, from about 0.025 wt. % to about 1 wt. %, from about 0.1 wt. % to about 30 wt. %, from about 0.1 wt. % to about 25 wt. %, from about 0.1 wt. % to about 20 wt. %, from about 0.1 wt. % to about 15 wt. %, from about 0.1 wt. % to about 10 wt. %, from about 0.1 wt. % to about 5 wt. %, or from about 0.1 wt. % to about 1 wt. %. Also, the rheology modifier can have an average particle size that is less than about 5 microns, less than about 2.5 microns, less than about 1 microns, less than about 0.5 microns, or less than about 0.1 microns. In some embodiments, the rheology modifier is milled to an average particle size that is less than about 5 microns, less than about 2.5 microns, less than about 1 microns, less than about 0.5 microns, or less than about 0.1 microns.

Surfactants/Emulsifying Agents

The dispersion compositions of the present invention can further comprise one or more surfactants. Typically, suitable surfactants have an HLB value of greater than 7. In various embodiments, the dispersion compositions comprise a surfactant that function as an emulsifying agent, which enables emulsification of the non-water-continuous dispersion compositions as water-continuous dispersions upon dilution with a sufficient amount of water. In some embodiments, the surfactants are present in the dispersion compositions in soluble form. One or more surfactants can be added to any oil-laden dispersed phase instead of the oil continuous phase, if they are not soluble in the oil continuous phase but are soluble in the oil phase of any dispersed phase. In other embodiments, the amount of the one or more surfactants is substantially less than that of the dispersing agent (e.g., if the surfactant is added to the oil continuous phase). For example, the amount of the surfactant can 50%, 40%, 30%, or less than the amount of the dispersing agent. In further embodiments, the total amount of the surfactant can be equal to or somewhat greater than the amount of the dispersing agent, but the amounts of the individual surfactants are preferably much less than that of the dispersing agent (e.g., if the surfactant to be added to the oil continuous phase comprises a mixture of surfactants). On the other hand, if a surfactant is added to any oil-laden dispersed phase, its amount can be higher than that of the dispersing agent.

The surfactants can be selected from the group consisting of anionic surfactants, cationic surfactants, zwitterionic surfactants, and mixtures thereof. Examples of preferred ionic surfactants include alkyl/aryl ether sulfates, alkyl/aryl ether sulfonates, alkyl/aryl ether carboxylates, alkyl/aryl ether phosphates, dialkyl sulfosuccinates, ethoxylated ether amines, ethoxylated-propoxylated ether amines, alkyl/aryl quaternary amine compounds, alkyl/aryl quaternary phosphonium compounds, ethoxylated alkyl/aryl quaternary amine compounds, ethoxylated alkyl/aryl quaternary phosphonium compounds, betaines, sultaines, phospholipids, and mixtures thereof.

The surfactant can further comprise a non-ionic surfactant, since non-ionic surfactants are typically more effective than ionic surfactants in emulsifying oils in water in the presence of hard water cations.

In various embodiments, the concentration of the surfactant is from about 0.1 wt. % to about 25 wt. %, from about 0.1 wt. % to about 20 wt. %, from about 0.1 wt. % to about 15 wt. %, from about 0.1 wt. % to about 10 wt. %, from about 0.1 wt. % to about 5 wt. %, from about 0.1 wt. % to about 3 wt. %, from about 0.1 wt. % to about 2 wt. %, from about from about 0.5 wt. % to about 25 wt. %, from about 0.5 wt. % to about 20 wt. %, from about 0.5 wt. % to about 15 wt. %, 0.5 wt. % to about 10 wt. %, from about 0.5 wt. % to about 5 wt. %, from about 0.5 wt. % to about 3 wt. %, from about 0.5 wt. % to about 2 wt. %, from about 1 wt. % to about 25 wt. %, from about 1 wt. % to about 20 wt. %, from about 1 wt. % to about 15 wt. %, from about 1 wt. % to about 10 wt. %, from about 1 wt. % to about 5 wt. %, from about 1 wt. % to about 3 wt. %, or from about 1 wt. % to about 2 wt. %.

Other Additives

The compositions described herein can further comprise various additives or adjuvants including safeners, drift reducing adjuvants, volatility control additives, soil-residual-boosting agents, pH adjusting agents or pH buffers, antifreeze agents, biocides or preservatives (e.g., PROXEL commercially available from Avecia), foliar-penetration-boosting agents, stabilizing agents (e.g., antioxidants), UV light-absorbers, photostabilizers, chelating agents, and antifoam agents (such as Antifoam SE23 from Wacker Silicones Corp.).

In some embodiments, the compositions described herein further comprise one or more safeners. Suitable safeners (e.g., for safening acetamide herbicides) include, for example, furilazole ((RS)-3-(dichloroacetyl)-5-(2-furanyl)-2,2-dimethyl-1,3-oxazolidine 95%), commercially available from Monsanto Company; AD 67 (4-(dichloroacetyl)-1-oxa-4-azaspiro[4,5]decane); benoxacor (CGA 154281, (RS)-4-dichloroacetyl-3,4-dihydro-3-methyl-2H-1,4-benzoxazine); cloquintocet-mexyl (CGA 184927, (5-chloroquinolin-8-yloxy)acetic acid); cyometrinil (CGA 43089, (Z)-cyanomethoxyimino(phenyl)acetonitrile); cyprosulfamide (N-[4-(cyclopropylcarbamoyl)phenylsulfonyl]-o-anisamide); dichlormid (DDCA, R25788, N, N-diallyl-2,2-dichloroacetamide); dicyclonon ((RS)-1-dichloroacetyl-3,3,8a-trimethylperhydropyrrolo[1,2-a]pyrimidin-6-one); dietholate (O,O-diethyl 0-phenyl phosphorothioate) fenchlorazole-ethyl (HOE 70542, 1-(2,4-dichlorophenyl)-5-trichloromethyl-1H-1,2,4-triazole-3-carboxylic acid); fenclorim (CGA 123407 4,6-dichloro-2-phenylpyrimidine); flurazole (benzyl 2-chloro-4-trifluoromethyl-1,3-thiazole-5-carboxylate); fluxofenim (CGA 133205, 4'-chloro-2,2,2-trifluoroacetophenone (EZ)-O-1,3-dioxolan-2-ylmethyloxime); isoxadifen (4,5-dihydro-5,5-diphenyl-1,2-oxazole-3-carboxylic acid); mefenpyr ((RS)-1-(2,4-dichlorophenyl)-5-methyl-2-pyrazoline-3,5-dicarboxylic acid); mephenate (4-chlorophenyl methylcarbamate); MG 191; naphthalic anhydride; oxabetrinil (CGA 92194, (Z)-1,3-dioxolan-2-yl-methoxyimino(phenyl)acetonitrile); and others as are known in the art.

The compositions of the present invention can further comprise one or more drift reducing adjuvants. Drift reducing adjuvants include, for example, GARDIAN, GARDIAN PLUS, DRI-GARD, and PRO-ONE XL available from Van Diest Supply Co.; COMPADRE, available from Loveland Products, Inc.; BRONC MAX EDT, BRONC PLUS DRY EDT, EDT CONCENTRATE, and IN-PLACE available from Wilbur-Ellis Company; STRIKE ZONE DF available from Helena Chemical Co.; INTACT and INTACT XTRA available from Precision Laboratories, LLC; and AGRHO DR 2000 and AGRHO DEP 775 available from the Solvay Group. Suitable drift reducing adjuvants also include, for example, guar-based (e.g., containing guar gum or derivatized guar gum) drift reducing adjuvants. Various drift reducing products may also contain one or more water conditioning agent in combination with the drift reducing adjuvants(s).

The compositions described herein can further comprise one or more volatility control additives to control or reduce potential herbicide volatility. Under some application conditions, certain herbicides such as auxin herbicides, can vaporize into the surrounding atmosphere and migrate from the application site to adjacent crop plants, such as soybeans and cotton, where contact damage to sensitive plants can occur. For example, as described in U.S. Application Publication Nos. 2014/0128264 and 2015/0264924, which are incorporated herein by reference, additives to control or reduce potential herbicide volatility include monocarboxylic acids, or salts thereof (e.g., acetic acid and/or an agriculturally acceptable salt thereof.

Representative monocarboxylic acids and monocarboxylates generally comprise a hydrocarbon or unsubstituted hydrocarbon selected from, for example, unsubstituted or substituted, straight or branched chain alkyl (e.g., $C_1$-$C_{20}$ alkyl such as methyl, ethyl, n-propyl, isopropyl, etc.); unsubstituted or substituted, straight or branched chain alkenyl (e.g., $C_2$-$C_{20}$ alkyl such as ethenyl, n-propenyl, isopropenyl, etc.); unsubstituted or substituted aryl (e.g., phenyl, hydroxyphenyl, etc.); or unsubstituted or substituted arylalkyl (e.g., benzyl). In particular, the monocarboxylic acid can be selected from the group consisting of formic acid, acetic acid, propionic acid, and benzoic acid. The monocarboxylate salt can be selected from the group consisting of formate salts, acetate salts, propionate salts, and benzoate salts. The monocarboxylate salts can include, for example, alkali metal salts selected from sodium and potassium. Preferred monocarboxylate salts include sodium acetate and potassium acetate. The molar ratio of herbicide (e.g., auxin herbicide) to the monocarboxylic acid, or monocarboxylate thereof, can be typically from about 1:10 to about 10:1, from about 1:5 to about 5:1, from about 3:1 to about 1:3, or from about 2:1 to about 1:2 (e.g., about 1:1).

Other volatility control additives to control or reduce potential herbicide volatility that useful for the compositions of the present invention include various quaternary amine compounds. Quaternary amine compounds include various alkyl/aryl quaternary amine compounds and alkoxylated alkyl/aryl quaternary amine compounds.

Typically, the quaternary amine compounds have a molecular weight that is no greater than about 1,000 Da, no greater than about 750 Da, or no greater than about 500 Da. For example, in various embodiments, quaternary amine compounds have a molecular weight that is from about 100 Da to about 1,000 Da, from about 100 Da to about 750 Da, from about 100 Da to about 500 Da, from about 200 Da to about 1,000 Da, from about 200 Da to about 750 Da, from about 200 Da to about 500 Da, from about 250 Da to about 1,000 Da, from about 250 Da to about 750 Da, or from about 250 Da to about 500 Da.

In some embodiments, the quaternary amine compound has a structure of formula (I):

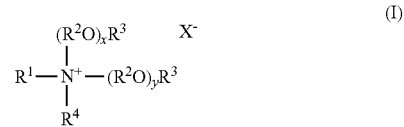

wherein $R^1$ is hydrocarbyl or substituted hydrocarbyl having from 1 to about 30 carbon atoms; each $R^2$ in each of the $(R^2O)_x$ and $(R^2O)_y$ groups is independently a linear or branched $C_2$-$C_4$ alkylene; each $R^3$ is independently hydrogen, or a linear or branched alkyl group having from 1 to about 4 carbon atoms; $R^4$ is hydrocarbyl or substituted hydrocarbyl having from 1 to about 30 carbon atoms; x and y are independently a number from 0 to about 10; and $X^-$ is an agriculturally acceptable anion.

In various embodiments, the $R^1$ and $R^4$ hydrocarbyl groups are each independently linear or branched alkyl, linear or branched alkenyl, linear or branched alkynyl, linear or branched alkoxy, aryl, or aralkyl having from 1 to about 30 carbon atoms. In certain embodiments, $R^1$ and $R^4$ are each independently a linear or branched alkyl, linear or branched alkenyl, or linear or branched alkoxy having from 1 to about 25 carbon atoms from 1 to about 22 carbon atoms, from 1 to about 20 carbon atoms, from 1 to about 18 carbon atoms, from 3 to about 25 carbon atoms from 3 to about 22 carbon atoms, from 3 to about 20 carbon atoms, from 3 to about 18 carbon atoms, from 3 to about 16 carbon atoms, from 3 to about 14 carbon atoms, from 3 to about 12 carbon atoms, from 3 to about 10 carbon atoms, from 3 to about 8 carbon atoms, or from 3 to about 6 carbon atoms. In some embodiments, $R^1$ and $R^4$ have the same number of carbon atoms and/or are the same substituent group (e.g., $R^1$ and $R^4$ are each butyl).

In some embodiments, $R^1$ is a linear or branched alkyl, linear or branched alkenyl, or linear or branched alkoxy having from 3 to about 25 carbon atoms, from 3 to about 22 carbon atoms, 3 to about 20 carbon atoms, or from about 3 to 18 carbon atoms. In these and other embodiments, $R^4$ is a linear or branched alkyl, linear or branched alkenyl, or linear or branched alkoxy having from 1 to about 12 carbon atoms, from 1 to about 10 carbon atoms, 1 to about 8 carbon atoms, from about 1 to 6 carbon atoms, from about 1 to 4 carbon atoms, from 3 to about 12 carbon atoms, from 3 to about 10 carbon atoms, 3 to about 8 carbon atoms, or from about 3 to 6 carbon atoms.

As noted, each $R^2$ in each of the $(R^2O)_x$ and $(R^2O)_y$ groups is independently a $C_2$-$C_4$ linear or branched alkylene. For example, quaternary amine compounds of formula (I) comprise various alkoxylated compounds including ethoxylated quaternary amine compounds, propoxylated quaternary amine compounds, and quaternary amine compounds comprising various polymers or copolymers of ethylene oxide (EO) and propylene oxide (PO). In some embodiments, each $R^2$ in each of the $(R^2O)_x$ and $(R^2O)_y$ groups is independently a linear or branched $C_2$-$C_4$ alkylene. In certain embodiments, each $R^2$ in each of the $(R^2O)_x$ and $(R^2O)_y$ groups is independently ethylene or propylene. In certain embodiments, the quaternary amine compounds comprise a molar ratio of EO (i.e., where $R^2$ is ethylene) to PO (i.e., where $R^2$ is propylene) from about 1:3 to about 3:1, from about 1:3 to about 2:1, from about 1:3 to about 1.5:1, from about 1:3 to about 1:1, from about 1:3 to about 1:2, from about 1:2 to about 3:1, from about 1:2 to about 2:1, from about 1:2 to about 1.5:1, from about 1:2 to about 1:1, from about 1:1 to about 3:1, from about 1:1 to about 2:1, or from about 1:1 to about 1.5:1.

In various embodiments, x and y are independently a number from 0 to about 8, from 0 to about 6, from 0 to about 4, from about 0 to about 2, from 1 to about 8, from 1 to about 6, from 1 to about 4, from 1 to 2. In some embodiments, x and y are each 0. In other embodiments, x and y are each 1.

In various embodiments, each $R^3$ is independently hydrogen, methyl or ethyl. In some embodiments, each $R^3$ is independently hydrogen or methyl. In certain embodiments, each $R^3$ is hydrogen.

$X^-$ is a charge balancing counter-anion, such as sulfate, hydroxide, chloride, bromide, nitrate, among others. In some embodiments, $X^-$ is a chloride or hydroxide anion. In certain embodiments, $X^-$ is not a hydroxide anion when x and y are each 0 and at least one of $R^1$, $R^2$, $R^3$, and $R^4$ is an alkyl with 2 to 4 carbon atoms or an arylalkyl.

Particular examples of quaternary amine compounds include tetrabutyl ammonium salts (e.g., tetrabutyl ammonium chloride and tetrabutyl ammonium chloride hydroxide) and trimethyl-tetradecyl ammonium salts (e.g., trimethyl-tetradecyl ammonium chloride). Other examples include the Tomamine series of quaternary amine compounds available from Evonik, particularly the Tomamine Q-series, which are represented by formula (II):

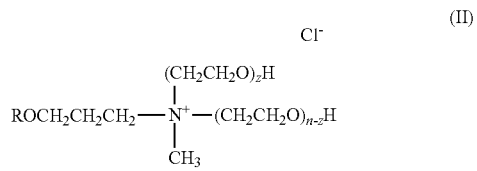

where R is alkyl (e.g., $C_1$-$C_{20}$ alkyl), n is the total number of moles of EO ($CH_2CH_2O$), and n+z is typically a number from 0 to 15. Specific examples of Tomamines include Q-14-2 (isodecyloxypropyl dihydroxyethyl methyl ammonium chloride), Q-17-2 (isotridecyloxypropyl dihydroxyethyl methyl ammonium chloride), Q-17-5 (isotridecyloxypropyl poly(5)oxyethylene methyl ammonium chloride), and Q-18-2 (octadecyl dihydroxyethyl methyl ammonium chloride).

In various embodiments, the amount of quaternary amine compound is dependent upon the amount of auxin herbicide present in the compositions. For example, in some embodiments, the molar ratio of quaternary amine compound to auxin herbicide is at least about 0.25:1, at least about 0.5:1, at least about 0.75:1, or at least about 1:1. In certain embodiments, the molar ratio of quaternary amine compound to auxin herbicide is from about 0.25:1 to about 2:1, from about 0.25:1 to about 1.75:1, from about 0.25:1 to about 1.5:1, from about 0.25:1 to about 1.25:1, from about 0.25:1 to about 1:1, from about 0.5:1 to about 2:1, from about 0.5:1 to about 1.75:1, from about 0.5:1 to about 1.5:1, from about 0.5:1 to about 1.25:1, from about 0.5:1 to about 1:1, from about 0.75:1 to about 2:1, from about 0.75:1 to about 1.75:1, from about 0.75:1 to about 1.5:1, from about 0.75:1 to about 1.25:1, from about 0.75:1 to about 1:1, from about 1:1 to about 2:1, from about 1:1 to about 1.75:1, from about 1:1 to about 1.5:1, or from about 1:1 to about 1.25:1.

Another volatility control additives to control or reduce potential herbicide volatility that useful for the compositions of the present invention include various affinity solvents (i.e., nonaqueous affinity solvents). For a given solute, a solvent is an affinity solvent if it can provide for strong intermolecular interactions between the solvent molecules and the solute molecules, when the solute is dissolved in the solvent. The strengths of these intermolecular interactions, namely, dispersion force, hydrogen bonding, and polar interactions depend on one or more intrinsic parameters of the solvent including, for example, the molecular weight of solvent and the number of double bond and hydrogen-bonding groups present in the solvent. The higher the values of these parameters, the stronger the solute-solvent interactions, and hence the more difficult it is for the solute molecules to overcome these interactions to partition from the solution phase to any surrounding fluid phase that is immiscible with the solution phase. Accordingly, an affinity solvent is intended to minimize dissipation or partitioning of an auxin herbicide acid from its solution in the affinity solvent into a surrounding, immiscible fluid phase which can be air, water, oil or a combination thereof.

Therefore, when an auxin herbicide acid such as dicamba acid is dissolved in an affinity solvent, it may not volatilize off as readily as would be without the affinity solvent, into a surrounding mass of air. When a solution of auxin herbicide acid in an affinity solvent having limited miscibility with water, is exposed to a water stream, for example, irrigation and/or rain water flowing through soil pores, the herbicide may not transport through the soil as easily as would be with an ordinary solvent. This in turn can result in a longer duration of weed-control with the auxin herbicide. Furthermore, chemical reactivity can be hindered when a solution of an auxin herbicide acid in an affinity solvent is mixed into a liquid phase that is immiscible with the auxin herbicide acid solution, containing components that are chemically reactive with auxin herbicide acid and/or an amount of auxin herbicide anion that exists in chemical equilibrium with auxin herbicide acid in the solution. This in turn can lead to a greater chemical stability of the foregoing mixture than what would be otherwise.

Accordingly, various embodiments of the present invention are directed to an herbicidal composition comprising an auxin herbicide acid; and a (nonaqueous) affinity solvent for the auxin herbicide acid. Typically, the solvent satisfies at least one of the following:

(1) a molecular weight of at least about 300 grams per mole, at least about 600 grams per mole, or at least about 900 grams per mole (e.g., about 900 to about 1500 grams per mole), (2) at least one double bond groups per molecule of the solvent, and/or (3) at least four hydrogen bonding groups per molecule of the solvent.

In some embodiments, the affinity solvent comprises an alkylene glycol as described herein. In certain embodiments, the affinity solvent comprises a triglyceride. In various embodiments, the affinity solvent comprises castor oil.

In various embodiments, the weight ratio of affinity solvent to auxin herbicide acid is at least about 1:1, at least about 1.5:1, at least about 2:1, or at least about 3:1. For example, the weight ratio of affinity solvent to auxin herbicide acid is from about 1:1 to about 5:1, from about 1:1 to about 4:1, from about 1:1 to about 3:1, from about 1.5:1 to about 5:1, from about 1.5:1 to about 4:1, from about 1.5:1 to about 3:1, from about 2:1 to about 5:1, from about 2:1 to about 4:1, or from about 2:1 to about 3:1.

Chemical stability can be further improved by incorporating an effective amount of alkylene glycol. Without being bound by theory, it is believe that the alkylene glycol forms a complex with auxin herbicides, particularly auxin herbicides in acid form. It is theorized that this complex is both unreactive and relatively non-volatile. In various embodiments, the alkylene glycol comprises a $C_2$ to $C_{10}$ glycol or more particularly a $C_2$ to $C_6$ glycol. In some embodiments, the alkylene glycol comprises a branched $C_2$ to $C_{10}$ or $C_2$ to $C_6$ glycol. Branched glycols have been found in some cases to provide even greater improvement in reducing auxin herbicide volatility. In certain embodiments, the alkylene glycol is selected from the group consisting of propylene glycol; hexylene glycol; 1,3-propanediol; 1,4-butanediol; 1,3-butanediol; and mixtures thereof.

Generally, at least an equimolar ratio of alkylene glycol to auxin herbicide is needed to impart improved chemical stability with higher amounts providing for even greater stability. In various embodiments, the molar ratio of alkylene glycol to auxin herbicide is at least about 1:1, at least about 2:1, at least about 3:1, at least about 4:1, at least about 5:1, at least about 6:1, at least about 7:1, at least about 8:1, or at least about 9:1. In some embodiments, the molar ratio of alkylene glycol to auxin herbicide is from about 1:1 to about 20:1, from about 2:1 to about 20:1, from about 5:1 to about 20:1, from about 7:1 to about 20:1, from about 1:1 to about 10:1, from about 2:1 to about 10:1, from about 5:1 to about 10:1, or from about 7:1 to about 10:1. In other terms, the alkylene glycol concentration can be at least about 5 wt. %, at least about 10 wt. %, at least about 15 wt. %, at least about 20 wt. %, at least about 25 wt. %, or at least about 30 wt. %. For example, the alkylene glycol concentration can be from about 5 wt. % to about 40 wt. %, from about 5 wt. % to about 35 wt. %, from about 5 wt. % to about 30 wt. %, from about 5 wt. % to about 25 wt. %, from about 5 wt. % to about 20 wt. %, from about 5 wt. % to about 15 wt. %, from about 5 wt. % to about 10 wt. %, from about 10 wt. % to about 40 wt. %, from about 10 wt. % to about 35 wt. %, from about 10 wt. % to about 30 wt. %, from about 10 wt. % to about 25 wt. %, from about 10 wt. % to about 20 wt. %, from about 10 wt. % to about 15 wt. %, from about 15 wt. % to about 40 wt. %, from about 15 wt. % to about 35 wt. %, from about 15 wt. % to about 30 wt. %, from about 20 wt. % to about 40 wt. %, from about 20 wt. % to about 35 wt. %, or from about 20 wt. % to about 30 wt. %.

In some embodiments, the compositions described herein further comprise one or more soil-residual-boosting agents. It has been found that incorporating a minor amount of a cationic flocculant polymer in the compositions can provide for commercially acceptable rate of weed control for at least 28 days, at least 35 days, at least 42 days, or more. Without being bound by theory, it is believed that the cationic polymer binds to soil and to droplets of the oil phase. Consequently, transport of oil phase herbicides, such as acetamide herbicides, through pores in the soil matrix is believed to be reduced thereby increasing the amount of time the herbicide is at the soil surface. Cationic flocculant polymers are known in the field of wastewater conditioning. These polymers can have high molecular weights that exceed, for example, about 100,000 Da, about 500,000 Da, about 1,000,000 Da, or even 10,000,000 Da.

In various embodiments, the cationic flocculant polymer comprises at least one polymer selected from the group consisting of cationic polysaccharides, cationic derivatized polysaccharides, cationic modified acrylate polymers and co-polymers, cationic modified acrylamide polymers and co-polymers, high molecular weight proteins (e.g., gelatin), poly(diallyldimethylammonium chloride), cationic modified polyvinylpyrrolidone. In some embodiments, the cationic flocculant polymer comprises a cationic polysaccharide and/or a cationic derivatized polysaccharide. Polysaccharides can be selected from the group consisting of guar, chitosan, cellulosic polymers, galactomannans, and combinations thereof.

The concentration of the cationic flocculant polymer typically depends on the molecular weight of the polymer. Higher molecular weight polymers can be used in lower concentrations. Also, the amount of the cationic flocculant polymer is sufficient to cause weak flocculation. Accordingly, in various embodiments, the concentration of the cationic flocculant polymer is from about 0.001 wt. % to about 1 wt. %, from about 0.01 wt. % to about 1 wt. %, from about 0.1 wt. % to about 1 wt. %, from about 0.001 wt. % to about 0.1 wt. %, from about 0.001 wt. % to about 0.01 wt. %, or from about 0.01 wt. % to about 0.1 wt. %.

The compositions of the present invention can include one or more of the features as described herein in various combinations.

Processes for Preparing Various Herbicidal Dispersion Compositions

The present invention is also directed to various processes for preparing various non-water-continuous pesticidal/herbicidal dispersion compositions described herein.

One process for preparing the compositions described herein, particularly the solid-in-oil herbicidal dispersion compositions, comprises mixing a nonaqueous liquid, ionic pesticidal active ingredient is a solid herbicide, and an acetamide herbicide to form the herbicidal dispersion composition comprising an oil continuous phase comprising the nonaqueous liquid and the acetamide herbicide, and a dispersed phase comprising the solid phase herbicide, wherein the weight ratio of the nonaqueous liquid to acetamide herbicide is at least about 1:1, at least about 1.1:1, at least about 1.2:1, at least about 1.3:1, at least about 1.4:1, or at least about 1.5:1. In some embodiments, the nonaqueous liquid and the acetamide herbicide are mixed prior to mixing with the solid phase herbicide. In other embodiments, the nonaqueous liquid and the solid phase herbicide are mixed prior to mixing with the acetamide herbicide.

One process for preparing various complex herbicidal dispersion compositions described herein comprises mixing an acetamide herbicide and an auxin herbicide to form a first mixture, wherein the auxin herbicide is at least partially dissolved in the acetamide herbicide; mixing a nonaqueous liquid and a solid phase herbicide to form a second mixture; and mixing the first mixture with the second mixture to form the herbicidal dispersion composition comprising an oil continuous phase comprising the nonaqueous liquid, a first bulk dispersed phase comprising the acetamide herbicide and the auxin herbicide and a second bulk dispersed phase comprising a solid phase herbicide. In some embodiments, the second bulk dispersed phase further comprises a second bulk dispersed phase oil as described herein. In these embodiments, the solid phase herbicide is dispersed in the second bulk dispersed phase oil. In certain embodiments, the solid phase herbicide is mixed with the second bulk dispersed phase oil prior to mixing the nonaqueous liquid with the solid phase herbicide.

In various embodiments of these processes, the herbicidal dispersion composition further comprises a dispersing agent as described herein. In some embodiments, the dispersing agent is mixed with the nonaqueous liquid prior to mixing with the nonaqueous liquid with the solid phase herbicide.

The solid phase herbicide and/or the dispersion compositions can be milled using a grinding/milling equipment (e.g., ball mill) provided with a suitable grinding medium (e.g., ceramic grinding bead) to attain the desired particle size for the solid phase herbicide/dispersed phase. In various embodiments of these processes, the solid phase herbicide and/or dispersed phase can be milled to an average particle size that is less than about 5 microns, less than about 2.5 microns, less than about 1 microns, less than about 0.5 microns, or less than about 0.1 microns. When milling is performed, surfactants and/or other additives can be added after milling.

Herbicidal Compositions Containing an Auxin Herbicide Acid and a Volatility Control Additive The present invention also relates to herbicidal compositions comprising an auxin herbicide and one or more volatility control additives. In various embodiments, the herbicidal composition comprises an auxin herbicide, a quaternary amine compound, and/or a reaction product of the auxin herbicide and the quaternary amine compound.

It has been discovered that certain quaternary amine compound can function as volatility control additives to control or reduce potential auxin herbicide volatility. Various herbicidal compositions in accordance with the present invention comprise an auxin herbicide acid, a quaternary amine compound, and/or a reaction product of the auxin herbicide and the quaternary amine compound, wherein the quaternary amine compound has a structure of formula (I):

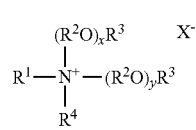

wherein $R^1$ is hydrocarbyl or substituted hydrocarbyl having from 1 to about 30 carbon atoms; each $R^2$ in each of the $(R^2O)_x$ and $(R^2O)_y$ groups is independently a linear or branched $C_2$-$C_4$ alkylene; each $R^3$ is independently hydrogen, or a linear or branched alkyl group having from 1 to about 4 carbon atoms; $R^4$ is hydrocarbyl or substituted hydrocarbyl having from 1 to about 30 carbon atoms; x and y are independently a number from 0 to about 10; and $X^-$ is an agriculturally acceptable anion, with the proviso that $X^-$ is not a hydroxide anion when x and y are each 0 and at least one of $R^1$, $R^2$, $R^3$, and $R^4$ is an alkyl with 2 to 4 carbon atoms or an arylalkyl.

In various embodiments, the $R^1$ and $R^4$ hydrocarbyl groups are each independently linear or branched alkyl, linear or branched alkenyl, linear or branched alkynyl, linear or branched alkoxy, aryl, or aralkyl having from 1 to about 30 carbon atoms. In certain embodiments, $R^1$ and $R^4$ are each independently a linear or branched alkyl, linear or branched alkenyl, or linear or branched alkoxy having from 1 to about 25 carbon atoms from 1 to about 22 carbon atoms, from 1 to about 20 carbon atoms, from 1 to about 18 carbon atoms, from 3 to about 25 carbon atoms from 3 to about 22 carbon atoms, from 3 to about 20 carbon atoms, from 3 to about 18 carbon atoms, from 3 to about 16 carbon atoms, from 3 to about 14 carbon atoms, from 3 to about 12 carbon atoms, from 3 to about 10 carbon atoms, from 3 to about 8 carbon atoms, or from 3 to about 6 carbon atoms. In some embodiments, $R^1$ and $R^4$ have the same number of carbon atoms and/or are the same substituent group (e.g., $R^1$ and $R^4$ are each butyl).

In some embodiments, $R^1$ is a linear or branched alkyl, linear or branched alkenyl, or linear or branched alkoxy having from 3 to about 25 carbon atoms, from 3 to about 22 carbon atoms, 3 to about 20 carbon atoms, or from about 3 to 18 carbon atoms. In these and other embodiments, $R^4$ is a linear or branched alkyl, linear or branched alkenyl, or linear or branched alkoxy having from 1 to about 12 carbon atoms, from 1 to about 10 carbon atoms, 1 to about 8 carbon atoms, from about 1 to 6 carbon atoms, from about 1 to 4 carbon atoms, from 3 to about 12 carbon atoms, from 3 to about 10 carbon atoms, 3 to about 8 carbon atoms, or from about 3 to 6 carbon atoms.

As noted, each $R^2$ in each of the $(R^2O)_x$ and $(R^2O)_y$ groups is independently a $C_2$-$C_4$ linear or branched alkylene. For example, quaternary amine compounds of formula (I) comprise various alkoxylated compounds including ethoxylated quaternary amine compounds, propoxylated quaternary amine compounds, and quaternary amine compounds comprising various polymers or copolymers of ethylene oxide (EO) and propylene oxide (PO). In some embodiments, each $R^2$ in each of the $(R^2O)_x$ and $(R^2O)_y$ groups is independently a linear or branched $C_2$-$C_4$ alkylene. In certain embodiments, each $R^2$ in each of the $(R^2O)_x$ and $(R^2O)_y$ groups is independently ethylene or propylene. In certain embodiments, the quaternary amine compounds comprise a molar ratio of EO (i.e., where $R^2$ is ethylene) to PO (i.e., where $R^2$ is propylene) from about 1:3 to about 3:1, from about 1:3 to about 2:1, from about 1:3 to about 1.5:1, from about 1:3 to about 1:1, from about 1:3 to about 1:2, from about 1:2 to about 3:1, from about 1:2 to about 2:1, from about 1:2 to about 1.5:1, from about 1:2 to about 1:1, from about 1:1 to about 3:1, from about 1:1 to about 2:1, or from about 1:1 to about 1.5:1.

In various embodiments, x and y are independently a number from 0 to about 8, from 0 to about 6, from 0 to about 4, from about 0 to about 2, from 1 to about 8, from 1 to about 6, from 1 to about 4, from 1 to 2. In some embodiments, x and y are each 0. In other embodiments, x and y are each 1.

In various embodiments, each $R^3$ is independently hydrogen, methyl or ethyl. In some embodiments, each $R^3$ is independently hydrogen or methyl. In certain embodiments, each $R^3$ is hydrogen.

$X^-$ is a charge balancing counter-anion, such as sulfate, hydroxide, chloride, bromide, nitrate, among others. In some embodiments, $X^-$ is a chloride or hydroxide anion. In certain embodiments, $X^-$ is not a hydroxide anion when x and y are each 0 and at least one of $R^1$, $R^2$, $R^3$, and $R^4$ is an alkyl with 2 to 4 carbon atoms or an arylalkyl.

Particular examples of quaternary amine compounds include tetrabutyl ammonium salts (e.g., tetrabutyl ammonium chloride and tetrabutyl ammonium chloride hydroxide) and trimethyl-tetradecyl ammonium salts (e.g., trimethyl-tetradecyl ammonium chloride). Other examples include the Tomamine series of quaternary amine compounds available from Evonik, particularly the Tomamine Q-series, which are represented by formula (II):

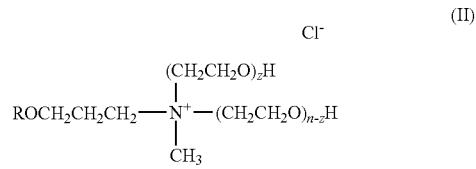

where R is alkyl (e.g., $C_1$-$C_{20}$ alkyl), n is the total number of moles of EO ($CH_2CH_2O$), and n+z is typically a number from 0 to 15. Specific examples of Tomamines include Q-14-2 (isodecyloxypropyl dihydroxyethyl methyl ammonium chloride), Q-17-2 (isotridecyloxypropyl dihydroxyethyl methyl ammonium chloride), Q-17-5 (isotridecyloxypropyl poly(5)oxyethylene methyl ammonium chloride), and Q-18-2 (octadecyl dihydroxyethyl methyl ammonium chloride).

The auxin herbicide acid can comprise one or more of those described herein. For example, the auxin herbicide acid can be selected from the group consisting of 3,6-dichloro-2-methoxybenzoic acid (dicamba); 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy)butanoic acid (MCPB); 4-chlorophenoxyacetic acid; 2,4,5-trichlorophenoxyacetic acid (2,4,5-T); aminopyralid; clopyralid; fluroxypyr; triclopyr; mecoprop; picloram; quinclorac; aminocyclopyrachlor; benazolin; halauxifen; fluorpyrauxifen; methyl 4-amino-3-chloro-5-fluoro-6-(7-fluoro-1H-indol-6-yl)pyridine-2-carboxylate; 4-amino-3-chloro-5-fluoro-6-(7-fluoro-1H-indol-6-yl)pyridine-2-carboxylic acid; benzyl 4-amino-3-chloro-5-fluoro-6-(7-fluoro-1H-indol-6-yl)pyridine-2-carboxylate; methyl 4-amino-3-chloro-5-fluoro-6-(7-fluoro-1-isobutyryl-1H-indol-6-yl)pyridine-2-carboxylate; methyl 4-amino-3-chloro-6-[1-(2,2-dimethylpropanoyl)-7-fluoro-1H-indol-6-yl]-5-fluoropyridine-2-carboxylate; methyl 4-amino-3-chloro-5-fluoro-6-[7-fluoro-1-(methoxyacetyl)-1H-indol-6-yl]pyridine-2-carboxylate; methyl 6-(1-acetyl-7-fluoro-1H-indol-6-yl)-4-amino-3-chloro-5-fluoropyridine-2-carboxylate; potassium 4-amino-3-chloro-5-fluoro-6-(7-fluoro-1H-indol-6-yl)pyridine-2-carboxylate; butyl 4-amino-3-chloro-5-fluoro-6-(7-fluoro-1H-indol-6-yl)pyridine-2-carboxylate; salts and esters thereof; and mixtures thereof. In some embodiments, the auxin herbicide acid comprises dicamba acid. In certain embodiments, the auxin herbicide comprises 2,4-D acid.

In various embodiments, the amount of quaternary amine compound is dependent upon the amount of auxin herbicide acid present in the compositions. For example, in some embodiments, the molar ratio of quaternary amine compound to auxin herbicide is at least about 0.25:1, at least about 0.5:1, at least about 0.75:1, or at least about 1:1. In certain embodiments, the molar ratio of quaternary amine compound to auxin herbicide is from about 0.25:1 to about 2:1, from about 0.25:1 to about 1.75:1, from about 0.25:1 to about 1.5:1, from about 0.25:1 to about 1.25:1, from about 0.25:1 to about 1:1, from about 0.5:1 to about 2:1, from about 0.5:1 to about 1.75:1, from about 0.5:1 to about 1.5:1, from about 0.5:1 to about 1.25:1, from about 0.5:1 to about 1:1, from about 0.75:1 to about 2:1, from about 0.75:1 to about 1.75:1, from about 0.75:1 to about 1.5:1, from about 0.75:1 to about 1.25:1, from about 0.75:1 to about 1:1, from about 1:1 to about 2:1, from about 1:1 to about 1.75:1, from about 1:1 to about 1.5:1, or from about 1:1 to about 1.25:1.

In various compositions described herein, the concentration of the auxin herbicide acid is at least about 1 wt. %, at least about 2 wt. %, at least about 5 wt. %, at least about 10 wt. %, at least about 15 wt. %, at least about 20 wt. %, at least about 30 wt. %, at least about 40 wt. %, or at least about 45 wt. %. In some embodiments, the concentration of the auxin herbicide acid is from about 0.5 wt. % to about 10 wt. %, from about 0.5 wt. % to about 5 wt. %, from about 0.5 wt. % to about 3 wt. %, from about 10 wt. % to about 55 wt. %, from about 15 wt. % to about 55 wt. %, from about 20 wt. % to about 55 wt. %, from about 30 wt. % to about 55 wt. %, from about 40 wt. % to about 55 wt. %, from about 45 wt. % to about 55 wt. %, from about 10 wt. % to about 50 wt. %, from about 15 wt. % to about 50 wt. %, from about 20 wt. % to about 50 wt. %, from about 30 wt. % to about 50 wt. %, from about 40 wt. % to about 50 wt. %, from about 45 wt. % to about 50 wt. %, 10 wt. % to about 45 wt. %, from about 15 wt. % to about 45 wt. %, from about 20 wt. % to about 45 wt. %, from about 30 wt. % to about 45 wt. %, from about 40 wt. % to about 45 wt. %, 10 wt. % to about 40 wt. %, from about 15 wt. % to about 40 wt. %, from about 20 wt. % to about 40 wt. %, from about 30 wt. % to about 40 wt. %, 10 wt. % to about 25 wt. %, from about 15 wt. % to about 25 wt. %, or from about 10 wt. % to about 20 wt. %.

The herbicidal compositions comprising an auxin herbicide, a quaternary amine compound, and/or a reaction product of the auxin herbicide and the quaternary amine compound can further comprise one of more of the other ingredients and additives as described herein. For example, these compositions can further comprise an effective amount of alkylene glycol. In various embodiments, the alkylene glycol comprises a $C_2$ to $C_{10}$ glycol or more particularly a $C_2$ to $C_6$ glycol. In some embodiments, the alkylene glycol comprises a branched $C_2$ to $C_{10}$ or $C_2$ to $C_6$ glycol. Branched glycols have been found in some cases to provide even greater improvement in reducing auxin herbicide volatility. In certain embodiments, the alkylene glycol is selected from the group consisting of propylene glycol; hexylene glycol; 1,3-propanediol; 1,4-butanediol; 1,3-butanediol; and mixtures thereof.

In various embodiments, the molar ratio of alkylene glycol to auxin herbicide is at least about 1:1, at least about 2:1, at least about 3:1, at least about 4:1, at least about 5:1, at least about 6:1, at least about 7:1, at least about 8:1, or at least about 9:1. In some embodiments, the molar ratio of alkylene glycol to auxin herbicide is from about 1:1 to about 20:1, from about 2:1 to about 20:1, from about 5:1 to about 20:1, from about 7:1 to about 20:1, from about 1:1 to about 10:1, from about 2:1 to about 10:1, from about 5:1 to about 10:1, or from about 7:1 to about 10:1. In other terms, the alkylene glycol concentration can be at least about 5 wt. %, at least about 10 wt. %, at least about 15 wt. %, at least about 20 wt. %, at least about 25 wt. %, or at least about 30 wt. %. For example, the alkylene glycol concentration can be from about 5 wt. % to about 40 wt. %, from about 5 wt. % to about 35 wt. %, from about 5 wt. % to about 30 wt. %, from about 5 wt. % to about 25 wt. %, from about 5 wt. % to about 20 wt. %, from about 5 wt. % to about 15 wt. %, from about 5 wt. % to about 10 wt. %, from about 10 wt. % to about 40 wt. %, from about 10 wt. % to about 35 wt. %, from about 10 wt. % to about 30 wt. %, from about 10 wt. % to about 25 wt. %, from about 10 wt. % to about 20 wt. %, from about 10 wt. % to about 15 wt. %, from about 15 wt. % to about 40 wt. %, from about 15 wt. % to about 35 wt. %, from about 15 wt. % to about 30 wt. %, from about 20 wt. % to about 40 wt. %, from about 20 wt. % to about 35 wt. %, or from about 20 wt. % to about 30 wt. %.

These compositions can also comprise a solvent. In some embodiments, the solvent is water.

In further embodiments, the herbicidal composition comprises an auxin herbicide acid and an affinity solvent. It has been discovered that certain affinity solvents can function as volatility control additives to control or reduce potential auxin herbicide volatility. As noted herein, when an auxin herbicide acid such as dicamba acid is dissolved in an affinity solvent, it may not volatilize off as readily as would be without the affinity solvent, into a surrounding mass of air. When a solution of auxin herbicide acid in an affinity solvent having limited miscibility with water, is exposed to a water stream, for example, irrigation and/or rain water flowing through soil pores, the herbicide may not transport through the soil as easily as would be with an ordinary solvent. This in turn can result in a longer duration of weed-control with the auxin herbicide. Furthermore, chemical reactivity may be hindered when a solution of an auxin herbicide acid in an affinity solvent is mixed into a liquid phase that is immiscible with the auxin herbicide acid solution, containing components that are chemically reactive with auxin herbicide acid and/or an amount of auxin herbicide anion that exists in chemical equilibrium with auxin herbicide acid in the solution. This in turn can lead to a greater chemical stability of the foregoing mixture than what would be otherwise.

Accordingly, various embodiments of the present invention are directed to an herbicidal composition comprising an auxin herbicide acid; and an affinity solvent for the auxin herbicide acid. Typically, the solvent satisfies at least one of the following:

(1) a molecular weight of at least about 300 grams per mole, at least about 600 grams per mole, or at least about 900 grams per mole (e.g., about 900 to about 1500 grams per mole), (2) at least one double bond groups per molecule of the solvent, and/or (3) at least four hydrogen bonding groups per molecule of the solvent.

In some embodiments, the affinity solvent comprises an alkylene glycol. In certain embodiments, the affinity solvent comprises a triglyceride. In various embodiments, the affinity solvent comprises castor oil.

In various embodiments, the weight ratio of affinity solvent to auxin herbicide acid is at least about 1:1, at least about 1.5:1, at least about 2:1, or at least about 3:1. For example, the weight ratio of affinity solvent to auxin herbicide acid is from about 1:1 to about 5:1, from about 1:1 to about 4:1, from about 1:1 to about 3:1, from about 1.5:1 to about 5:1, from about 1.5:1 to about 4:1, from about 1.5:1 to about 3:1, from about 2:1 to about 5:1, from about 2:1 to about 4:1, or from about 2:1 to about 3:1.

Herbicidal Application Mixtures

The present invention further relates to various herbicidal application mixtures and processes for preparing these mixtures. Generally, the process comprises mixing water with a composition as described herein to form a herbicidal application mixture. In various embodiments, the herbicidal application mixture is a water-continuous dispersion. That is, upon sufficient dilution with water, the non-water-continuous herbicidal dispersion compositions invert into water-continuous dispersion compositions. For example, a non-water-continuous herbicidal dispersion composition can be diluted with about 5 to about 75 or from about 10 to about 50 times its weight with water.

Typically, the herbicide loading in the application mixture is no more than about 5% by weight or is from about 0.1% to about 5% by weight or from about 1% to about 5% by weight, such as 5%, 4%, 3%, 2%, 1%, 0.5% or 0.1% by weight on an acid equivalent basis, when applicable.

Application mixtures described herein can contain one or more additional herbicides. As noted, application mixtures can be prepared by diluting the compositions as described herein. Additional herbicides can be "tank mixed" to provide application mixtures comprising multiple herbicides.

Additional herbicides include other auxin herbicides, acetyl CoA carboxylase (ACCase) inhibitors, enolpyruvyl shikimate-3-phosphate synthase (EPSPS) inhibitors, photosystem I (PS I) inhibitors, photosystem II (PS II) inhibitors, acetolactate synthase (ALS) or acetohydroxy acid synthase (AHAS) inhibitors, mitosis inhibitors, protoporphyrinogen oxidase (PPO) inhibitors, hydroxyphenylpyruvate dioxygenase (HPPD) inhibitors, cellulose inhibitors, oxidative phosphorylation uncouplers, dihydropteroate synthase inhibitors, fatty acid and lipid biosynthesis inhibitors, auxin transport inhibitors, salts and esters thereof, racemic mixtures and resolved isomers thereof, and mixtures thereof. Examples of herbicides within these classes are provided below. Where an herbicide is referenced generically herein by name, unless otherwise restricted, that herbicide includes all commercially available forms known in the art such as salts, esters, free acids and free bases, as well as stereoisomers thereof.

In some embodiments, the additional herbicide comprises an auxin herbicide (i.e., synthetic auxin herbicide) including, for example, 3,6-dichloro-2-methoxybenzoic acid (dicamba); 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy)butanoic acid (MCPB); 4-chlorophenoxyacetic acid; 2,4,5-trichlorophenoxyacetic acid (2,4,5-T); aminopyralid; clopyralid; fluroxypyr; triclopyr; mecoprop; picloram; quinclorac; aminocyclopyrachlor; benazolin; halauxifen; fluorpyrauxifen; methyl 4-amino-3-chloro-5-fluoro-6-(7-fluoro-1H-indol-6-yl)pyridine-2-carboxylate; 4-amino-3-chloro-5-fluoro-6-(7-fluoro-1H-indol-6-yl)pyridine-2-carboxylic acid; benzyl 4-amino-3-chloro-5-fluoro-6-(7-fluoro-1H-indol-6-yl)pyridine-2-carboxylate; methyl 4-amino-3-chloro-5-fluoro-6-(7-fluoro-1-isobutyryl-1H-indol-6-yl)pyridine-2-carboxylate; methyl 4-amino-3-chloro-6-[1-(2,2-dimethylpropanoyl)-7-fluoro-1H-indol-6-yl]-5-fluoropyridine-2-carboxylate; methyl 4-amino-3-chloro-5-fluoro-6-[7-fluoro-1-(methoxyacetyl)-1H-indol-6-yl]pyridine-2-carboxylate; methyl 6-(1-acetyl-7-fluoro-1H-indol-6-yl)-4-amino-3-chloro-5-fluoropyridine-2-carboxylate; potassium 4-amino-3-chloro-5-fluoro-6-(7-fluoro-1H-indol-6-yl)pyridine-2-carboxylate; butyl 4-amino-3-chloro-5-fluoro-6-(7-fluoro-1H-indol-6-yl)pyridine-2-carboxylate; and salts and esters thereof; and mixtures thereof.

In some embodiments, the additional herbicide comprises a PPO inhibitor. PPO inhibitors include, for example, acifluorfen, azafenidin, bifenox, butafenacil, carfentrazone-ethyl, flufenpyr-ethyl, flumiclorac, flumiclorac-pentyl, flumioxazin, fluoroglycofen, fluthiacet-methyl, fomesafen, lactofen, oxadiargyl, oxadiazon, oxyfluorfen, pyraflufen-ethyl, saflufenacil and sulfentrazone, ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate, salts and esters thereof, and mixtures thereof. In particular embodiments, the additional herbicide comprises fomesafen and/or a salt of fomesafen such as sodium fomesafen. In some embodiments, the additional herbicide comprises ethyl [3-[2-chloro-4-fluoro-5-(1-methyl-6-trifluoromethyl-2,4-dioxo-1,2,3,4-tetrahydropyrimidin-3-yl)phenoxyl]-2-pyridyloxy]acetate.

In various embodiments, the additional herbicide comprises a HPPD inhibitor. HPPD inhibitors include, for example, aclonifen, amitrole, beflubutamid, benzofenap, clomazone, diflufenican, fluridone, flurochloridone, flurtamone, isoxachlortole, isoxaflutole, mesotrione, norflurazon, picolinafen, pyrazolynate, pyrazoxyfen, sulcotrione, tembotrione, topramezone, tolpyralate, tefuryltrione, salts and esters thereof, and mixtures thereof.

In some embodiments, the additional herbicide comprises a PS II inhibitor. PS II inhibitors include, for example, ametryn, amicarbazone, atrazine, bentazon, bromacil, bromoxynil, chlorotoluron, cyanazine, desmedipham, desmetryn, dimefuron, diuron, fluometuron, hexazinone, ioxynil, isoproturon, linuron, metamitron, methibenzuron, metoxuron, metribuzin, monolinuron, phenmedipham, prometon, prometryn, propanil, pyrazon, pyridate, siduron, simazine, simetryn, tebuthiuron, terbacil, terbumeton, terbuthylazine and trietazine, salts and esters thereof, and mixtures thereof.

In certain embodiments, the additional herbicide comprises an ACCase inhibitor. ACCase inhibitors include, for example, alloxydim, butroxydim, clethodim, cycloxydim, pinoxaden, sethoxydim, tepraloxydim and tralkoxydim, salts and esters thereof, and mixtures thereof. Another group of ACCase inhibitors include chlorazifop, clodinafop, clofop, cyhalofop, diclofop, diclofop-methyl, fenoxaprop, fenthiaprop, fluazifop, haloxyfop, isoxapyrifop, metamifop, propaquizafop, quizalofop and trifop, salts and esters thereof, and mixtures thereof ACCase inhibitors also include mixtures of one or more "dims" and one or more "fops", salts and esters thereof.

In various embodiments, the additional herbicide comprises an ALS or AHAS inhibitor. ALS and AHAS inhibitors include, for example, amidosulfuron, azimsulfruon, bensulfuron-methyl, bispyribac-sodium, chlorimuron-ethyl, chlorsulfuron, cinosulfuron, cloransulam-methyl, cyclosulfamuron, diclosulam, ethametsulfuron-methyl, ethoxysulfuron, flazasulfuron, florazulam, flucarbazone, flucetosulfuron, flumetsulam, flupyrsulfuron-methyl, foramsulfuron, halosulfuron-methyl, imazamethabenz, imazamox, imazapic, imazapyr, imazaquin, imazethapyr, imazosulfuron, iodosulfuron, metsulfuron-methyl, nicosulfuron, penoxsulam, primisulfuron-methyl, propoxycarbazone-sodium, prosulfuron, pyrazosulfuron-ethyl, pyribenzoxim, pyrithiobac, rimsulfuron, sulfometuron-methyl, sulfosulfuron, thiencarbazone, thifensulfuron-methyl, triasulfuron, tribenuron-methyl, trifloxysulfuron and triflusulfuronmethyl, salts and esters thereof, and mixtures thereof.

In further embodiments, the additional herbicide comprises a mitosis inhibitor. Mitosis inhibitors include anilofos, benefin, DCPA, dithiopyr, ethalfluralin, flufenacet, mefenacet, oryzalin, pendimethalin, thiazopyr and trifluralin, salts and esters thereof, and mixtures thereof.

In some embodiments, the additional herbicide comprises a PS I inhibitor such as diquat and paraquat, salts and esters thereof, and mixtures thereof.

In certain embodiments, the additional herbicide comprises a cellulose inhibitor such as dichlobenil and isoxaben.

In still further embodiments, the additional herbicide comprises an oxidative phosphorylation uncoupler such as dinoterb, and esters thereof.

In other embodiments, the additional herbicide comprises an auxin transport inhibitor such as diflufenzopyr and naptalam, salts and esters thereof, and mixtures thereof.

In various embodiments, the additional herbicide comprises a dihydropteroate synthase inhibitor such as asulam and salts thereof.

In some embodiments, the additional herbicide comprises a fatty acid and lipid biosynthesis inhibitor such as bensulide, butylate, cycloate, EPTC, esprocarb, molinate, pebulate, prosulfocarb, thiobencarb, triallate and vernolate, salts and esters thereof, and mixtures thereof Application of Herbicidal Compositions The present invention is also directed to various methods of applying the herbicidal application mixtures as described herein.

In various embodiments, the herbicidal application mixture is a herbicidal application mixture used to control weeds in a field of crop plants. Commercially important crop plants include, for example, corn, soybean, cotton, dry beans, snap beans, and potatoes. Crop plants include hybrids, inbreds, and transgenic or genetically modified plants having specific traits or combinations of traits including, without limitation, herbicide tolerance (e.g., resistance to glyphosate, glufosinate, dicamba, sethoxydim, PPO inhibitor, etc.), *Bacillus thuringiensis* (Bt), high oil, high lysine, high starch, nutritional density, and drought resistance.

In some embodiments, the crop plants are tolerant to organophosphorus herbicides, acetolactate synthase (ALS) or acetohydroxy acid synthase (AHAS) inhibitor herbicides, auxin herbicides and/or acetyl CoA carboxylase (ACCase) inhibitor herbicides, In other embodiments the crop plants are tolerant to glyphosate, dicamba, 2,4-D, MCPA, quizalofop, glufosinate and/or diclofop-methyl. In other embodiments, the crop plant is glyphosate and/or dicamba tolerant. In some embodiments of the present invention, crop plants are glyphosate and/or glufosinate tolerant. In other embodiments, the crop plants are glyphosate, glufosinate and dicamba tolerant. In these and other embodiments, the crop plants are tolerant to PPO inhibitors.

The herbicidal application mixture can be applied to a field according to practices known to those skilled in the art. In some embodiments, the herbicidal application mixture is applied to soil of the field, before planting the crop plants or after planting, but pre-emergent to the crop plants. In other embodiments, the herbicidal application mixture is applied to the field post-emergence of the crop plants and/or either before or after emergence of the weed. The herbicidally effective amount of the herbicidal application mixture to be applied is dependent upon various factors including the identity of the herbicides, the crop to be treated, and environmental conditions such as soil type and moisture content.

Herbicidal application mixtures of the present invention are useful for controlling a wide variety of weeds, i.e., plants that are considered to be a nuisance or a competitor of commercially important crop plants. Examples of weeds that may be controlled according to methods of the present invention include, but are not limited to, Meadow Foxtail (*Alopecurus pratensis*) and other weed species with the *Alopecurus* genus, Common Barnyard Grass (*Echinochloa crus-galli*) and other weed species within the *Echinochloa* genus, crabgrasses within the genus *Digitaria*, White Clover (*Trifolium repens*), Lambsquarters (*Chenopodium berlandieri*), Redroot Pigweed (*Amaranthus retroflexus*) and other weed species within the *Amaranthus* genus, Common Purslane (*Portulaca oleracea*) and other weed species in the *Portulaca* genus, *Chenopodium album* and other *Chenopodium* spp., *Setaria lutescens* and other *Setaria* spp., *Solanum nigrum* and other *Solanum* spp., *Lolium multiflorum* and other *Lolium* spp., *Brachiaria platyphylla* and other *Brachiaria* spp., *Sorghum halepense* and other *Sorghum* spp., *Conyza Canadensis* and other *Conyza* spp., and *Eleusine indica*. In some embodiments, the weeds comprise one or more glyphosate-resistant species, 2,4-D-resistant species, dicamba-resistant species and/or ALS inhibitor herbicide-resistant species. In some embodiments, the glyphosate-resistant weed species is selected from the group consisting of *Amaranthus palmeri, Amaranthus rudis, Ambrosia artemisiifolia, Ambrosia trifida, Conyza bonariensis, Conyza canadensis, Digitaria insularis, Echinochloa colona, Eleusine indica, Euphorbia heterophylla, Lolium multiflorum, Lolium rigidum, Plantago lancelata, Sorghum halepense*, and *Urochloa panicoides*.

Although various methods discussed herein reference applying an application mixture to "a field of crop plants," it is understood that these methods can include applying the mixture to fields that are to be planted with crop plants (e.g., for pre-plant application or burndown in fallow fields). Further, even though various methods reference weeds in a "field," this term is inclusive of smaller, discrete areas, such as a pot of soil or raised bed (e.g., in a greenhouse setting).

Having described the invention in detail, it will be apparent that modifications and variations are possible without departing from the scope of the invention defined in the appended claims.

EMBODIMENTS

For further illustration, additional non-limiting embodiments of the present disclosure are set forth below.

Embodiment 1 is a herbicidal dispersion composition comprising:
  an oil continuous phase comprising an acetamide herbicide and a nonaqueous liquid, wherein the weight ratio of the nonaqueous liquid to acetamide herbicide is at least about 1:1, at least about 1.1:1, at least about 1.2:1, at least about 1.3:1, at least about 1.4:1, or at least about 1.5:1; and
  a dispersed phase in the oil continuous phase and comprising a solid phase herbicide.

Embodiment 2 is the composition of Embodiment 1 wherein the weight ratio of nonaqueous liquid to acetamide herbicide is from about 1:1 to about 10:1, from about 1:1 to about 5:1, from about 1:1 to about 3:1, from about 1:1 to about 2:1, from about 1:1 to about 1.5:1, from about 1.1:1 to about 10:1, from about 1.1:1 to about 5:1, from about 1.1:1 to about 3:1, from about 1.1:1 to about 2:1, from about 1.1:1 to about 1.5:1, from about 1.2:1 to about 10:1, from about 1.2:1 to about 5:1, from about 1.2:1 to about 3:1, from about 1.2:1 to about 2:1, or from about 1.2:1 to about 1.5:1.

Embodiment 3 is the composition of Embodiment 1 or 2 wherein the nonaqueous liquid comprises a non-polar liquid.

Embodiment 4 is the composition of any one of Embodiments 1 to 3 wherein the nonaqueous liquid has a dielectric constant measured at 25° C. that is less than about 3.5, less than about 3, less than about 2.5, or less than about 2.

Embodiment 5 is the composition of any one of Embodiments 1 to 4 wherein the nonaqueous liquid comprises a paraffinic or aliphatic hydrocarbon liquid and/or mineral oil.

Embodiment 6 is the composition of any one of Embodiments 1 to 5 wherein the nonaqueous liquid comprises one or more $C_5$-$C_{25}$ branched and/or linear alkanes.

Embodiment 7 is the composition of any one of Embodiments 1 to 6 wherein the nonaqueous liquid comprises $C_{10}$-$C_{20}$ branched alkanes.

Embodiment 8 is the composition of any one of Embodiments 1 to 7 wherein the nonaqueous liquid comprises an ester with a carbon atom content of at least 12.

Embodiment 9 is the composition of any one of Embodiments 1 to 8 wherein the nonaqueous liquid comprises isopropyl myristate.

Embodiment 10 is the composition of any one of Embodiments 1 to 9 wherein the nonaqueous liquid comprises a silicone oil.

Embodiment 11 is the composition of any one of Embodiments 1 to 10 wherein the nonaqueous liquid comprises a silicone oil having a viscosity of from about 5 cst to about 100,000 cst, from about 5 cst to about 10,000 cst, from about 5 cst to about 1,000 cst, from about 5 cst to about 500 cst, from about 10 cst to about 100,000 cst, from about 10 cst to about 10,000 cst, from about 10 cst to about 1,000 cst, from about 10 cst to about 500 cst, from about 20 cst to about 100,000 cst, from about 20 cst to about 10,000 cst, from about 20 cst to about 1,000 cst, or from about 20 cst to about 500 cst.

Embodiment 12 is the composition of any one of Embodiments 1 to 11 wherein the solid phase herbicide comprises at least one hydroxyphenylpyruvate dioxygenase (HPPD) inhibitor selected from the group consisting of aclonifen, amitrole, beflubutamid, benzofenap, clomazone, diflufenican, fluridone, flurochloridone, flurtamone, isoxachlortole, isoxaflutole, mesotrione, norflurazon, picolinafen, pyrazolynate, pyrazoxyfen, sulcotrione, tembotrione, topramezone, tolpyralate, tefuryltrione, salts and esters thereof, and mixtures thereof.

Embodiment 13 is the composition of any one of Embodiments 1 to 12 wherein the solid phase herbicide comprises mesotrione.

Embodiment 14 is the composition of any one of Embodiments 1 to 13 wherein the solid phase herbicide comprises a solid phase ionic herbicide.

Embodiment 15 is the composition of any one of Embodiments 1 to 14 wherein the solid phase herbicide comprises glyphosate acid or a salt thereof.

Embodiment 16 is the composition of any one of Embodiments 1 to 15 wherein the solid phase herbicide comprises glufosinate acid or a salt thereof.

Embodiment 17 is the composition of any one of Embodiments 1 to 16 wherein the solid phase herbicide comprises a protoporphyrinogen oxidase (PPO) inhibitor.

Embodiment 18 is a herbicidal dispersion composition comprising:
  an oil continuous phase comprising a nonaqueous liquid;
  a first bulk dispersed phase in the oil continuous phase, wherein the first bulk dispersed phase comprises an auxin herbicide that is at least partially dissolved in an acetamide herbicide and/or an affinity solvent for the auxin herbicide; and
  a second bulk dispersed phase in the oil continuous phase and comprising a solid phase herbicide.

Embodiment 19 is the composition of Embodiment 18 wherein the nonaqueous liquid comprises a silicone oil.

Embodiment 20 is the composition of Embodiment 18 or 19 wherein the nonaqueous liquid comprises a mineral oil.

Embodiment 21 is the composition of any one of Embodiments 18 to 20 wherein the second bulk dispersed phase further comprises a second bulk dispersed phase oil and wherein the solid phase herbicide is dispersed in the second bulk dispersed phase oil.

Embodiment 22 is the composition of Embodiment 21 wherein the second bulk dispersed phase oil comprises a silicone oil.

Embodiment 23 is the composition of Embodiment 21 wherein the second bulk dispersed phase oil comprises a silicone oil having a viscosity of from about 5 cst to about 100,000 cst, from about 5 cst to about 10,000 cst, from about 5 cst to about 1,000 cst, from about 5 cst to about 500 cst, from about 10 cst to about 100,000 cst, from about 10 cst to about 10,000 cst, from about 10 cst to about 1,000 cst, from about 10 cst to about 500 cst, from about 20 cst to about 100,000 cst, from about 20 cst to about 10,000 cst, from about 20 cst to about 1,000 cst, or from about 20 cst to about 500 cst.

Embodiment 24 is the composition of any one of Embodiments 21 to 23 wherein the second bulk dispersed phase oil comprises a mineral oil.

Embodiment 25 is the composition of any one of Embodiments 21 to 24 wherein the nonaqueous liquid and the second bulk dispersed phase oil are not the same.

Embodiment 26 is the composition of any one of Embodiments 18 to 25 wherein the auxin herbicide is selected from the group consisting of 3,6-dichloro-2-methoxybenzoic acid (dicamba); 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy)butanoic acid (MCPB); 4-chlorophenoxyacetic acid; 2,4,5-trichlorophenoxyacetic acid (2,4,5-T); aminopyralid; clopyralid; fluroxypyr; triclopyr; mecoprop; picloram; quinclorac; aminocyclopyrachlor; benazolin; halauxifen; fluorpyrauxifen; methyl 4-amino-3-chloro-5-fluoro-6-(7-fluoro-1H-indol-6-yl)pyridine-2-carboxylate; 4-amino-3-chloro-5-fluoro-6-(7-fluoro-1H-indol-6-yl)pyridine-2-carboxylic acid; benzyl 4-amino-3-chloro-5-fluoro-6-(7-fluoro-1H-indol-6-yl)pyridine-2-carboxylate; methyl 4-amino-3-chloro-5-fluoro-6-(7-fluoro-1-isobutyryl-1H-indol-6-yl)pyridine-2-carboxylate; methyl 4-amino-3-chloro-6-[1-(2,2-dimethylpropanoyl)-7-fluoro-1H-indol-6-yl]-5-fluoropyridine-2-carboxylate; methyl 4-amino-3-chloro-5-fluoro-6-[7-fluoro-1-(methoxyacetyl)-1H-indol-6-yl]pyridine-2-carboxylate; methyl 6-(1-acetyl-7-fluoro-1H-indol-6-yl)-4-amino-3-chloro-5-fluoropyridine-2-carboxylate; potassium 4-amino-3-chloro-5-fluoro-6-(7-fluoro-1H-indol-6-yl)pyridine-2-carboxylate; butyl 4-amino-3-chloro-5-fluoro-6-(7-fluoro-TH-indol-6-yl)pyridine-2-carboxylate; salts and esters thereof; and mixtures thereof.

Embodiment 27 is the composition of any one of Embodiments 18 to 26 wherein the auxin herbicide comprises an auxin herbicide acid.

Embodiment 28 is the composition of any one of Embodiments 18 to 27 wherein the auxin herbicide comprises dicamba acid.

Embodiment 29 is the composition of any one of Embodiments 18 to 28 wherein the auxin herbicide comprises 2,4-D acid.

Embodiment 30 is the composition of any one of Embodiments 18 to 29 wherein the composition comprises the affinity solvent.

Embodiment 31 is the composition of any one of Embodiments 18 to 30 wherein the affinity solvent for the auxin herbicide acid, satisfies at least one of the following:
(1) a molecular weight of at least about 300 grams per mole, at least about 600 grams per mole, or at least about 900 grams per mole (e.g., about 900 to about 1500 grams per mole),
(2) at least one double bond groups per molecule of the solvent, and/or
(3) at least four hydrogen bonding groups per molecule of the solvent.

Embodiment 32 is the composition of any one of Embodiments 18 to 31 wherein the composition comprises the affinity solvent.

Embodiment 33 is the composition of any one of Embodiments 18 to 32 wherein the affinity solvent comprises an alkylene glycol.

Embodiment 34 is the composition of any one of Embodiments 18 to 33 wherein the affinity solvent comprises a triglyceride.

Embodiment 35 is the composition of any one of Embodiments 18 to 34 wherein the affinity solvent comprises castor oil.

Embodiment 36 is the composition of any one of Embodiments 18 to 35 wherein the weight ratio of affinity solvent to auxin herbicide is at least about 1:1, at least about 1.5:1, at least about 2:1, or at least about 3:1.

Embodiment 37 is the composition of any one of Embodiments 18 to 35 wherein the weight ratio of affinity solvent to auxin herbicide is from about 1:1 to about 5:1, from about 1:1 to about 4:1, from about 1:1 to about 3:1, from about 1.5:1 to about 5:1, from about 1.5:1 to about 4:1, from about 1.5:1 to about 3:1, from about 2:1 to about 5:1, from about 2:1 to about 4:1, or from about 2:1 to about 3:1.

Embodiment 38 is the composition of any one of Embodiments 1 to 37 wherein the nonaqueous liquid concentration is at least about 10 wt. %, at least about 15 wt. %, at least about 20 wt. %, at least about 25 wt. %, at least about 30 wt. %, at least about 35 wt. %, at least about 40 wt. %, or at least about 50 wt. %.

Embodiment 39 is the composition of any one of Embodiments 1 to 37 wherein the concentration of the nonaqueous liquid is from about 10 wt. % to about 75 wt. %, from about 20 wt. % to about 75 wt. %, from about 30 wt. % to about 75 wt. %, from about 40 wt. % to about 75 wt. %, from about 50 wt. % to about 75 wt. %, from about 10 wt. % to about 65 wt. %, from about 20 wt. % to about 65 wt. %, from about 30 wt. % to about 65 wt. %, from about 40 wt. % to about 65 wt. %, from about 50 wt. % to about 65 wt. %, from about 10 wt. % to about 60 wt. %, from about 20 wt. % to about 60 wt. %, from about 30 wt. % to about 60 wt. %, from about 40 wt. % to about 60 wt. %, from about 50 wt. % to about 60 wt. %, from about 10 wt. % to about 55 wt. %, from about 20 wt. % to about 55 wt. %, from about 30 wt. % to about 55 wt. %, from about 40 wt. % to about 55 wt. %, from about 50 wt. % to about 55 wt. %, or from about 40 wt. % to about 50 wt. %.

Embodiment 40 is the composition of any one of Embodiments 1 to 39 wherein the volume fraction of the oil continuous phase based on the total volume of the composition is greater than about 0.6, greater than about 0.7, or greater than about 0.8.

Embodiment 41 is the composition of any one of Embodiments 1 to 39 wherein the volume fraction of the oil continuous phase based on the total volume of the composition is from 0.5 to about 0.9, from 0.5 to about 0.8, from 0.5 to about 0.7, from 0.6 to about 0.9, from 0.6 to about 0.8, or from 0.6 to about 0.7.

Embodiment 42 is the composition of any one of Embodiments 1 to 41 wherein the composition further comprises a polymeric dispersing agent.

Embodiment 43 is the composition of Embodiment 42 wherein the polymeric dispersing agent has a HLB (hydrophilic-lipophilic balance) value of less than about 7

Embodiment 44 is the composition of Embodiment 42 or 43 wherein the polymeric dispersing agent comprises a block or graft copolymer comprising a co-monomer that is nominally insoluble and a second co-monomer that is soluble in the oil continuous phase.

Embodiment 45 is the composition of any one of Embodiments 42 to 44 wherein the polymeric dispersing agent comprises a tri-block copolymer having a molecular structure that can be represented as A-B-A block copolymer, wherein "A" represents the soluble co-monomer and "B" represents the nominally insoluble co-monomer.

Embodiment 46 is the composition of any one of Embodiments 42 to 45 wherein the polymeric dispersing agent comprises at least one polymer selected from the group consisting of PEG-30 dipolyhydroxystearate, polyglyceryl-2 dipolyhydroxystearate, PEG-polyethylene block copolymer, PEG-polystyrene block copolymer, PEG-3 pimethicone, PEG-9 methyl ether dimethicone, PEG-10 dimethicone, PEG-9 polydimethylsiloxyethyl dimethicone, lauryl PEG-9 polydimethylsiloxyethyl dimethicone, polyglyceryl-3 polydimethylsiloxyethyl dimethicone, lauryl polyglyceryl-3 polydimethylsiloxyethyl dimethicone, polyglyceryl-3 polydimethylsiloxyethyl dimethicone, polyglyceryl-3 disiloxane dimethicone, acrylates/ethylhexyl acrylate/dimethicone methacrylate, polyglyceryl-3 lauryl polydimethylsiloxyethyl dimethicone crosspolymer, PEG-15 lauryl polydimethylsiloxyethyl dimethicone crosspolymer, PEG-15/lauryl dimethicone crosspolymer, dimethicone/PEG-10/15 crosspolymer, dimethicone/polyglyceryl-3 crosspolymer, lauryl dimethicone/polyglyceryl-3 crosspolymer, trimethylsiloxysilicate, and mixtures thereof.

Embodiment 47 is the composition of any one of Embodiments 42 to 46 wherein the oil continuous phase comprises a single polymeric dispersing agent.

Embodiment 48 is the composition of any one of Embodiments 42 to 47 wherein the concentration of the polymeric dispersing agent is from about 0.10% to about 50%, from about 0.10% to about 40%, from about 0.1% to about 30%, from about 0.10% to about 25%, from about 0.10% to about 20%, from about 0.1% to about 15%, from about 0.10% to about 10%, from about 0.1% to about 5%, from about 1% to about 50%, from about 1% to about 40%, from about 1% to about 30%, from about 1% to about 25%, from about 0.1% to about 20%, from about 1% to about 15%, from about 1% to about 10%, or from about 1% to about 5% by weight of each dispersed phase.

Embodiment 49 is the composition of any one of Embodiments 1 to 48 wherein the oil continuous phase further comprises a viscous, shear-thinning oil that has a high low-shear-rate viscosity even upon heating.

Embodiment 50 is the composition of any one of Embodiments 1 to 49 wherein the composition further comprises a rheology modifier.

Embodiment 51 is the composition of Embodiment 50 wherein the rheology modifier comprises a particulate rheology modifier selected from the group consisting of smectite clays, silica, paraffinic and natural waxes, crystalline cellulose, and mixtures thereof.

Embodiment 52 is the composition of Embodiment 51 wherein the particulate rheology modifier is in a surface-modified form, wherein the surface-modifier is selected from the group consisting of a $C_{12}$-$C_{18}$ alkyl or aryl quaternary ammonium compound, a polymer, and mixtures thereof.

Embodiment 53 is the composition of any one of Embodiments 50 to 52 wherein the rheology modifier comprises a polymeric rheology modifier.

Embodiment 54 is the composition of Embodiment 53 wherein the polymeric rheology-modifier comprises an oil-soluble, hydrophobic cross-polymer.

Embodiment 55 is the composition of Embodiment 53 or 54 wherein the rheology modifier comprises at least one polymeric rheology-modifier selected from the group consisting of polyamides, polyethylene, dimethicone/vinyl dimethicone crosspolymer, dimethicone/phenyl vinyl dimethicone crosspolymer, dimethicone/lauryl dimethicone crosspolymer, and lauryl polydimethylsiloxyethyl dimethicone/bis-vinyl dimethicone crosspolymer, and mixtures thereof.

Embodiment 56 is the composition of any one of Embodiments 53 to 55 wherein the rheology modifier comprises a mixture of particulate and polymeric rheology modifiers.

Embodiment 57 is the composition of any one of Embodiments 50 to 56 wherein the concentration of the rheology modifier is from about 0.025 wt. % to about 30 wt. %, from about 0.025 wt. % to about 20 wt. %, from about 0.025 wt. % to about 25 wt. %, from about 0.025 wt. % to about 15 wt. %, from about 0.025 wt. % to about 10 wt. %, from about 0.025 wt. % to about 5 wt. %, from about 0.025 wt. % to about 1 wt. %, from about 0.1 wt. % to about 30 wt. %, from about 0.1 wt. % to about 25 wt. %, from about 0.1 wt. % to about 20 wt. %, from about 0.1 wt. % to about 15 wt. %, from about 0.1 wt. % to about 10 wt. %, from about 0.1 wt. % to about 5 wt. %, or from about 0.1 wt. % to about 1 wt. %.

Embodiment 58 is the composition of any one of Embodiments 50 to 57 wherein the rheology modifier has an average particle size that is less than about 5 microns, less than about 2.5 microns, less than about 1 microns, less than about 0.5 microns, or less than about 0.1 microns.

Embodiment 59 is the composition of any one of Embodiments 50 to 58 wherein the rheology modifier is milled to an average particle size that is less than about 5 microns, less than about 2.5 microns, less than about 1 microns, less than about 0.5 microns, or less than about 0.1 microns.

Embodiment 60 is the composition of any one of Embodiments 1 to 59 wherein the composition further comprises one or more surfactants having an HLB value of greater than 7.

Embodiment 61 is the composition of Embodiment 60 wherein the surfactant comprises a non-ionic surfactant.

Embodiment 62 is the composition of Embodiment 60 or 61 wherein the surfactant comprises an ionic surfactant.

Embodiment 63 is the composition of Embodiment 62 wherein the ionic surfactant is selected from the group consisting of alkyl/aryl ether sulfates, alkyl/aryl ether sulfonates, alkyl/aryl ether carboxylates, alkyl/aryl ether phosphates, dialkyl sulfosuccinates, ethoxylated ether amines, ethoxylated-propoxylated ether amines, alkyl/aryl quaternary amine compounds, alkyl/aryl quaternaryphosphonium compounds, ethoxylated alkyl/aryl quaternary amine compounds, ethoxylated alkyl/aryl quaternary phosphonium compounds, betaines, sultaines, phospholipids, and mixtures thereof.

Embodiment 64 is the composition of any one of Embodiments 60 to 63 wherein the concentration of the surfactant is from about 0.1 wt. % to about 25 wt. %, from about 0.1 wt. % to about 20 wt. %, from about 0.1 wt. % to about 15 wt. %, from about 0.1 wt. % to about 10 wt. %, from about 0.1 wt. % to about 5 wt. %, from about 0.1 wt. % to about 3 wt. %, from about 0.1 wt. % to about 2 wt. %, from about from about 0.5 wt. % to about 25 wt. %, from about 0.5 wt. % to about 20 wt. %, from about 0.5 wt. % to about 15 wt. %, 0.5 wt. % to about 10 wt. %, from about 0.5 wt. % to about 5 wt. %, from about 0.5 wt. % to about 3 wt. %, from about 0.5 wt. % to about 2 wt. %, from about 1 wt. % to about 25 wt. %, from about 1 wt. % to about 20 wt. %, from about 1 wt. % to about 15 wt. %, from about 1 wt. % to about 10 wt. %, from about 1 wt. % to about 5 wt. %, from about 1 wt. % to about 3 wt. %, or from about 1 wt. % to about 2 wt. %.

Embodiment 65 is the composition of any one of Embodiments 1 to 64 wherein the composition further a quaternary amine compound.

Embodiment 66 is the composition of Embodiment 65 wherein the quaternary amine compound comprises an alkyl quaternary amine compound, an aryl quaternary amine compound, an alkoxylated alkyl quaternary amine compound and/or an alkoxylated aryl quaternary amine compound.

Embodiment 67 is the composition of Embodiment 65 or 66 wherein the quaternary amine compound has a molecular weight that is no greater than about 1,000 Da, no greater than about 750 Da, or no greater than about 500 Da.

Embodiment 68 is the composition of Embodiment 65 or 66 wherein the quaternary amine compound has a molecular weight that is from about 100 Da to about 1,000 Da, from about 100 Da to about 750 Da, from about 100 Da to about 500 Da, from about 200 Da to about 1,000 Da, from about 200 Da to about 750 Da, from about 200 Da to about 500 Da, from about 250 Da to about 1,000 Da, from about 250 Da to about 750 Da, or from about 250 Da to about 500 Da.

Embodiment 69 is the composition of any one of Embodiments 65 to 68 wherein the quaternary amine compound has a structure of formula (I):

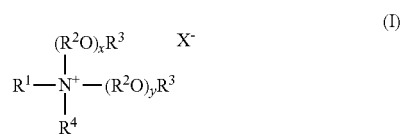

wherein $R^1$ is hydrocarbyl or substituted hydrocarbyl having from 1 to about 30 carbon atoms; each $R^2$ in each of the $(R^2O)_x$ and $(R^2O)_y$ groups is independently a linear or branched $C_2$-$C_4$ alkylene; each $R^3$ is independently hydrogen, or a linear or branched alkyl group having from 1 to about 4 carbon atoms; $R^4$ is hydrocarbyl or substituted hydrocarbyl having from 1 to about 30 carbon atoms; x and y are independently a number from 0 to about 10; and $X^-$ is an agriculturally acceptable anion.

Embodiment 70 is the composition of Embodiment 69 wherein the $R^1$ and $R^4$ hydrocarbyl groups are each independently linear or branched alkyl, linear or branched alkenyl, linear or branched alkynyl, linear or branched alkoxy, aryl, or aralkyl having from 1 to about 30 carbon atoms.

Embodiment 71 is the composition of Embodiment 69 or 70 wherein $R^1$ and $R^4$ are each independently a linear or branched alkyl, linear or branched alkenyl, or linear or branched alkoxy having from 1 to about 25 carbon atoms from 1 to about 22 carbon atoms, from 1 to about 20 carbon atoms, from 1 to about 18 carbon atoms, from 3 to about 25 carbon atoms from 3 to about 22 carbon atoms, from 3 to about 20 carbon atoms, from 3 to about 18 carbon atoms, from 3 to about 16 carbon atoms, from 3 to about 14 carbon atoms, from 3 to about 12 carbon atoms, from 3 to about 10 carbon atoms, from 3 to about 8 carbon atoms, or from 3 to about 6 carbon atoms.

Embodiment 72 is the composition of any one of Embodiments 69 to 71 wherein $R^1$ and $R^4$ have the same number of carbon atoms and/or are the same substituent group.

Embodiment 73 is the composition of any one of Embodiments 69 to 72 wherein $R^1$ and $R^4$ are each butyl.

Embodiment 74 is the composition of any one of Embodiments 69 to 73 wherein $R^1$ is a linear or branched alkyl, linear or branched alkenyl, or linear or branched alkoxy having from 3 to about 25 carbon atoms, from 3 to about 22 carbon atoms, 3 to about 20 carbon atoms, or from about 3 to 18 carbon atoms.

Embodiment 75 is the composition of any one of Embodiments 69 to 74 wherein $R^4$ is a linear or branched alkyl, linear or branched alkenyl, or linear or branched alkoxy having from 1 to about 12 carbon atoms, from 1 to about 10 carbon atoms, 1 to about 8 carbon atoms, from about 1 to 4 carbon atoms, from 3 to about 12 carbon atoms, from 3 to about 10 carbon atoms, 3 to about 8 carbon atoms, or from about 3 to 6 carbon atoms.

Embodiment 76 is the composition of any one of Embodiments 69 to 75 wherein each $R^2$ in each of the $(R^2O)_x$ and $(R^2O)_y$ groups is independently a $C_2$-$C_4$ linear or branched alkylene.

Embodiment 77 is the composition of any one of Embodiments 69 to 76 wherein the quaternary amine compounds of formula (I) comprises an alkoxylated quaternary amine compound selected from the group consisting of ethoxylated quaternary amine compounds, propoxylated quaternary amine compounds, and quaternary amine compounds comprising various polymers or copolymers of ethylene oxide (EO) and propylene oxide (PO).

Embodiment 78 is the composition of any one of Embodiments 69 to 77 wherein each $R^2$ in each of the $(R^2O)_x$ and $(R^2O)_y$ groups is independently a linear or branched $C_2$-$C_4$ alkylene.

Embodiment 79 is the composition of any one of Embodiments 69 to 78 wherein each $R^2$ in each of the $(R^2O)_x$ and $(R^2O)_y$ groups is independently ethylene or propylene.

Embodiment 80 is the composition of any one of Embodiments 69 to 79 wherein the quaternary amine compounds comprise a molar ratio of EO:PO from about 1:3 to about 3:1, from about 1:3 to about 2:1, from about 1:3 to about 1.5:1, from about 1:3 to about 1:1, from about 1:3 to about 1:2, from about 1:2 to about 3:1, from about 1:2 to about 2:1, from about 1:2 to about 1.5:1, from about 1:2 to about 1:1, from about 1:1 to about 3:1, from about 1:1 to about 2:1, or from about 1:1 to about 1.5:1.

Embodiment 81 is the composition of any one of Embodiments 69 to 80 wherein x and y are independently a number from 0 to about 8, from 0 to about 6, from 0 to about 4, from about 0 to about 2, from 1 to about 8, from 1 to about 6, from 1 to about 4, from 1 to 2.

Embodiment 82 is the composition of any one of Embodiments 69 to 81 wherein x and y are each 0 or 1.

Embodiment 83 is the composition of any one of Embodiments 69 to 82 wherein each $R^3$ is independently hydrogen, methyl or ethyl.

Embodiment 84 is the composition of any one of Embodiments 69 to 83 wherein each $R^3$ is hydrogen.

Embodiment 85 is the composition of any one of Embodiments 69 to 84 wherein $X^-$ is anion selected from the group consisting of sulfate, hydroxide, chloride, bromide, and nitrate.

Embodiment 86 is the composition of any one of Embodiments 69 to 85 wherein $X^-$ is a chloride or hydroxide anion.

Embodiment 87 is the composition of any one of Embodiments 65 to 86 wherein the quaternary amine compound is selected from the group consisting of tetrabutyl ammonium salts and trimethyl-tetradecyl ammonium salts.

Embodiment 88 is the composition of any one of Embodiments 65 to 87 wherein the quaternary amine compound has a structure of formula (II):

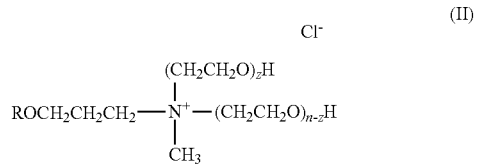

where R is alkyl (e.g., $C_1$-$C_{20}$ alkyl), n is the total number of moles of ($CH_2CH_2O$), and n+z is a number from 0 to 15.

Embodiment 89 is the composition of any one of Embodiments 65 to 88 wherein the quaternary amine compound is selected from the group consisting of isodecyloxypropyl dihydroxyethyl methyl ammonium chloride, isotridecyloxypropyl dihydroxyethyl methyl ammonium chloride, isotridecyloxypropyl poly(5)oxyethylene methyl ammonium chloride, octadecyl dihydroxyethyl methyl ammonium chloride, and mixtures thereof.

Embodiment 90 is the composition of any one of Embodiments 65 to 89 wherein the composition comprises an auxin herbicide and the molar ratio of quaternary amine compound to auxin herbicide is at least about 0.25:1, at least about 0.5:1, at least about 0.75:1, or at least about 1:1.

Embodiment 91 is the composition of any one of Embodiments 65 to 89 wherein the composition comprises an auxin herbicide and the molar ratio of quaternary amine compound to auxin herbicide is from about 0.25:1 to about 2:1, from about 0.25:1 to about 1.75:1, from about 0.25:1 to about 1.5:1, from about 0.25:1 to about 1.25:1, from about 0.25:1 to about 1:1, from about 0.5:1 to about 2:1, from about 0.5:1 to about 1.75:1, from about 0.5:1 to about 1.5:1, from about 0.5:1 to about 1.25:1, from about 0.5:1 to about 1:1, from about 0.75:1 to about 2:1, from about 0.75:1 to about 1.75:1, from about 0.75:1 to about 1.5:1, from about 0.75:1 to about 1.25:1, from about 0.75:1 to about 1:1, from about 1:1 to about 2:1, from about 1:1 to about 1.75:1, from about 1:1 to about 1.5:1, or from about 1:1 to about 1.25:1.

Embodiment 92 is the composition of any one of Embodiments 1 to 91 wherein the composition has a total herbicide loading of at least about 10 wt. %, at least about 20 wt. %, at least about 30 wt. %, at least about 40 wt. %, at least about 50 wt. %, or at least about 60 wt. %.

Embodiment 93 is the composition of any one of Embodiments 1 to 91 wherein the composition has a total herbicide loading of from about 10 wt. % to about 80 wt. %, from about 20 wt. % to about 80 wt. %, from about 30 wt. % to about 80 wt. %, from about 40 wt. % to about 80 wt. %, from about 50 wt. % to about 80 wt. %, from about 60 wt. % to about 80 wt. %, from about 10 wt. % to about 70 wt. %, from about 20 wt. % to about 70 wt. %, from about 30 wt. % to about 70 wt. %, from about 40 wt. % to about 70 wt. %, from about 50 wt. % to about 70 wt. %, from about 60 wt. % to about 70 wt. %, from about 10 wt. % to about 60 wt. %, from about 20 wt. % to about 60 wt. %, from about 30 wt. % to about 60 wt. %, from about 40 wt. % to about 60 wt. %, or from about 50 wt. % to about 60 wt. %.

Embodiment 94 is the composition of any one of Embodiments 1 to 93 wherein the concentration of the acetamide herbicide is at least about 10 wt. %, at least about 15 wt. %, at least about 20 wt. %, at least about 25 wt. %, at least about 30 wt. %, at least about 35 wt. %, or at least about 40 wt. %.

Embodiment 95 is the composition of any one of Embodiments 1 to 93 wherein the concentration of the acetamide herbicide is from about 10 wt. % to about 65 wt. %, from about 20 wt. % to about 65 wt. %, from about 30 wt. % to about 65 wt. %, from about 40 wt. % to about 65 wt. %, from about 50 wt. % to about 65 wt. %, from about 10 wt. % to about 60 wt. %, from about 20 wt. % to about 60 wt. %, from about 30 wt. % to about 60 wt. %, from about 40 wt. % to about 60 wt. %, from about 50 wt. % to about 60 wt. %, from about 10 wt. % to about 55 wt. %, from about 20 wt. % to about 55 wt. %, from about 30 wt. % to about 55 wt. %, from about 40 wt. % to about 55 wt. %, from about 50 wt. % to about 55 wt. %, or from about 40 wt. % to about 50 wt. %.

Embodiment 96 is the composition of any one of Embodiments 1 to 95 wherein the acetamide herbicide is selected from the group consisting of acetochlor, alachlor, butachlor, butenachlor, carbetamide, delachlor, dethatyl, dimethachlor, dimethenamid, dimethenamid-P, mefenacet, metazochlor, metolachlor, S-metolachlor, napropamide, pretilachlor, pronamide, propachlor, propisochlor, prynachlor, terbuchlor, thenylchlor and xylachlor, salts and esters thereof, and mixtures thereof.

Embodiment 97 is the composition of any one of Embodiments 1 to 96 wherein the acetamide herbicide is selected from the group consisting of acetochlor, alachlor, metolachlor, S-metolachlor, and mixtures thereof.

Embodiment 98 is the composition of any one of Embodiments 1 to 97 wherein the acetamide herbicide comprises acetochlor.

Embodiment 99 is the composition of any one of Embodiments 1 to 98 wherein the concentration of the solid phase herbicide is at least about 1 wt. %, at least about 2 wt. %, at least about 5 wt. %, at least about 10 wt. %, at least about 15 wt. %, at least about 20 wt. %, at least about 25 wt. %, or at least about 30 wt. %.

Embodiment 100 is the composition of any one of Embodiments 1 to 98 wherein the concentration of the solid phase herbicide is from about 1 wt. % to about 40 wt. %, from about 1 wt. % to about 30 wt. %, from about 1 wt. % to about 20 wt. %, from about 1 wt. % to about 10 wt. %, from about 1 wt. % to about 5 wt. %, from about 2 wt. % to about 40 wt. %, from about 2 wt. % to about 30 wt. %, from about 2 wt. % to about 20 wt. %, from about 2 wt. % to about 10 wt. %, from about 2 wt. % to about 5 wt. %, from about 5 wt. % to about 40 wt. %, from about 5 wt. % to about 30 wt. %, from about 5 wt. % to about 20 wt. %, from about 5 wt. % to about 10 wt. %, from about 10 wt. % to about 40 wt. %, from about 10 wt. % to about 30 wt. %, from about 10 wt. % to about 20 wt. %, from about 15 wt. % to about 40 wt. %, from about 15 wt. % to about 30 wt. %, or from about 15 wt. % to about 20 wt. %.

Embodiment 101 is the composition of any one of Embodiments 1 to 100 wherein the composition further comprises a safener.

Embodiment 102 is a process for preparing a herbicidal dispersion composition comprising:
    mixing a nonaqueous liquid, a solid phase herbicide, and an acetamide herbicide to form the herbicidal dispersion composition comprising an oil continuous phase comprising the nonaqueous liquid and the acetamide herbicide, and a dispersed phase comprising the solid phase herbicide, wherein the weight ratio of the nonaqueous liquid to acetamide herbicide is at least about 1:1, at least about 1.1:1, at least about 1.2:1, at least about 1.3:1, at least about 1.4:1, or at least about 1.5:1.

Embodiment 103 is the process of Embodiment 102 wherein the nonaqueous liquid and the acetamide herbicide are mixed prior to mixing with the solid phase herbicide.

Embodiment 104 is the process of Embodiment 102 wherein the nonaqueous liquid and the solid phase herbicide are mixed prior to mixing with the acetamide herbicide.

Embodiment 105 is a process for preparing a herbicidal dispersion composition comprising:
    mixing an acetamide herbicide and an auxin herbicide to form a first mixture, wherein the auxin herbicide is at least partially dissolved in the acetamide herbicide;
    mixing a nonaqueous liquid and a solid phase herbicide to form a second mixture; and
    mixing the first mixture with the second mixture to form the herbicidal dispersion composition comprising an oil continuous phase comprising the nonaqueous liquid, a first bulk dispersed phase comprising the acetamide herbicide and the auxin herbicide that is at least partially dissolved in the acetamide herbicide and a second bulk dispersed phase comprising a solid phase herbicide.

Embodiment 106 is the process of Embodiment 105 wherein the second bulk dispersed phase further comprises a second bulk dispersed phase oil and wherein the solid phase herbicide is dispersed in the second bulk dispersed phase oil.

Embodiment 107 is the process of Embodiment 105 further comprising mixing the solid phase herbicide with the second bulk dispersed phase oil prior to mixing the nonaqueous liquid with the solid phase herbicide.

Embodiment 108 is the process of any one of Embodiments 105 to 107 wherein the herbicidal dispersion composition further comprises a dispersing agent.

Embodiment 109 is the process of Embodiment 108 further comprising mixing the dispersing agent with the nonaqueous liquid prior to mixing with the nonaqueous liquid with the solid phase herbicide.

Embodiment 110 is the process of any one of Embodiments 102 to 109 further comprising milling the solid phase herbicide.

Embodiment 111 is the process of any one of Embodiments 102 to 110 further comprising milling the herbicidal dispersion composition.

Embodiment 112 is a process for preparing a herbicidal application mixture, the method comprising mixing water with the composition of any one of Embodiments 1 to 101 to form the herbicidal application mixture.

Embodiment 113 is a herbicidal composition comprising an auxin herbicide acid and
(i) a quaternary amine compound and/or a reaction product of the auxin herbicide and the quaternary amine compound, wherein the quaternary amine compound has a structure of formula (I):

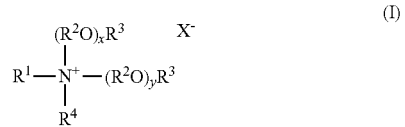

wherein $R^1$ is hydrocarbyl or substituted hydrocarbyl having from 1 to about 30 carbon atoms; each $R^2$ in each of the $(R^2O)_x$ and $(R^2O)_y$ groups is independently a linear or branched $C_2$-$C_4$ alkylene; each $R^3$ is independently hydrogen, or a linear or branched alkyl group having from 1 to about 4 carbon atoms; $R^4$ is hydrocarbyl or substituted hydrocarbyl having from 1 to about 30 carbon atoms; x and y are independently a number from 0 to about 10; and $X^-$ is an agriculturally acceptable anion, with the proviso that $X^-$ is not a hydroxide anion when x and y are each 0 and at least one of $R^1$, $R^2$, $R^3$, and $R^4$ is an alkyl with 2 to 4 carbon atoms or an arylalkyl, and/or
(ii) an affinity solvent for the auxin herbicide acid, wherein the solvent satisfies at least one of the following:
(1) a molecular weight of at least about 300 grams per mole, at least about 600 grams per mole, or at least about 900 grams per mole (e.g., about 900 to about 1500 grams per mole),
(2) at least one double bond groups per molecule of the solvent, and/or
(3) at least four hydrogen bonding groups per molecule of the solvent.

Embodiment 114 is the composition of Embodiment 113 wherein the composition comprises the quaternary amine compound and/or a reaction product of the auxin herbicide and the quaternary amine compound.

Embodiment 115 is the composition of Embodiment 113 or 114 wherein the quaternary amine compound has a molecular weight that is no greater than about 1,000 Da, no greater than about 750 Da, or no greater than about 500 Da.

Embodiment 116 is the composition of Embodiment 113 or 114 wherein the quaternary amine compound has a molecular weight that is from about 100 Da to about 1,000 Da, from about 100 Da to about 750 Da, from about 100 Da to about 500 Da, from about 200 Da to about 1,000 Da, from about 200 Da to about 750 Da, from about 200 Da to about 500 Da, from about 250 Da to about 1,000 Da, from about 250 Da to about 750 Da, or from about 250 Da to about 500 Da.

Embodiment 117 is the composition of any one of Embodiments 113 to 116 wherein the $R^1$ and $R^4$ hydrocarbyl groups are each independently linear or branched alkyl, linear or branched alkenyl, linear or branched alkynyl, linear or branched alkoxy, aryl, or aralkyl having from 1 to about 30 carbon atoms.

Embodiment 118 is the composition of any one of Embodiments 113 to 117 wherein $R^1$ and $R^4$ are each independently a linear or branched alkyl, linear or branched alkenyl, or linear or branched alkoxy having from 1 to about 25 carbon atoms from 1 to about 22 carbon atoms, from 1 to about 20 carbon atoms, from 1 to about 18 carbon atoms, from 3 to about 25 carbon atoms from 3 to about 22 carbon atoms, from 3 to about 20 carbon atoms, from 3 to about 18 carbon atoms, from 3 to about 16 carbon atoms, from 3 to about 14 carbon atoms, from 3 to about 12 carbon atoms, from 3 to about 10 carbon atoms, from 3 to about 8 carbon atoms, or from 3 to about 6 carbon atoms.

Embodiment 119 is the composition of any one of Embodiments 113 to 118 wherein $R^1$ and $R^4$ have the same number of carbon atoms and/or are the same substituent group.

Embodiment 120 is the composition of any one of Embodiments 113 to 119 wherein $R^1$ and $R^4$ are each butyl.

Embodiment 121 is the composition of any one of Embodiments 113 to 120 wherein $R^1$ is a linear or branched alkyl, linear or branched alkenyl, or linear or branched alkoxy having from 3 to about 25 carbon atoms, from 3 to about 22 carbon atoms, 3 to about 20 carbon atoms, or from about 3 to 18 carbon atoms.

Embodiment 122 is the composition of any one of Embodiments 113 to 121 wherein $R^4$ is a linear or branched alkyl, linear or branched alkenyl, or linear or branched alkoxy having from 1 to about 12 carbon atoms, from 1 to about 10 carbon atoms, 1 to about 8 carbon atoms, from about 1 to 6 carbon atoms, from about 1 to 4 carbon atoms, from 3 to about 12 carbon atoms, from 3 to about 10 carbon atoms, 3 to about 8 carbon atoms, or from about 3 to 6 carbon atoms.

Embodiment 123 is the composition of any one of Embodiments 113 to 122 wherein each $R^2$ in each of the $(R^2O)_x$ and $(R^2O)_y$ groups is independently a $C_2$-$C_4$ linear or branched alkylene.

Embodiment 124 is the composition of any one of Embodiments 113 to 123 wherein the quaternary amine compounds of formula (I) comprises an alkoxylated quaternary amine compound selected from the group consisting of ethoxylated quaternary amine compounds, propoxylated quaternary amine compounds, and quaternary amine compounds comprising various polymers or copolymers of ethylene oxide (EO) and propylene oxide (PO).

Embodiment 125 is the composition of any one of Embodiments 113 to 124 wherein each $R^2$ in each of the $(R^2O)_x$ and $(R^2O)_y$ groups is independently a linear or branched $C_2$-$C_4$ alkylene.

Embodiment 126 is the composition of any one of Embodiments 113 to 125 wherein each $R^2$ in each of the $(R^2O)_x$ and $(R^2O)_y$ groups is independently ethylene or propylene.

Embodiment 127 is the composition of any one of Embodiments 113 to 126 wherein the quaternary amine compounds comprise a molar ratio of EO:PO from about 1:3 to about 3:1, from about 1:3 to about 2:1, from about 1:3 to about 1.5:1, from about 1:3 to about 1:1, from about 1:3 to about 1:2, from about 1:2 to about 3:1, from about 1:2 to about 2:1, from about 1:2 to about 1.5:1, from about 1:2 to about 1:1, from about 1:1 to about 3:1, from about 1:1 to about 2:1, or from about 1:1 to about 1.5:1.

Embodiment 128 is the composition of any one of Embodiments 113 to 127 wherein x and y are independently a number from 0 to about 8, from 0 to about 6, from 0 to about 4, from about 0 to about 2, from 1 to about 8, from 1 to about 6, from 1 to about 4, from 1 to 2.

Embodiment 129 is the composition of any one of Embodiments 113 to 128 wherein x and y are each 0 or 1.

Embodiment 130 is the composition of any one of Embodiments 113 to 129 wherein each $R^3$ is independently hydrogen, methyl or ethyl.

Embodiment 131 is the composition of any one of Embodiments 113 to 130 wherein each $R^3$ is hydrogen.

Embodiment 132 is the composition of any one of Embodiments 113 to 131 wherein $X^-$ is anion selected from the group consisting of sulfate, hydroxide, chloride, bromide, and nitrate.

Embodiment 133 is the composition of any one of Embodiments 113 to 132 wherein $X^-$ is a chloride or hydroxide anion.

Embodiment 134 is the composition of any one of Embodiments 113 to 133 wherein the quaternary amine compound is selected from the group consisting of tetrabutyl ammonium salts and trimethyl-tetradecyl ammonium salts.

Embodiment 135 is the composition of any one of Embodiments 113 to 134 wherein the quaternary amine compound has a structure of formula (II):

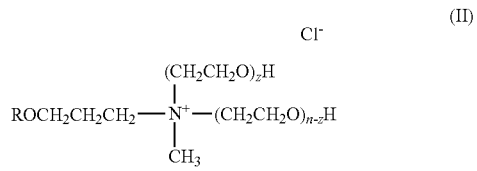

where R is alkyl (e.g., $C_1$-$C_{20}$ alkyl), n is the total number of moles of ($CH_2CH_2O$), and n+z is a number from 0 to 15.

Embodiment 136 is the composition of any one of Embodiments 113 to 135 wherein the quaternary amine compound is selected from the group consisting of isodecyloxypropyl dihydroxyethyl methyl ammonium chloride, isotridecyloxypropyl dihydroxyethyl methyl ammonium chloride, isotridecyloxypropyl poly(5)oxyethylene methyl ammonium chloride, octadecyl dihydroxyethyl methyl ammonium chloride, and mixtures thereof.

Embodiment 137 is the composition of any one of Embodiments 113 to 136 wherein the molar ratio of quaternary amine compound to auxin herbicide is at least about 0.25:1, at least about 0.5:1, at least about 0.75:1, or at least about 1:1.

Embodiment 138 is the composition of any one of Embodiments 113 to 137 wherein the molar ratio of quaternary amine compound to auxin herbicide acid is from about 0.25:1 to about 2:1, from about 0.25:1 to about 1.75:1, from about 0.25:1 to about 1.5:1, from about 0.25:1 to about 1.25:1, from about 0.25:1 to about 1:1, from about 0.5:1 to about 2:1, from about 0.5:1 to about 1.75:1, from about 0.5:1 to about 1.5:1, from about 0.5:1 to about 1.25:1, from about 0.5:1 to about 1:1, from about 0.75:1 to about 2:1, from about 0.75:1 to about 1.75:1, from about 0.75:1 to about 1.5:1, from about 0.75:1 to about 1.25:1, from about 0.75:1 to about 1:1, from about 1:1 to about 2:1, from about 1:1 to about 1.75:1, from about 1:1 to about 1.5:1, or from about 1:1 to about 1.25:1.

Embodiment 139 is the composition of Embodiment 113 wherein the composition comprises the affinity solvent.

Embodiment 140 is the composition of any one of Embodiments 114 to 138 wherein the composition comprises the affinity solvent.

Embodiment 141 is the composition of any one of Embodiments 113 to 140 wherein the affinity solvent comprises an alkylene glycol.

Embodiment 142 is the composition of any one of Embodiments 113 to 141 wherein the affinity solvent comprises a triglyceride.

Embodiment 143 is the composition of any one of Embodiments 113 to 142 wherein the affinity solvent comprises castor oil.

Embodiment 144 is the composition of any one of Embodiments 113 to 143 wherein the weight ratio of affinity solvent to auxin herbicide acid is at least about 1:1, at least about 1.5:1, at least about 2:1, or at least about 3:1.

Embodiment 145 is the composition of any one of Embodiments 113 to 143 wherein the weight ratio of affinity solvent to auxin herbicide acid is from about 1:1 to about 5:1, from about 1:1 to about 4:1, from about 1:1 to about 3:1, from about 1.5:1 to about 5:1, from about 1.5:1 to about 4:1, from about 1.5:1 to about 3:1, from about 2:1 to about 5:1, from about 2:1 to about 4:1, or from about 2:1 to about 3:1.

Embodiment 146 is the composition of any one of Embodiments 113 to 145 wherein the auxin herbicide is selected from the group consisting of 3,6-dichloro-2-methoxybenzoic acid (dicamba); 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy)butanoic acid (MCPB); 4-chlorophenoxyacetic acid; 2,4,5-trichlorophenoxyacetic acid (2,4,5-T); aminopyralid; clopyralid; fluroxypyr; triclopyr; mecoprop; picloram; quinclorac; aminocyclopyrachlor; benazolin; halauxifen; fluorpyrauxifen; methyl 4-amino-3-chloro-5-fluoro-6-(7-fluoro-1H-indol-6-yl)pyridine-2-carboxylate; 4-amino-3-chloro-5-fluoro-6-(7-fluoro-1H-indol-6-yl)pyridine-2-carboxylic acid; benzyl 4-amino-3-chloro-5-fluoro-6-(7-fluoro-1H-indol-6-yl)pyridine-2-carboxylate; methyl 4-amino-3-chloro-5-fluoro-6-(7-fluoro-1-isobutyryl-1H-indol-6-yl)pyridine-2-carboxylate; methyl 4-amino-3-chloro-6-[1-(2,2-dimethylpropanoyl)-7-fluoro-1H-indol-6-yl]-5-fluoropyridine-2-carboxylate; methyl 4-amino-3-chloro-5-fluoro-6-[7-fluoro-1-(methoxyacetyl)-1H-indol-6-yl]pyridine-2-carboxylate; methyl 6-(1-acetyl-7-fluoro-1H-indol-6-yl)-4-amino-3-chloro-5-fluoropyridine-2-carboxylate; potassium 4-amino-3-chloro-5-fluoro-6-(7-fluoro-1H-indol-6-yl)pyridine-2-carboxylate;

butyl 4-amino-3-chloro-5-fluoro-6-(7-fluoro-1H-indol-6-yl) pyridine-2-carboxylate; salts and esters thereof; and mixtures thereof.

Embodiment 147 is the composition of any one of Embodiments 113 to 146 wherein the auxin herbicide acid comprises dicamba acid.

Embodiment 148 is the composition of any one of Embodiments 113 to 147 wherein the auxin herbicide acid comprises 2,4-D acid.

Embodiment 149 is the composition of any one of Embodiments 113 to 148 wherein the concentration of the auxin herbicide acid is at least about 1 wt. %, at least about 2 wt. %, at least about 5 wt. %, at least about 10 wt. %, at least about 15 wt. %, at least about 20 wt. %, at least about 30 wt. %, at least about 40 wt. %, or at least about 45 wt. %.

Embodiment 150 is the composition of any one of Embodiments 113 to 148 wherein the concentration of the auxin herbicide acid is from about 0.5 wt. % to about 10 wt. %, from about 0.5 wt. % to about 5 wt. %, from about 0.5 wt. % to about 3 wt. %, from about 10 wt. % to about 55 wt. %, from about 15 wt. % to about 55 wt. %, from about 20 wt. % to about 55 wt. %, from about 30 wt. % to about 55 wt. %, from about 40 wt. % to about 55 wt. %, from about 45 wt. % to about 55 wt. %, from about 10 wt. % to about 50 wt. %, from about 15 wt. % to about 50 wt. %, from about 20 wt. % to about 50 wt. %, from about 30 wt. % to about 50 wt. %, from about 40 wt. % to about 50 wt. %, from about 45 wt. % to about 50 wt. %, 10 wt. % to about 45 wt. %, from about 15 wt. % to about 45 wt. %, from about 20 wt. % to about 45 wt. %, from about 30 wt. % to about 45 wt. %, from about 40 wt. % to about 45 wt. %, 10 wt. % to about 40 wt. %, from about 15 wt. % to about 40 wt. %, from about 20 wt. % to about 40 wt. %, from about 30 wt. % to about 40 wt. %, 10 wt. % to about 25 wt. %, from about 15 wt. % to about 25 wt. %, or from about 10 wt. % to about 20 wt. %.

Embodiment 151 is the composition of any one of Embodiments 113 to 150 further comprising an alkylene glycol.

Embodiment 152 is the composition of Embodiment 151 wherein the alkylene glycol comprises a $C_2$ to $C_{10}$ glycol or a $C_2$ to $C_6$ glycol.

Embodiment 153 is the composition of Embodiment 151 or 152 wherein the alkylene glycol comprises a branched $C_2$ to $C_{10}$ glycol or a branched $C_2$ to $C_6$ glycol.

Embodiment 154 is the composition of any one of Embodiments 151 to 153 wherein the alkylene glycol is selected from the group consisting of propylene glycol; hexylene glycol; 1,3-propanediol; 1,4-butanediol; 1,3-butanediol; and mixtures thereof.

Embodiment 155 is the composition of any one of Embodiments 151 to 154 wherein the molar ratio of alkylene glycol to auxin herbicide acid is at least about 1:1, at least about 2:1, at least about 3:1, at least about 4:1, at least about 5:1, at least about 6:1, at least about 7:1, at least about 8:1, or at least about 9:1.

Embodiment 156 is the composition of any one of Embodiments 151 to 154 wherein the molar ratio of alkylene glycol to auxin herbicide acid is from about 1:1 to about 20:1, from about 2:1 to about 20:1, from about 5:1 to about 20:1, from about 7:1 to about 20:1, from about 1:1 to about 10:1, from about 2:1 to about 10:1, from about 5:1 to about 10:1, or from about 7:1 to about 10:1.

Embodiment 157 is the composition of any one of Embodiments 151 to 156 wherein the alkylene glycol concentration is at least about 5 wt. %, at least about 10 wt. %, at least about 15 wt. %, at least about 20 wt. %, at least about 25 wt. %, or at least about 30 wt. %.

Embodiment 158 is the composition of any one of Embodiments 151 to 156 wherein the alkylene glycol concentration is from about 5 wt. % to about 40 wt. %, from about 5 wt. % to about 35 wt. %, from about 5 wt. % to about 30 wt. %, from about 5 wt. % to about 25 wt. %, from about 5 wt. % to about 20 wt. %, from about 5 wt. % to about 15 wt. %, from about 5 wt. % to about 10 wt. %, from about 10 wt. % to about 40 wt. %, from about 10 wt. % to about 35 wt. %, from about 10 wt. % to about 30 wt. %, from about 10 wt. % to about 25 wt. %, from about 10 wt. % to about 20 wt. %, from about 10 wt. % to about 15 wt. %, from about 15 wt. % to about 40 wt. %, from about 15 wt. % to about 35 wt. %, from about 15 wt. % to about 30 wt. %, from about 20 wt. % to about 40 wt. %, from about 20 wt. % to about 35 wt. %, or from about 20 wt. % to about 30 wt. %.

Embodiment 159 is the composition of any one of Embodiments 151 to 158 further comprising a solvent.

Embodiment 160 is the composition of Embodiment 159 wherein the solvent is water.

Embodiment 161 is a pesticidal dispersion composition comprising:
(a) an oil continuous phase comprising a nonaqueous liquid having a dielectric constant measured at 25° C. of about 10 or less and an insignificant solvency for the ionic pesticidal active ingredient;
(b) a dispersed phase comprising an ionic pesticidal active ingredient suspended in the oil continuous phase;
(c) a rheology modifier; and
(d) a dispersing agent.

Embodiment 162 is the composition of Embodiment 161 wherein the ionic pesticidal active ingredient is a solid phase pesticidal active ingredient.

Embodiment 163 is the composition of Embodiment 161 or 162 wherein the ionic pesticidal active ingredient comprises a solid phase ionic herbicide selected from the group consisting of glyphosate, glufosinate, an auxin herbicide, or salts thereof.

Embodiment 164 is the composition of any one of Embodiments 161 to 163 wherein the ionic pesticidal active ingredient is dissolved in a polar liquid that is immiscible with the nonaqueous liquid of the continuous phase, and the resulting solution is emulsified in the continuous phase to form a polar liquid-in-oil emulsion.

Embodiment 165 is the composition of Embodiment 164 wherein the polar liquid is selected from the group consisting of water, alcohol, polyol, ether, polar ester, polar amide, and mixtures thereof.

Embodiment 166 is the compositions of any one of Embodiments 161 to 165 wherein the nonaqueous liquid is selected from the group consisting of oily pesticidal active ingredient, hydrocarbon-based liquids, vegetable oils, ester oils, amide oils, aromatic oils, silicone oils, and mixtures thereof.

Embodiment 167 is the compositions of any one of Embodiments 161 to 166 wherein the nonaqueous liquid has a dielectric constant measured at 25° C. that is about 5 or less, about 4 or less, about 3.5 or less, about 3 or less, about 2.5 or less, or about 2 or less.

Embodiment 168 is the compositions of any one of Embodiments 161 to 168 wherein the nonaqueous liquid comprises an acetamide herbicide selected from the group consisting of acetochlor, alachlor, butachlor, butenachlor, carbetamide, delachlor, dethatyl, dimethachlor, dimethenamid, dimethenamid-P, mefenacet, metazochlor, metolachlor, S-metolachlor, napropamide, pretilachlor, pronamide, propachlor, propisochlor, prynachlor, terbuchlor, thenylchlor and xylachlor, salts and esters thereof, and mixtures thereof.

Embodiment 169 is an oil-in-oil co-emulsion pesticidal composition comprising:
(a) an oil continuous phase comprising a first nonaqueous liquid;
(b) a first dispersed phase emulsified in the oil continuous phase, wherein the first dispersed phase comprises a second nonaqueous liquid and pesticidal active ingredient dissolved in the second nonaqueous liquid;
(c) a second dispersed phase emulsified in the oil continuous phase, wherein the second dispersed phase comprises a third nonaqueous liquid and a solid phase pesticidal active ingredient is dispersed in the third nonaqueous liquid;
(d) a rheology modifier;
(e) an emulsifying agent; and
(f) a dispersing agent, wherein the dispersing agent is insoluble in the first nonaqueous liquid, and wherein the first nonaqueous liquid, second nonaqueous liquid, and third nonaqueous liquid are different and are substantially immiscible with one another.

Embodiment 170 is the composition of Embodiment 169 wherein the first nonaqueous liquid has a dielectric constant measured at 25° C. that is about 10 or less, about 5 or less, about 4 or less, about 3.5 or less, about 3 or less, about 2.5 or less, or about 2 or less.

Embodiment 171 is the composition of Embodiment 169 or 170 wherein the first nonaqueous liquid is selected from the group consisting of hydrocarbon-based liquids, vegetable oils, silicone oils, and mixtures thereof.

Embodiment 172 is the composition of any one of Embodiments 169 to 171 wherein the second nonaqueous liquid is selected from the group consisting of oily pesticidal active ingredients, vegetable oils, ester oils, amide oils, aromatic oils, and mixtures thereof.

Embodiment 173 is the composition of any one of Embodiments 169 to 172 wherein the third nonaqueous liquid is selected from the group consisting of silicone oils, hydrocarbon-based liquids, vegetable oils, and mixtures thereof.

Embodiment 174 is the composition of any one of Embodiments 169 to 173 wherein the third nonaqueous liquid comprises castor oil.

Embodiment 175 is the composition of any one of Embodiments 169 to 174 wherein the third nonaqueous liquid comprises a silicone oil.

Embodiment 176 is the composition of any one of Embodiments 169 to 175 wherein the second dispersed phase comprises a dispersing agent comprising a copolymer of acrylate/ethylhexyl acrylate/dimethicone methacrylate.

Embodiment 177 is the composition of any one of Embodiments 169 to 176 wherein the pesticidal active ingredient dissolved in the second nonaqueous liquid comprises an auxin herbicide.

Embodiment 178 is the composition of any one of Embodiments 169 to 177 wherein the solid phase pesticidal active ingredient comprises at least one solid phase herbicide selected from the group consisting of hydroxyphenylpyruvate dioxygenase (HPPD) inhibitors, auxin herbicides, protoporphyrinogen oxidase (PPO) inhibitors, glyphosate, glufosinate, and salts thereof.

Embodiment 179 is a polar liquid-in-oil and oil-in-oil co-emulsion pesticidal composition comprising:
(a) an oil continuous phase comprising a first liquid comprising a nonaqueous liquid substantially immiscible with water;
(b) a first dispersed phase emulsified in the oil continuous phase, wherein the first dispersed phase comprises a second liquid and pesticidal active ingredient dissolved in the second liquid;
(c) a second dispersed phase emulsified in the oil continuous phase, wherein the second dispersed phase comprises a third liquid and a solid phase pesticidal active ingredient dispersed in the third liquid;
(d) a rheology modifier;
(e) an emulsifying agent; and
(f) a dispersing agent, wherein the dispersing agent is insoluble in the first liquid, and wherein the first liquid, second liquid, and third liquid are different and are substantially immiscible with one another.

Embodiment 180 is the composition of Embodiment 179 wherein the first liquid has a dielectric constant measured at 25° C. that is about 10 or less, about 5 or less, about 4 or less, about 3.5 or less, about 3 or less, about 2.5 or less, or about 2 or less.

Embodiment 181 is the composition of Embodiment 179 or 180 wherein the first liquid is selected from the group consisting of hydrocarbon-based liquids, vegetable oils, silicone oils, and mixtures thereof.

Embodiment 182 is the composition of any one of Embodiments 179 to 181 wherein the second liquid is selected from the group consisting of polar liquids, vegetable oils, ester oils, amide oils, aromatic oils, and mixtures thereof.

Embodiment 183 is the composition of any one of Embodiments 179 to 182 wherein the second liquid comprises castor oil.

Embodiment 184 is the composition of Embodiment 183 wherein the polar liquid is selected from the group consisting of water, alcohols, polyols, ethers, polar esters, polar amides, and mixtures thereof.

Embodiment 185 is the composition of any one of Embodiments 179 to 184 wherein the third liquid is selected from the group consisting of hydrocarbon-based liquids, vegetable oils, silicone oils, and mixtures thereof.

Embodiment 186 is the composition of any one of Embodiments 179 to 185 wherein the third liquid comprises a silicone oil.

Embodiment 187 is the composition of any one of Embodiments 179 to 186 wherein the second dispersed phase comprises a dispersing agent comprising a copolymer of acrylate/ethylhexyl acrylate/dimethicone methacrylate.

Embodiment 188 is the composition of any one of Embodiments 179 to 187 wherein the pesticidal active ingredient dissolved in the second liquid comprises an auxin herbicide.

Embodiment 189 is the composition of any one of Embodiments 179 to 188 wherein the solid phase pesticidal active ingredient comprises at least one solid phase herbicide selected from the group consisting of hydroxyphenylpyruvate dioxygenase (HPPD) inhibitors, protoporphyrinogen oxidase (PPO) inhibitors, and combinations thereof.

Embodiment 190 is a wax-in-oil and oil-in-oil co-emulsion pesticidal composition comprising:
(a) an oil continuous phase comprising a first liquid comprising a nonaqueous liquid substantially immiscible with water;
(b) a first dispersed phase emulsified in the oil continuous phase, wherein the first dispersed phase comprises (i) a second liquid which is substantially immiscible with the first liquid, and (ii) a waxy solid, and optionally a pesticidal active ingredient soluble in the second liquid and/or in the molten form of the waxy solid;

(c) a second dispersed phase emulsified in the oil continuous phase, wherein the second dispersed phase comprises (i) a third liquid which is substantially immiscible with the first liquid and a (ii) pesticidal active ingredient dispersed in the third liquid;

(d) a third dispersed phase emulsified in the oil continuous phase, wherein the third dispersed phase comprises a fourth liquid and a solid phase pesticidal active ingredient dispersed in the fourth liquid;

(e) a rheology modifier;

(f) an emulsifying agent; and (g) a dispersing agent, wherein the dispersing agent is insoluble in the first liquid.

Embodiment 191 is the composition of Embodiment 190 wherein the first liquid has a dielectric constant measured at 25° C. that is about 10 or less, about 5 or less, about 4 or less, about 3.5 or less, about 3 or less, about 2.5 or less, or about 2 or less.

Embodiment 192 is the composition of Embodiment 190 or 191 wherein the first liquid is selected from the group consisting of hydrocarbon-based liquids, vegetable oils, silicone oils, and mixtures thereof.

Embodiment 193 is the composition of any one of Embodiments 190 to 192 wherein the second liquid is selected from the group consisting of polar liquids, vegetable oils, ester oils, amide oils, aromatic oils, and mixtures thereof.

Embodiment 194 is the composition of Embodiment 193 wherein the polar liquid is selected from the group consisting of water, alcohols, polyols, ethers, polar esters, polar amides, and mixtures thereof.

Embodiment 195 is the composition of any one of Embodiments 190 to 194 wherein the waxy solid is miscible with the second liquid when a mixture of the waxy solid and the second liquid is heated to above the melting point of the waxy solid.

Embodiment 196 is the composition of Embodiment 195 wherein the mixture of the waxy solid and the second liquid is prepared by melting the waxy solid and mixing the melted waxy solid with the second liquid.

Embodiment 197 is the composition of any one of Embodiments 190 to 196 wherein the first dispersed phase comprises solid particles at temperatures below the melting point of the waxy solid.

Embodiment 198 is the composition of any one of Embodiments 190 to 197 wherein the second liquid is present within a solid matrix comprising the waxy solid.

Embodiment 199 is the composition of any one of Embodiments 190 to 198 wherein the waxy solid is selected from the group consisting of a high molecular weight polymer wax, hydrocarbon wax, natural wax, triglyceride wax, ester wax, and mixtures thereof.

Embodiment 200 is the composition of Embodiment 199, wherein the high molecular weight polymer wax comprises polyethylene glycol wax.

Embodiment 201 is the composition of Embodiment 200 wherein the polyethylene glycol wax has an average molecular weight of about 1000 Da or more or from about 1000 Da to about 9000 Da.

Embodiment 202 is the composition of Embodiment 200 or 201 wherein the waxy solid has a melting point of from about 35° C. to about 95° C., from about 40° C. to about 95° C., from about 50° C. to about 95° C., or from about 60° C. to about 95° C.

Embodiment 203 is the composition of any one of Embodiments 190 to 202 wherein the amount of second liquid in the first dispersed phase is no greater than about 95 wt. % of the first dispersed phase.

Embodiment 204 is the composition of any one of Embodiments 190 to 203 wherein the second liquid and the third liquid are the same.

Embodiment 205 is the composition of any one of Embodiments 190 to 204 wherein the second liquid and/or third liquid comprises castor oil.

Embodiment 206 is the composition of any one of Embodiments 190 to 205 wherein the fourth liquid is selected from the group consisting of hydrocarbon-based liquids, vegetable oils, silicone oils, and mixtures thereof.

Embodiment 207 is the composition of any one of Embodiments 190 to 206 wherein the fourth liquid comprises a silicone oil.

Embodiment 208 is the composition of any one of Embodiments 190 to 207 wherein the third dispersed phase comprises a dispersing agent comprising a copolymer of acrylate/ethylhexyl acrylate/dimethicone methacrylate.

Embodiment 209 is the composition of any one of Embodiments 190 to 208 wherein the pesticidal active ingredient soluble in the second liquid and/or in the molten form of the waxy solid comprises an acetamide herbicide.

Embodiment 210 is the composition of any one of Embodiments 190 to 209 wherein the pesticidal active ingredient dispersed in the third liquid comprises an auxin herbicide.

Embodiment 211 is the composition of any one of Embodiments 190 to 210 wherein the solid phase pesticidal active ingredient comprises at least one solid phase herbicide selected from the group consisting of hydroxyphenylpyruvate dioxygenase (HPPD) inhibitors, auxin herbicides, protoporphyrinogen oxidase (PPO) inhibitors, glyphosate, glufosinate, and salts thereof.

Embodiment 212 is the composition of any one of Embodiments 161 to 211 wherein the rheology modifier is effective over a temperature range of from about −20° C. to about 54° C.

Embodiment 213 is the composition of any one of Embodiments 161 to 212 wherein the rheology modifier comprises a surface-modified smectite clay.

Embodiment 214 is the composition of any one of Embodiments 161 to 213 wherein the rheology modifier comprises a surface-modified smectite clay having plurality of surface-modifications imparted by a combination of surface-modifying surfactants at least one of which is a polymeric surfactant having a molecular weight of greater than 2,000 Dalton.

Embodiment 215 is the composition of Embodiment 213 or 214 wherein the surface-modified smectite clay is milled to a smaller particle size for increasing the yield-stress and shear-thinning properties of the said clay.

Embodiment 216 is the compositions of any one of Embodiments 161 to 215 wherein the dispersing agent comprises a block or a graft copolymer comprising a co-monomer that is nominally insoluble and a second co-monomer that is highly soluble in the oil continuous phase.

Embodiment 217 is the composition of any one of Embodiments 161 to 216 wherein the dispersing agent comprises PEG 30-dipolyhydroxystearate.

Embodiment 218 is the composition of any one of Embodiments 161 to 217 wherein the emulsifying agent comprises one or more surfactants having an HLB value of greater than 7.

Embodiment 219 is the composition of Embodiment 218 wherein the surfactant comprises a non-ionic surfactant.

Embodiment 220 is the composition of Embodiment 218 or 219 wherein the surfactant comprises an ionic surfactant.

Embodiment 221 is the composition of Embodiment 220 wherein the ionic surfactant is selected from the group consisting of alkyl/aryl ether sulfates, alkyl/aryl ether sulfonates, alkyl/aryl ether carboxylates, alkyl/aryl ether phosphates, dialkyl sulfosuccinates, ethoxylated ether amines, ethoxylated-propoxylated ether amines, alkyl/aryl quaternary amine compounds, alkyl/aryl quaternary phosphonium compounds, ethoxylated alkyl/aryl quaternary amine compounds, ethoxylated alkyl/aryl quaternary phosphonium compounds, betaines, sultaines, phospholipids, and mixtures thereof.

Embodiment 222 is a herbicidal dispersion composition comprising:
   an oil continuous phase comprising a nonaqueous liquid; and
   a dispersed phase comprising particulates of a solid matrix comprising an acetamide herbicide and a waxy solid.

Embodiment 223 is the composition of Embodiment 222 wherein the concentration of the acetamide herbicide is at least about 10 wt. %, at least about 15 wt. %, at least about 20 wt. %, at least about 25 wt. %, at least about 30 wt. %, at least about 35 wt. %, or at least about 40 wt. %.

Embodiment 224 is the composition of Embodiment 222 wherein the concentration of the acetamide herbicide is from about 10 wt. % to about 65 wt. %, from about 20 wt. % to about 65 wt. %, from about 30 wt. % to about 65 wt. %, from about 40 wt. % to about 65 wt. %, from about 50 wt. % to about 65 wt. %, from about 10 wt. % to about 60 wt. %, from about 20 wt. % to about 60 wt. %, from about 30 wt. % to about 60 wt. %, from about 40 wt. % to about 60 wt. %, from about 50 wt. % to about 60 wt. %, from about 10 wt. % to about 55 wt. %, from about 20 wt. % to about 55 wt. %, from about 30 wt. % to about 55 wt. %, from about 40 wt. % to about 55 wt. %, from about 50 wt. % to about 55 wt. %, or from about 40 wt. % to about 50 wt. %.

Embodiment 225 is the composition of any one of Embodiments 222 to 224 further comprising a second dispersed phase comprising a solid phase herbicide dispersed in a silicone oil.

Embodiment 226 is the composition of Embodiment 225 wherein the silicone oil has a viscosity of from about 5 cst to about 100,000 cst, from about 5 cst to about 10,000 cst, from about 5 cst to about 1,000 cst, from about 5 cst to about 500 cst, from about 10 cst to about 100,000 cst, from about 10 cst to about 10,000 cst, from about 10 cst to about 1,000 cst, from about 10 cst to about 500 cst, from about 20 cst to about 100,000 cst, from about 20 cst to about 10,000 cst, from about 20 cst to about 1,000 cst, or from about 20 cst to about 500 cst.

Embodiment 227 is the composition of Embodiment 225 or 226 wherein the solid phase herbicide comprises at least one hydroxyphenylpyruvate dioxygenase (HPPD) inhibitor selected from the group consisting of aclonifen, amitrole, beflubutamid, benzofenap, clomazone, diflufenican, fluridone, flurochloridone, flurtamone, isoxachlortole, isoxaflutole, mesotrione, norflurazon, picolinafen, pyrazolynate, pyrazoxyfen, sulcotrione, tembotrione, topramezone, tolpyralate, tefuryltrione, salts and esters thereof, and mixtures thereof Embodiment 228 is the composition of any one of Embodiments 225 to 227 wherein the solid phase herbicide comprises isoxaflutole.

Embodiment 229 is a herbicidal composition comprising a particulate of a solid matrix comprising an acetamide herbicide and a waxy solid, wherein the particulates are dispersed in water.

Embodiment 230 is the composition of any one of Embodiments 222 to 229 wherein the weight ratio of acetamide herbicide to waxy solid is at least about 1:1, at least about 1.5:1, at least about 2:1, or at least about 3:1.

Embodiment 231 is the composition of any one of Embodiments 222 to 229 wherein the weight ratio of acetamide herbicide to waxy solid is from about 1:1 to about 5:1, from about 1:1 to about 4:1, from about 1:1 to about 3:1, from about 1.5:1 to about 5:1, from about 1.5:1 to about 4:1, from about 1.5:1 to about 3:1, from about 2:1 to about 5:1, from about 2:1 to about 4:1, or from about 2:1 to about 3:1.

Embodiment 232 is the composition of any one of Embodiments 222 to 231 wherein the acetamide herbicide is selected from the group consisting of acetochlor, alachlor, butachlor, butenachlor, carbetamide, delachlor, dethatyl, dimethachlor, dimethenamid, dimethenamid-P, mefenacet, metazochlor, metolachlor, S-metolachlor, napropamide, pretilachlor, pronamide, propachlor, propisochlor, prynachlor, terbuchlor, thenylchlor and xylachlor, salts and esters thereof, and mixtures thereof.

Embodiment 233 is the composition of any one of Embodiments 222 to 232 wherein the acetamide herbicide is selected from the group consisting of acetochlor, alachlor, metolachlor, S-metolachlor, and mixtures thereof.

Embodiment 234 is the composition of any one of Embodiments 222 to 233 wherein the acetamide herbicide comprises acetochlor.

Embodiment 235 is the composition of any one of Embodiments 222 to 234 wherein the waxy solid is selected from the group consisting of a high molecular weight polymer wax, hydrocarbon wax, natural wax, triglyceride wax, ester wax, and mixtures thereof.

Embodiment 236 is the composition of Embodiment 235 wherein the high molecular weight polymer wax comprises polyethylene glycol wax.

Embodiment 237 is the composition of Embodiment 236 wherein the polyethylene glycol wax has an average molecular weight of about 1000 Da or more or from about 1000 Da to about 9000 Da.

Embodiment 238 is the composition of Embodiment 237 wherein the waxy solid has a melting point of from about 35° C. to about 95° C., from about 40° C. to about 95° C., from about 50° C. to about 95° C., or from about 60° C. to about 95° C.

Embodiment 239 is a method for controlling weeds in a field of crop plants, the method comprising:
   mixing water with the herbicidal dispersion composition of any one of Embodiments 1 to 101 or 161 to 238 to form the herbicidal application mixture, wherein the herbicidal application mixture is a water-continuous dispersion; and
   applying the herbicidal application mixture to the field in an herbicidally effective amount.

Embodiment 240 is a method for controlling weeds in a field of crop plants, the method comprising:

applying the herbicidal composition of any one of Embodiments 1 to 101 or 113 to 238 or a dilution thereof to the field in an herbicidally effective amount.

EXAMPLES

The following non-limiting examples are provided to further illustrate the present invention. Amounts specified in the Examples are by weight unless otherwise stated.

Example 1

This Example shows improved chemical stability of mesotrione, when combined with a second herbicidal active, acetochlor in a liquid hydrocarbon. Mesotrione particulate solids were dispersed in an acetochlor-laden oil continuous phase, after adding an amount of a liquid hydrocarbon such as Isopar M and Isopar V to the acetochlor-containing oil phase. The details of each composition are shown in Table I. Stability testing was conducted at 54° C. for 4 weeks. These tests showed that the % recovery of mesotrione was about 67-68% for Samples 1 and 2 with the oil continuous phase composed of only acetochlor, and about 95% or higher for Compositions 3-10 with the oil continuous phase composed of various mixtures of acetochlor and a hydrocarbon. An improvement in chemical stability is seen with hydrocarbon-addition to the oil continuous phase.

TABLE I

| Sample | Hydro-carbon Solvent | Weight-ratio of Hydro-carbon Solvent-to-Acetochlor | Hydro-carbon Solvent, Wt. % | Acetochlor (96.1%), Wt. % | Mesotrione (98.3%), Wt. % |
|---|---|---|---|---|---|
| 1 | None | 0.00 | 0.00 | 96.40 | 3.60 |
| 2 | None | 0.00 | 0.00 | 96.34 | 3.66 |
| 3 | Isopar M | 1.5 | 57.84 | 38.56 | 3.60 |
| 4 | Isopar M | 1.5 | 57.79 | 38.53 | 3.68 |
| 5 | Isopar M | 1.25 | 53.55 | 42.83 | 3.62 |
| 6 | Isopar M | 1.25 | 53.55 | 42.85 | 3.60 |
| 7 | Isopar V | 1.50 | 57.82 | 38.56 | 3.62 |
| 8 | Isopar V | 1.50 | 57.54 | 38.37 | 4.09 |
| 9 | Isopar V | 1.25 | 53.55 | 42.81 | 3.64 |
| 10 | Isopar V | 1.25 | 53.55 | 42.81 | 3.64 |

Example 2

This Example shows that PEG-30 dipolyhydroxystearate is an effective dispersing agent for a variety of particulate active ingredients. Oil-dispersions comprising this polymeric dispersant showed a free-flowing consistency, even under a relatively high loading of a solid, particulate active ingredient: i) mesotrione solids (61 wt. %); ii) glyphosate solids (50 wt. %); and iii) sodium salt of dicamba solids (60 wt. %). Without the dispersing agent added, the respective oil-dispersions showed a gel-like consistency presumably due to extensive flocculation of the suspended solids. The above finding shows that PEG-30 dipolyhydroxystearate could be an effective dispersing agent for multiple particulate active ingredients with varying surface properties.

Example 3

This example shows that the strategy described in Example 1 for improving chemical stability of mesotrione in the presence of acetochlor, remains effective even in the presence of formulation ingredients such as dispersing agent, rheology-modifier, and emulsifying agent. The dispersing agent is a triblock copolymer, PEG-30 dipolyhydroxystearate (PG-30 DPHS), and the emulsifying agent is an ethoxylated phosphate ester surfactant in acid form, tristyrylphenol EO (ethylene oxide) phosphate available under the tradename of SURFOM 1323 SC from Oxiteno. The rheology-modifier is a surface-modified smectite clay, referred to herein as organoclay. The % recovery of mesotrione in the various samples of Table II-A, after 2 weeks of storage at 54° C., is given in Table II-B. The compositions of the organoclay-based gels used as rheology-modifier are given in Table III.

TABLE II-A

| | Weight % | | | | | | | | |
|---|---|---|---|---|---|---|---|---|---|
| Sample | Isopar V | Mineral Oil | Gel[4] in Isopar V | Gel[5] in Acetochlor-Safener[3] | Acetochlor[1] | Safener[3] | Mesotrione[2] | Surfom 1323 SC | PG-30 DPHS |
| 1 | 0.00 | 0.00 | 0.00 | 0.00 | 87.29 | 9.09 | 3.62 | 0.00 | 0.00 |
| 2 | 96.38 | 0.00 | 0.00 | 0.00 | 0.00 | 0.00 | 3.62 | 0.00 | 0.00 |
| 3 | 0.00 | 96.38 | 0.00 | 0.00 | 0.00 | 0.00 | 3.62 | 0.00 | 0.00 |
| 4 | 65.38 | 0.00 | 25.00 | 0.00 | 0.00 | 0.00 | 3.62 | 6.00 | 0.00 |
| 5 | 39.16 | 0.00 | 25.00 | 0.00 | 23.75 | 2.47 | 3.62 | 6.00 | 0.00 |
| 6 | 34.96 | 0.00 | 25.00 | 0.00 | 27.55 | 2.87 | 3.62 | 6.00 | 0.00 |
| 7 | 28.94 | 0.00 | 25.00 | 0.00 | 33.00 | 3.44 | 3.62 | 6.00 | 0.00 |
| 8 | 15.45 | 0.00 | 25.00 | 0.00 | 45.22 | 4.71 | 3.62 | 6.00 | 0.00 |
| 9 | 0.00 | 0.00 | 0.00 | 12.20 | 70.62 | 6.53 | 3.62 | 6.00 | 1.02 |

[1] 96.1% active
[2] 98.3% active
[3] A 75.44:19.56 weight-ratio mixture of acetochlor and MON 13900 (Safener)
[4] Oranoclay gel in Isopar M
[5] Organoclay gel in a mixture of acetochlor and the safener mixture of 3

TABLE II-B

| Sample | Weight Ratio of Hydrocarbon-to-Acetochlor | % Mesotrione Recovery |
|---|---|---|
| 1 | 0.00 (Acetochlor Only) | 76.92 |
| 2 | No Acetochlor | 94.87 |
| 3 | No Acetochlor | 99.15 |
| 4 | No Acetochlor | 97.15 |
| 5 | 2.50 | 95.73 |
| 6 | 2.01 | 94.73 |
| 7 | 1.50 | 96.01 |
| 8 | 0.81 | 86.89 |
| 9 | 0.00 (Acetochlor Only) | 82.05 |

As evident from Tables II-A and II-B, mesotrione degrades when the oil continuous phase is entirely composed of acetochlor (Sample 1), but it is substantially stable against degradation when the oil continuous phase is entirely composed of a hydrocarbon (Samples 2-4). Furthermore, even in the presence of the formulation ingredients noted above, mesotrione has improved stability when the oil continuous phase is composed of either a hydrocarbon (Sample 4) or of certain mixtures of a hydrocarbon and acetochlor (Samples 5-7), but not when the oil continuous phase is entirely composed of acetochlor (Sample 9).

TABLE III

| Organoclay Gel | Organoclay, Wt. % | Isopar V, Wt. % | Propylene Carbonate, Wt. % | PEG-30 Dipolyhydroxystearate, Wt. % | Acetochlor[1] (96.1%), Wt. % | MON 13900 (Safener), Wt. % |
|---|---|---|---|---|---|---|
| 4 in Table II-A | 4.78 | 90.15 | 0.98 | 4.09 | | |
| 5 in Table II-A | 9.811 | | 2.98 | | 84.396 | 2.813 |

Example 4

Dielectrically-modified oil-suspensions comprising an ionic herbicidal active ingredient, glyphosate, and a relatively polar oily herbicidal active ingredient, acetochlor were prepared. Table IV presents the details of these compositions. The oil continuous phase comprises mixtures of the oily active, acetochlor, and an ester, isopropyl myristate, having a dielectric constant of about 3.24 at 25° C. The bulk internal phase is glyphosate solid particles dispersed in the foregoing oil continuous phase. Retsch PM400 Ball Mill was used as the milling equipment in milling glyphosate solid particles in preparing the oil-suspension. The emulsifying agents in Samples 1 and 2 were mixtures of a dialkyl sulfosuccinate surfactant, namely, sodium bis(2-ethylhexyl) sulfosuccinate, and an ethoxylated phosphate ester surfactant, namely, tristrylphenol ethoxylate, polyoxyethylene-16 phosphate ester. The emulsifying agent in Sample 3 was an ethoxylated ether amine surfactant, namely, polyoxyethylene-5 isotridecyloxypropylamine.

TABLE IV

| | Weight % | | |
|---|---|---|---|
| Ingredient | Sample 1 | Sample 2 | Sample 3 |
| Acetochlor Tech (96% Active) | 31.38 | 28.23 | 28.87 |
| MON 13900 Safener | 6.56 | 6.05 | 6.03 |
| Organoclay Gel in Acetochlor Tech [1] | 4.92 | 4.94 | 4.53 |
| Isopropyl Myristate | 20.11 | 26.37 | 27.84 |
| Isopar M (Hydrocarbon) | 1.30 | 1.31 | |
| Glyphosate Solids | 25.87 | 23.62 | 23.80 |
| PEG-30 Dipolyhydroxystearate | 4.85 | 4.43 | 4.46 |
| Sodium Bis(2-Ethylhexyl) Sulfosuccinate [2] | 3.03 | 3.07 | |
| Tristrylphenol Ethoxylate, Polyoxyethylene-16 Phosphate Ester | 1.99 | 1.97 | |
| Polyoxyethylene-5 Isotridecyloxypropylamine | | | 4.47 |

[1] Organoclay gel composition is given in Table V
[2] Used as 70 wt. % solution in Isopar M

TABLE V

| Ingredient | Weight % |
|---|---|
| Acetochlor Tech (96% Active) | 85.04 |
| Organoclay Solids | 12.06 |
| Propylene Carbonate | 2.90 |

Example 5

Oil-dispersion compositions that are either highly-dielectric suspo-oil-in-oil emulsion (Sample 1) or highly-dielectric oil-in-oil-co-oil-suspension-in-oil emulsion (Samples 2 and 3), comprising three herbicidal active ingredients, namely, acetochlor, dicamba, and mesotrione were prepared. In Table VI, Sample 1 can be described as highly-dielectric suspo-oil-in-oil emulsion, whereas Samples 2 and 3 as highly-dielectric oil-in-oil-co-oil-suspension-in-oil emulsion. The oil continuous phase comprises mixtures of light and heavy mineral oils. Dicamba has limited solubility in mineral oil, while acetochlor, despite being an oily liquid, has limited miscibility with mineral oil. Sample 1 contains two bulk dispersed phases: i) dicamba solution in acetochlor (i.e., dicamba solids dissolved in acetochlor) emulsified; and ii) mesotrione solid particles dispersed, both in the foregoing oil continuous phase. In preparing Sample 1, mesotrione solid particles are first milled in light mineral oil as a highly concentrated oil dispersion, the resulting oil dispersion subsequently mixed into a mixture of light and heavy mineral oils. Retsch PM400 Ball Mill was used as the milling equipment in milling the mesotrione solid particles in preparing the oil-suspension. This is intended for increasing milling efficiency, since milling efficiency typically increases with increasing loading of particulates being milled. Samples 2 and 3 also contain two bulk dispersed phases: i) dicamba solution in acetochlor emulsified; and ii) oil-suspension (prepared using Retsch PM400 Ball Mill) of mesotrione solid particles in silicone oil emulsified, both in the foregoing oil continuous phase. Notably, silicone oils composed of relatively high molecular weight dimethicone, have limited miscibility with mineral oil, as well as with acetochlor. Emulsification of the respective oil-laden bulk internal phases was carried out using the foregoing milling equipment. As shown in Table ID-B, when mesotrione is combined with acetochlor in an ordinary oil-dispersion composition (Sample tin Table I-B), the 0 recovery of mesotrione at 54° C. for 2 weeks is less than 80%. Chemical stability improves substantially with the oil-dispersion compositions prepared in this Example as shown in Table IX.

TABLE VI

| | Weight % | | |
|---|---|---|---|
| Ingredient | Sample 1 | Sample 2 | Sample 3 |
| Dicamba Tech Solution in Acetochlor Tech [1] | 38.36 | 38.66 | 38.66 |
| Mesotrione Solids Suspension in Light Mineral Oil [2] | 5.79 | | |
| Mesotrione Solids Suspension in Silicone Oil (20 cst Silicone) [2] | | 8.10 | |
| Mesotrione Solids Suspension in Silicone Oil (100 cst Silicone) [2] | | | 8.10 |
| Light Mineral Oil | 20.47 | 19.11 | 19.11 |
| Heavy Mineral Oil | 15.99 | 14.60 | 14.60 |
| Organoclay Gel in Heavy Mineral Oil [3] | 5.54 | 5.58 | 5.58 |
| Isopar M (Hydrocarbon) | 1.71 | 1.72 | 1.72 |
| PEG-30 Dipolyhydroxystearate | 4.18 | 4.21 | 4.21 |
| Sodium Bis(2-Ethylhexyl) Sulfosuccinate [4] | 3.98 | 4.01 | 4.01 |
| Tristrylphenol Ethoxylate, Polyoxyethylene-16 Phosphate Ester | 3.98 | 4.01 | 4.01 |

[1] Dicamba Tech solids (with 98.3% dicamba) dissolved in Acetochlor Tech (with 96% acetochlor), with the resulting solution containing 78.75 wt. % of acetochlor and 17.66 wt. % of dicamba
[2] Suspension composition is given in Table VII
[3] Organoclay gel composition is given in Table VIII
[4] Used as 70 wt. % solution in Isopar M

TABLE VII

| | Weight % | | |
|---|---|---|---|
| Ingredient | Mesotrione Solids Suspension in Light Mineral Oil | Mesotrione Solids Suspension in Silicone (20 cst Silicone) | Mesotrione Solids Suspension in Silicone (100 cst Silicone) |
| Mesotrione Solids (98.3% Active) | 50.00 | 36.00 | 36.00 |
| Light Mineral Oil | 42.50 | | |
| 20 cst Silicone Oil (dimethicone) [1] | | 64.00 | |
| 100 cst Silicone Oil (dimethicone) [2] | | | 64.00 |
| PEG-30 Dipolyhydroxystearate | 7.50 | | |

[1] Molecular weight of 20 cst dimethicone (polymer) is about 2,000 Dalton
[2] Molecular weight of 100 cst dimethicone (polymer) is about 6,000 Dalton

TABLE VIII

| Ingredient | Weight % |
|---|---|
| Heavy Mineral Oil | 81.00 |
| Organoclay Solids | 14.88 |
| Propylene Carbonate | 4.12 |

TABLE IX

| Active Ingredient | Weight % Recovery after Incubation at 54° C. for 2 Weeks | | |
|---|---|---|---|
| | Sample 1 | Sample 2 | Sample 3 |
| Acetochlor | 97.3 | 98.8 | 100 |
| Dicamba | 98.6 | 100 | 100 |
| Mesotrione | 93.5 | 96.1 | 100 |

Example 6

Oil-dispersion compositions were prepared having a relatively high loading of a quaternary amine compound (QAC), namely, isotridecyloxypropyl bis-(2-hydroxyethyl) methyl ammonium chloride (Tomamine Q-17-2 PG from Evonik), which is a polar quaternary surfactant. The compositions are detailed in Table X.

TABLE X

| | | Weight % | | |
|---|---|---|---|---|
| Phase | Ingredient | Sample 1 | Sample 2 | Sample 3 |
| 1 | Acetochlor-Dicamba-QAC Solution [1] | 37.58 | 37.58 | 37.58 |
| 1 | Acetochlor Tech | 7.68 | 7.68 | |
| 1 | Castor Oil | | | 7.68 |
| 1 | Sorbitan Monooleate (Span 80) | 1.61 | 1.61 | 1.61 |
| 1 | Stepan Agent 1690-92N Nonionic Surfactant | 3.18 | 3.18 | 3.18 |
| 1 | PEG-30 Dipolyhydroxystearate | | | 4.31 |
| 2 | Light Mineral Oil | 2.15 | 2.15 | |
| 2 | Heavy Mineral Oil | 17.32 | 17.32 | 28.10 |
| 2 | Silicone Oil, 5 cst | 6.93 | 6.93 | |
| 2 | Organoclay gel in Light Mineral Oil [2] | 12.20 | 12.20 | |
| 2 | Organoclay gel in Heavy Mineral Oil [2] | | | 10.66 |
| 2 | Propylene Carbonate | 0.23 | 0.23 | |
| 2 | PEG-30 Dipolyhydroxystearate | 5.43 | 5.43 | 1.19 |
| 3 | Mesotrione Dispersion in Silicone Oil, 100 cst [3] | 5.70 | | |
| 3 | Mesotrione Dispersion in Silicone Oil, 500 cst [3] | | 5.70 | 5.70 |

[1] Composition given in Table XI
[2] Composition given in Table XII
[3] Composition given in Table XIII The oil dispersion compositions were prepared according to the following procedure:

1) Combine Phase 1 ingredients in a suitable vessel and mix until homogeneous 2) Combine Phase 2 ingredients in a suitable vessel and mix using a dispersion blade agitator 3) Combine the Phase 3 ingredients and mix in a Retsch ball mill using a suitable grinding medium, for a given period 4) To the combined Phase 2, slowly add the combined Phase 1 under agitation with a dispersion-blade agitator, and continue mixing until homogeneous 5) Transfer the above mixture to a Retsch ball mill filled with a suitable grinding medium and continue mixing for a given period 6) To the mixture from Step (5), add Phase 3 and continue mixing for a given period

TABLE XI

| | Weight % | | | |
|---|---|---|---|---|
| Solution | Acetochlor Tech (96% Active) | Dicamba Tech (98.3% Active) | QAC: Tomamine Q-17-2 PG (74%) | |
| Acetochlor-Dicamba-QAC Solution [1] | 56.864 | 12.454 | 30.682 | |

TABLE XII

| Organoclay Gel | Surface-modified Montmorillonite Clay (Nanomer 34 MN from Sigma-Aldrich) | Light Mineral Oil | Heavy Mineral Oil | Propylene Carbonate | PEG-30 Dipolyhydroxystearate |
|---|---|---|---|---|---|
| Light Mineral Oil | 12.218 | 82.474 | | 1.084 | 4.225 |
| Heavy Mineral Oil | 12.219 | | 80.622 | 2.925 | 4.235 |

TABLE XIII

| Mesotrione Dispersion in Silicone Oil | Mesotrione Tech (98.6% Active) | Silicone Oil, 100 cst | Silicone Oil, 500 cst | Acrylates/Ethylhexyl Acrylate/Dimethicone Methacrylate Copolymer (KP-578, from Shin-Etsu Silicone) |
|---|---|---|---|---|
| Silicone Oil, 100 cst | 34.100 | 60.785 | | 5.115 |
| Silicone Oil, 500 cst | 34.100 | | 60.785 | 5.115 |

Example 7

This example shows the beneficial effect of adding quaternary amine compounds on reducing the volatility of dicamba from an application mixture prepared even when dicamba is present in the form of dicamba acid, rather than a dicamba salt. Test samples were prepared, wherein dicamba acid was dissolved in Acetochlor to which was added a solution of a quaternary amine compound (QAC) in propylene glycol. The amount of propylene added with a QAC corresponds to about 9.2-9.4 times the moles of dicamba in the respective test samples. One test sample (control sample) was prepared without adding any QAC, but adding an amount of propylene glycol which corresponds to about 9.4 times the moles of Dicamba in the sample. Table XIV shows the compositions of these test samples. The respective amounts of the two surfactants added to the test samples were comparable for all test samples with respect to the amount of dicamba acid solution in acetochlor contained in any given sample.

TABLE XIV

| | Weight, g | | |
|---|---|---|---|
| Ingredient | Sample 1 | Sample 2 | Sample 3 |
| Dicamba Acid Solution in Acetochlor (78.75% Acetochlor, 17.66% Dicamba Acid) | 48.9 | 48.81 | 54.8 |
| 29.47% (w/w) Trimethyltetradecylammonium Chloride (Molecular Weight: 291.94) Solution in Propylene Glycol | 38.66 | | |
| 28% (w/w) Tetrabutylammonium Chloride Solution in Propylene Glycol | | 38.8 | |
| Propylene Glycol (100%, w/w) | | | 31.36 |
| Surfactant 1: 70% (w/w) Solution of Sodium Dioctyl Sulfosucinate in Isopar M | 7.33 | 7.32 | 8.22 |
| Surfactant 2: Stepan TSP-PE Surfactant | 5.1 | 5.07 | 5.62 |

These compositions prepared were diluted with water to a dicamba acid concentration of 1.2 wt. %. The diluted compositions were subjected to dicamba volatility testing by the procedure described in "A Method to Determine the Relative Volatility of Auxin Herbicide Formulations" in ASTM publication STP1587 entitled "Pesticide Formulation and Delivery Systems: 35th Volume, Pesticide Formulations, Adjuvants, and Spray Characterization in 2014, published 2016, which is incorporated herein by reference. The general procedure is described briefly below.

Humidomes obtained from Hummert International (Part Nos 14-3850-2 for humidomes and 11-3050-1 for 1020 flat tray) were modified by cutting a 2.2 cm diameter hole on one end approximately 5 cm from the top to allow for insertion of a glass air sampling tube (22 mm OD) containing a polyurethane foam (PUF) filter. The sampling tube was secured with a VITON o-ring on each side of the humidome wall. The air sampling tube external to the humidome was fitted with tubing that was connected to a vacuum manifold immediately prior to sampling. The flat tray beneath the humidome was filled with 1 liter of sifted dry or wet 50/50 soil (50% Redi-Earth and 50% US 10 Field Soil) to a depth of about 1 cm. A track sprayer was used to apply the compositions at a dicamba application rate of 1.0 lb/A a.e. at 10 gallons per acre (GPA) onto the soil of each humidome.

The flat tray bottom containing the auxin herbicide formulation on soil was covered with the humidome lid and the lid was secured with clamps. The growth chambers were set at 35° C. and 40% relative humidity (RH). The assembled humidomes were placed in a temperature and humidity controlled environment and connected to a vacuum manifold through the air sampling line. Air was drawn through the humidome and PUF at a rate of 2 liters per minute (LPM) for 24 hours at which point the air sampling was stopped. The humidomes were then removed from the controlled environment and the PUF filter was removed. The PUF filter was extracted with 20 mL of methanol and the solution was analyzed for the auxin herbicide concentration using LC-MS methods known in the art.

The results of the volatility tests are shown in Table XV below. The results are presented as a percent volatility reduction relative to the QAC-free test sample. The results show a significant reduction of volatility by including a quaternary amine compound.

TABLE XV

| Sample | Molar ratio of QAC to Dicamba Acid | Molar ratio of Propylene Glycol to Dicamba Acid | % Reduction in Volatility (with respect to Sample 3) |
|---|---|---|---|
| Sample 1 | 1 | 9.2 | 61.75 |
| Sample 2 | 1 | 9.4 | 83.79 |
| Sample 3 | 0 | 9.4 | — |

Example 8

This example shows the beneficial effect of adding quaternary amine compounds on reducing the volatility of dicamba from an application mixture prepared from an oil dispersion composition. Oil dispersion compositions were prepared in accordance with Example 6. Tables XVI, XVII, XVIII, and XIX detail the ingredients of the oil dispersion compositions. Samples of the oil dispersion compositions were diluted with water to a dicamba acid concentration of 1.2 wt. %. The diluted compositions were subjected to dicamba volatility testing by the procedure described in Example 7. The results of the volatility tests are shown in Table XIX below. The results are presented as a percent volatility reduction relative to the QAC-free test sample 3. The results show a significant reduction of volatility by including a quaternary amine compound.

TABLE XVI

| | Weight % | | |
|---|---|---|---|
| Organoclay Gel | Surface-modified Montmorillonite Clay (Nanomer 34MN from Sigma- Aldrich) | | Heavy Mineral Oil |
| In Heavy Mineral Oil | 7.51 | | 84.48 |

TABLE XVII

| | Weight % | | |
|---|---|---|---|
| Mesotrione Dispersion | Mesotrione Tech (98.6% Active) | Silicone Oil, 100 cst | Polyglyceryl-3 Polydimethylsiloxyethyl Dimethicone (KF 6106, from Shin-etsu Silicone) |
| In Silicone Oil, 100 cst | 37.22 | 56.47 | 5.678 |

TABLE XVII

| | Weight % | | |
|---|---|---|---|
| Ingredients | Solution 1 | Solution 2 | Solution 3 |
| Dicamba Acid Solution in Acetochlor (Acetochlor: 78.75%, Dicamba Acid: 17.66%) | 77.70 | 81.61 | 93.90 |
| 55.5% (w/w) Tributylammonium Chloride (TBAC) Solution in Propylene Glycol | 17.25 | 9.06 | 0.00 |
| Propylene Glycol | 0.00 | 4.03 | 0.00 |
| Stepan Agent 1690-92N Surfactant | 5.05 | 5.30 | 6.10 |

TABLE XIX

| | Weight % | | |
|---|---|---|---|
| Ingredients | Sample 1 | Sample 2 | Sample 3 |
| Light Mineral Oil | 11.00 | 11.00 | 11.00 |
| Heavy Mineral Oil | 7.91 | 7.91 | 7.91 |
| Silicone Oil, 5 cst | 6.18 | 6.18 | 6.18 |
| Lauryl PEG-9 Polydimethylsiloxyethyl Dimethicone (KF 6038, from Shin-etsu Silicone) | 4.55 | 4.55 | 4.55 |
| Organoclay Gel in Acetochlor Tech | 9.09 | 9.09 | 9.09 |
| Aerosol OT in Isopar-M | 15.18 | 15.18 | 15.18 |
| Solution 1, Table XVIII | 40.02 | | |
| Solution 2, Table XVIII | | 39.69 | |
| Solution 3, Table XVIII | | | 38.87 |
| Mesotrione Dispersion in Silicone Oil, 100 cst | 6.07 | 6.40 | 7.22 |
| Molar Ratio of TBAC to Dicamba | 0.555 | 0.278 | 0 |
| Molar Ratio of Propylene Glycol to Dicamba | 1.61 | 1.62 | 0 |
| % Volatility-reduction with respect to Sample 3 | 44.94 | 31.14 | |

Example 9

Solutions of dicamba acid and an affinity solvent were prepared. The details of the solutions are shown in Table XX. A solution having dicamba acid dissolved in acetochlor was also prepared. These solutions were used individually to prepare samples for evaluating dicamba volatility using the procedure described in Example 7. No volatility-control agent was added in any of these samples. The results of dicamba volatility testing are given in Table XXI which show that dicamba-volatility was considerable lower with each of dicamba solutions, respectively, in propylene glycol and castor oil (affinity solvent) as compared to the sample of dicamba solution in acetochlor.

TABLE XX

| | Affinity Solvent | | | Wt. % of Dicamba Tech (98.3% Dicamba by weight) | Wt. % of Affinity Solvent |
|---|---|---|---|---|---|
| Solution # | Solvent | Molecular Weight | Number of Double Bond | Number of Hydrogen Bonding Group | | |
| 1 | Propylene Glycol | 76.095 | | 4 | 61.04 | 38.96 |
| 2 | Castor Oil | 933.45 | 6 | 12 | 32.55 | 67.45 |

TABLE XXI

| Dicamba Solution # | Solvent | Dicamba Volatility, ng/l |
|---|---|---|
| 1 | Propylene Glycol | 2.869 |
| 2 | Castor Oil | 1.721 |
| 3 | Acetochlor | 4.694 |

Example 10

This example shows compositions for emulsions for dicamba-mesotrione premix concentrates comprising the dicamba acid solutions in affinity solvent of Example 9. The emulsions are produced either as oil-in-oil co-emulsion or as polar liquid-in-oil and oil-in-oil co-emulsion, depending on whether the affinity solvent is a polar liquid (propylene glycol) or an oil (castor oil). The compositions for the organoclay gels used in making these emulsions are given in Table XXII.

The emulsions listed in Table XXIII were prepared as follows:
a) The ingredients of Continuous Phase were combined in a suitable vessel, and a homogeneous mixture was prepared, using a dispersion blade agitator.
b) Separately, the ingredients of Dispersed Phase 1 were combined in a suitable vessel, and a homogeneous mixture was prepared, using an agitator.
c) With the Continuous Phase mixture held under strong agitation using a dispersion blade agitator, the Dispersed Phase 1 mixture was slowly added to the Continuous Phase mixture; agitation continued for a period of time, depending on the volume of the emulsion being prepared.
d) Separately, the ingredients of Dispersed Phase 2 were combined in the milling vessel of a Retsch PM100 planetary ball mill, charged with a suitable amount of a grinding medium. The resulting mixture was milled for particle size-reduction of mesotrione solid particles.
e) With the Dispersed Phase 1 emulsion prepared previously according to Step (c) held under strong agitation, the milled dispersion from Step (d) was slowly added to the emulsion; agitation continued for a period of time, depending on the volume of the emulsion being prepared.

TABLE XXII

| Ingredient | Organoclay Gel 1 | Organoclay Gel 2 |
|---|---|---|
| Heavy Mineral Oil 1[1] | | 81 |
| Heavy Mineral Oil 2[2] | 91.79 | |
| Organoclay 1 | 5.13 | |
| Organoclay 2 | | 12.00 |
| PEG 30-Dipolyhydroxystearate | 1.85 | 2.85 |
| Propylene Carbonate | 1.23 | 4.15 |
| | 100.00 | 100.00 |

[1]Drakeol 35 Mineral Oil
[2]Drakeol 19 Mineral Oil

TABLE XXIII

| Ingredient | Phase | Emulsion 1 | Emulsion 2 | Emulsion 3 | Emulsion 4 | Emulsion 5 | Emulsion 6 |
|---|---|---|---|---|---|---|---|
| Light Mineral Oil 1[1] | Continuous | | | | | | 34.67 |
| Heavy Mineral Oil 1[2] | Phase | | | | | | 14 |
| Heavy Mineral Oil 2[3] | | 18.50 | 17.67 | 18.94 | 18.76 | 18.33 | |
| Organoclay Gel 2 | | | | | | | 10.40 |

TABLE XXIII-continued

| Ingredient | Phase | Emulsion 1 | Emulsion 2 | Emulsion 3 | Emulsion 4 | Emulsion 5 | Emulsion 6 |
|---|---|---|---|---|---|---|---|
| Organoclay Gel 1 | | 27.80 | 26.50 | 28.42 | 28.13 | 27.49 | |
| PEG 30-Dipolyhydroxystearate | | 1.40 | 1.13 | 1.44 | 1.91 | 1.88 | 4.02 |
| Sodium Dioctyl Sulphosuccinate | | | | | | | 3.50 |
| Isopar M | | | | | | | 1.50 |
| Dicamba Tech | Dispersed Phase 1 | 15.30 | 12.21 | 10.19 | 10.19 | 15.30 | 13.44 |
| Castor Oil | | 31.70 | 25.29 | 21.11 | 21.11 | 31.70 | |
| Ethoquad C/12 DEG (75% ACTIVE)[4] | | | 13.00 | 16.40 | 16.40 | | |
| Propylene Glycol PEG 30-Dipolyhydroxystearate | | | | | | | 8.58 |
| Stepan Agent 1690-92N[5] | | | | | | | 1.56 |
| Mesotrione Tech | Dispersed Phase 2 | 2.76 | 2.19 | 1.82 | 1.82 | 2.76 | 2.84 |
| Silicone Oil, 100 cst | | 2.26 | 1.79 | 1.50 | 1.50 | 2.26 | 5.06 |
| KP 578[6] | | 0.28 | 0.22 | 0.18 | 0.18 | 0.28 | 0.43 |
| Total | | 100.00 | 100.00 | 100.00 | 100.00 | 100.00 | 100.00 |

[1]Drakeol 9
[2]Drakeol 35
[3]Drakeol 19
[4]Ethoxylated Quaternary Amine Surfactant
[5]Ethoxylated Nonionic Surfactant
[6]Acrylates/Ethylhexyl Acrylate/Dimethicone Methacrylate Copolymer Example 11

This example shows compositions for emulsions for acetochlor-dicamba-mesotrione premixture concentrate, wherein Dispersed Phase 1 was a mixture of acetochlor and a waxy solid, namely, polyethylene glycol with a molecular weight of 30,000 Dalton. Acetochlor and the waxy solid are separately heated to about 85° C., and these heated materials were subsequently mixed together in a suitable vessel under heating and agitation, combined with any remaining ingredients for Dispersed Phase 1. The method of preparing the emulsions was similar to the one described in Example 10. However, the Continuous Phase mixture was cooled to about 0-5° C., and it was to this cooled Continuous Phase mixture held under strong agitation cooling, was slowly added the foregoing heated mixture of Dispersed Phase 1 for emulsification. Upon completion of emulsification, the temperature of the resulting emulsion was in the range of 15-20° C. This was to ensure rapid congealing of the waxy emulsion droplets. Details of the emulsions are provided in Table XXIV.

TABLE XXIV

| Ingredient | Phase | Emulsion 1 | Emulsion 2 | Emulsion 3 | Emulsion 4 | Emulsion 5 |
|---|---|---|---|---|---|---|
| Heavy Mineral Oil 2[1] | Continuous Phase | 19.88 | 19.75 | 22.26 | 19.46 | 22.00 |
| Organoclay Gel 1[2] | | 20.86 | 20.71 | 23.36 | 20.42 | 23.09 |
| PEG 30-Dipolyhydroxystearate | | 1.45 | 1.03 | 0.83 | 1.38 | 1.11 |
| Acetochlor Tech | Dispersed Phase 1 | 17.58 | 17.58 | 18.75 | 17.58 | 18.75 |
| Polyethylene Glycol Wax | | 5.86 | 5.86 | 6.25 | 5.86 | 6.25 |
| PEG 30-Dipolyhydroxystearate | | | 0.70 | 0.75 | 0.93 | 1.00 |
| Dicamba Tech | Dispersed Phase 2 | 7.63 | 7.63 | 8.14 | 7.63 | 8.14 |
| Castor Oil | | 15.81 | 15.81 | 16.86 | 15.81 | 16.86 |
| Ethoquad C/12 DEG (75% ACTIVE) | | 8.13 | 8.13 | | 8.13 | |
| Mesotrione Tech | Dispersed Phase 3 | 1.46 | 1.46 | 1.46 | 1.46 | 1.46 |
| Silicone Oil, 100 cst | | 1.19 | 1.19 | 1.19 | 1.19 | 1.19 |
| KP 578 | | 0.15 | 0.15 | 0.15 | 0.15 | 0.15 |
| Total | | 100.00 | 100.00 | 100.00 | 100.00 | 100.00 |

[1]Drakeol 19
[2]Organoclay Gel 1 from Table XXII

Example 12

Selected compositions from Examples 10 and 11 were evaluated for dicamba volatility using the procedure described in Example 7. The results are provided in Table XXV.

TABLE XXV

| Sample | Dicamba Solvent | Molar Equivalence of Quaternary Amine Compound with respect to Dicamba | Dicamba Volatility, ng/L |
|---|---|---|---|
| Emulsion 1, Table XXIV | Castor Oil | 0.8 | 0.323 |
| Emulsion 5, Table XXIII | Castor Oil | 0 | 1.776 |
| Emulsion 4, Table XXIII | Castor Oil | 0.8 | 0.625 |
| Emulsion 1, Table XXIII | Castor Oil | 0 | 1.453 |
| Emulsion 2, Table XXIII | Castor Oil | 0.5 | 0.532 |
| Emulsion 3, Table XXIII | Castor Oil | 0.8 | 0.709 |

Example 13

This example shows compositions for emulsions for acetochlor-dicamba-isoxaflutole premixture concentrate, wherein the first dispersed phase is a mixture acetochlor and a waxy solid, namely, polyethylene glycol with a molecular weight of 30,000 Dalton. Details of the compositions are provided in Table XXVI.

TABLE XXVI

| Ingredient | Phase | Emulsion 1 | Emulsion 2 |
|---|---|---|---|
| Heavy Mineral Oil 2[1] | Continuous | 19.75 | 22.26 |
| Organoclay Gel 1[2] | Phase | 20.71 | 23.36 |
| PEG 30-Dipolyhydroxystearate | | 1.03 | 0.83 |
| Acetochlor Tech | Dispersed | 17.58 | 18.75 |
| Polyethylene Glycol Wax (PEG 30,000) | Phase 1 | 5.86 | 6.25 |
| PEG 30-Dipolyhydroxystearate | | 0.70 | 0.75 |
| Dicamba Tech | Dispersed | 7.63 | 8.14 |
| Castor Oil | Phase 2 | 15.81 | 16.86 |
| Ethoquad C/12 DEG (75% ACTIVE)[3] | | 8.13 | |
| Isoxaflutole (100% ACTIVE) | Dispersed | 1.46 | 1.46 |
| Silicone Oil, 1000 cst | Phase 3 | 1.19 | 1.19 |
| KP 578[4] | | 0.15 | 0.15 |
| Total | | 100.00 | 100.00 |

[1]Drakeol 19
[2]Organoclay Gel 2 from Table XXIII

Example 14

Compositions as described in the aforementioned Examples will be prepared where mesotrione is substituted for aclonifen, amitrole, beflubutamid, benzofenap, clomazone, diflufenican, fluridone, flurochloridone, flurtamone, isoxachlortole, isoxaflutole, mesotrione, norflurazon, picolinafen, pyrazolynate, pyrazoxyfen, sulcotrione, tembotrione, topramezone, tolpyralate, tefuryltrione, or ethyl [3-[2-chloro-4-fluoro-5-(I-methyl-6-trifluoromethyl-2,4-dioxo-1,2,3,4-tetrahydropyrimidin-3-y l)phenoxy]-2-pyridyloxy]acetate.

When introducing elements of the present invention or the preferred embodiments(s) thereof, the articles "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description shall be interpreted as illustrative and not in a limiting sense.

What is claimed is:

1. A herbicidal composition comprising an auxin herbicide acid and
   (ii) an affinity solvent for the auxin herbicide acid, wherein the affinity solvent satisfies at least one of the following:
   (1) a molecular weight of at least about 300 grams per mole, at least about 600 grams per mole, or at least about 900 grams per mole,
   (2) at least one double bond group per molecule of the solvent, and/or
   (3) at least four hydrogen bonding groups per molecule of the solvent, wherein the affinity solvent comprises castor oil and the weight ratio of affinity solvent to auxin herbicide is at least about 1:1.

2. The composition of claim 1, wherein the composition comprises a quaternary amine compound and/or a reaction product of the auxin herbicide and the quaternary amine compound, wherein the quaternary amine compound has a structure of formula (I):

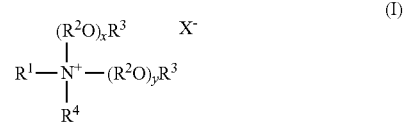

wherein $R^1$ is hydrocarbyl or substituted hydrocarbyl having from 1 to about 30 carbon atoms; each $R^2$ in each of the $(R^2O)_x$ and $(R^2O)_y$ groups is independently a linear or branched $C_2$-$C_4$ alkylene; each $R^3$ is independently hydrogen, or a linear or branched alkyl group having from 1 to about 4 carbon atoms; $R^4$ is hydrocarbyl or substituted hydrocarbyl having from 1 to about 30 carbon atoms; x and y are independently a number from 0 to about 10; and $X^-$ is an agriculturally acceptable anion, with the proviso that $X^-$ is not a hydroxide anion when x and y are each 0 and at least one of $R^1$, $R^2$, $R^3$, and $R^4$ is an alkyl with 2 to 4 carbon atoms or an arylalkyl.

3. The composition of claim 2, wherein the quaternary amine compound has a molecular weight that is from about 100 Da to about 1,000 Da.

4. The composition of claim 2, wherein the $R^1$ and $R^4$ hydrocarbyl groups are each independently linear or branched alkyl, linear or branched alkenyl, linear or branched alkynyl, linear or branched alkoxy, aryl, or aralkyl having from 1 to about 30 carbon atoms.

5. The composition of claim 2, wherein $R^1$ and $R^4$ are each butyl.

6. The composition of claim 2, wherein $R^1$ is a linear or branched alkyl, linear or branched alkenyl, or linear or branched alkoxy having from 3 to about 25 carbon atoms;

wherein R⁴ is a linear or branched alkyl, linear or branched alkenyl, or linear or branched alkoxy having from 1 to about 12 carbon atoms;

wherein each R² in each of the (R²O)$_x$ and (R²O)$_y$ groups is independently a linear or branched $C_2$-$C_4$ alkylene; and wherein x and y are independently a number from 0 to about 8.

7. The composition of claim 2, wherein the quaternary amine compounds of formula (I) comprises an alkoxylated quaternary amine compound selected from the group consisting of ethoxylated quaternary amine compounds, propoxylated quaternary amine compounds, and quaternary amine compounds comprising various polymers or copolymers of ethylene oxide (EO) and propylene oxide (PO).

8. The composition of claim 2, wherein each R² in each of the (R²O)$_x$ and (R²O)$_y$ groups is independently ethylene or propylene;

wherein x and y are each 0 or 1; and wherein each R³ is independently hydrogen, methyl or ethyl.

9. The composition of claim 2, wherein the quaternary amine compounds comprise a molar ratio of EO:PO from about 1:3 to about 3:1.

10. The composition of claim 2, wherein X⁻ is an anion selected from the group consisting of sulfate, hydroxide, chloride, bromide, and nitrate.

11. The composition of claim 2, wherein the quaternary amine compound is selected from the group consisting of tetrabutyl ammonium salts and trimethyl-tetradecyl ammonium salts.

12. The composition of claim 2, wherein the quaternary amine compound has a structure of formula (II):

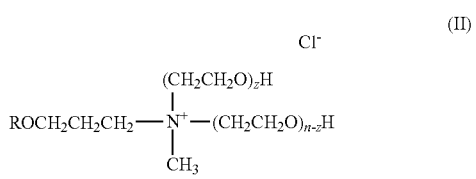

where R is alkyl (e.g., $C_1$-$C_{20}$ alkyl), n is the total number of moles of (CH₂CH₂O), and n+z is a number from 0 to 15.

13. The composition of claim 2, wherein the quaternary amine compound is selected from the group consisting of isodecyloxypropyl dihydroxyethyl methyl ammonium chloride, isotridecyloxypropyl dihydroxyethyl methyl ammonium chloride, isotridecyloxypropyl poly(5)oxyethylene methyl ammonium chloride, octadecyl dihydroxyethyl methyl ammonium chloride, and mixtures thereof.

14. The composition of claim 2, wherein the molar ratio of quaternary amine compound to auxin herbicide acid is from about 0.25:1 to about 2:1.

15. The composition of claim 1, wherein the weight ratio of affinity solvent to auxin herbicide acid is from about 1:1 to about 5:1.

16. The composition of claim 1, wherein the auxin herbicide is selected from the group consisting of 3,6-dichloro-2-methoxybenzoic acid (dicamba); 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy)butanoic acid (MCPB); 4-chlorophenoxyacetic acid; 2,4,5-trichlorophenoxyacetic acid (2,4,5-T); aminopyralid; clopyralid; fluroxypyr; triclopyr; mecoprop; picloram; quinclorac; aminocyclopyrachlor; benazolin; halauxifen; fluorpyrauxifen; methyl 4-amino-3-chloro-5-fluoro-6-(7-fluoro-1H-indol-6-yl)pyridine-2-carboxylate; 4-amino-3-chloro-5-fluoro-6-(7-fluoro-1H-indol-6-yl)pyridine-2-carboxylic acid; benzyl 4-amino-3-chloro-5-fluoro-6-(7-fluoro-1H-indol-6-yl)pyridine-2-carboxylate; methyl 4-amino-3-chloro-5-fluoro-6-(7-fluoro-1-isobutyryl-1H-indol-6-yl)pyridine-2-carboxylate; methyl 4-amino-3-chloro-6-[1-(2,2-dimethylpropanoyl)-7-fluoro-1H-indol-6-yl]-5-fluoropyridine-2-carboxylate; methyl 4-amino-3-chloro-5-fluoro-6-[7-fluoro-1-(methoxyacetyl)-1H-indol-6-yl]pyridine-2-carboxylate; methyl 6-(1-acetyl-7-fluoro-1H-indol-6-yl)-4-amino-3-chloro-5-fluoropyridine-2-carboxylate; potassium 4-amino-3-chloro-5-fluoro-6-(7-fluoro-1H-indol-6-yl)pyridine-2-carboxylate; butyl 4-amino-3-chloro-5-fluoro-6-(7-fluoro-1H-indol-6-yl)pyridine-2-carboxylate; salts and esters thereof; and mixtures thereof.

17. The composition of claim 1, wherein the auxin herbicide acid comprises dicamba acid, 2,4-D acid, or a combination thereof.

18. The composition of claim 1, wherein the concentration of the auxin herbicide acid is from about 0.5 wt. % to about 10 wt. %.

19. The composition of claim 1, further comprising an alkylene glycol, a solvent, or a combination thereof.

20. The composition of claim 19, wherein the alkylene glycol comprises a $C_2$ to $C_{10}$ glycol or a $C_2$ to $C_6$ glycol and the solvent is water.

21. The composition of claim 19, wherein the alkylene glycol is selected from the group consisting of propylene glycol; hexylene glycol; 1,3-propanediol; 1,4-butanediol; 1,3-butanediol; and mixtures thereof.

22. The composition of claim 19, wherein the molar ratio of alkylene glycol to auxin herbicide acid is from about 1:1 to about 20:1.

23. The composition of claim 19, wherein the alkylene glycol concentration is from about 5 wt. % to about 40 wt. %.

24. A method for controlling weeds in a field of crop plants, the method comprising:

applying the composition of claim 1 or a dilution thereof to the field in an herbicidally effective amount.

25. A process for preparing a herbicidal application mixture, the method comprising mixing water with the composition of claim 1 to form the herbicidal application mixture, wherein the herbicidal application mixture is a water-continuous dispersion.

* * * * *